US012190828B2

(12) United States Patent
Yamamoto

(10) Patent No.: US 12,190,828 B2
(45) Date of Patent: Jan. 7, 2025

(54) DISPLAY DEVICE AND METHOD FOR DRIVING SAME

(71) Applicant: Sharp Display Technology Corporation, Kameyama (JP)

(72) Inventor: Kaoru Yamamoto, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/566,949

(22) PCT Filed: Jul. 5, 2021

(86) PCT No.: PCT/JP2021/025247
§ 371 (c)(1),
(2) Date: Dec. 4, 2023

(87) PCT Pub. No.: WO2023/281556
PCT Pub. Date: Jan. 12, 2023

(65) Prior Publication Data
US 2024/0274090 A1 Aug. 15, 2024

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2300/043* (2013.01); (Continued)

(58) Field of Classification Search
CPC ......... G09G 3/3266; G09G 2310/0278; G09G 2310/08; G09G 3/20; G09G 3/3233; (Continued)

(56) References Cited

U.S. PATENT DOCUMENTS 10,304,378 B2 5/2019 Lin et al.
10,373,563 B2 * 8/2019 Park .................... G09G 3/3233
(Continued)

FOREIGN PATENT DOCUMENTS

JP 2008-216961 A 9/2008

*Primary Examiner* — Koosha Sharifi-Tafreshi
(74) *Attorney, Agent, or Firm* — Keating & Bennett, LLP

(57) ABSTRACT

To realize frame narrowing of a display device that uses a display element driven by a current. A second scanning signal line drive circuit configured to drive second scanning signal lines each connected to a control terminal of a writing control transistor is constituted by a shift register composed of unit circuits equal in number to half a number of the second scanning signal lines. Each of the unit circuits included in the shift register collectively drives two of the second scanning signal lines adjacent to each other. In a period during which a power supply control transistor and a light emission control transistor are maintained in an off state and the writing control transistor is maintained in an on state in first and second pixel circuits connected to the two second scanning signal lines adjacent to each other, a threshold voltage compensation transistor and an initialization transistor in the first pixel circuit and a threshold voltage compensation transistor and an initialization transistor in the second pixel circuit are sequentially set to an on state for a predetermined period each.

13 Claims, 35 Drawing Sheets

(52) U.S. Cl.
CPC ............... *G09G 2310/0278* (2013.01); *G09G 2310/0286* (2013.01); *G09G 2310/08* (2013.01); *G09G 2330/021* (2013.01)

(58) Field of Classification Search
CPC ... G09G 2310/0286; G09G 2310/0267; G09G 2310/0202; G09G 2310/0205
See application file for complete search history.

(56) References Cited

U.S. PATENT DOCUMENTS

| | | | | |
|---|---|---|---|---|
| 10,636,356 | B1 * | 4/2020 | Qian .................... | G09G 3/3233 |
| 2008/0211745 | A1 | 9/2008 | Lee et al. | |

* cited by examiner

DISPLAY DEVICE AND METHOD FOR DRIVING SAME

TECHNICAL FIELD

The disclosure described below relates to a display device that uses a display element driven by a current and a method for driving the same.

BACKGROUND ART

In recent years, organic electroluminescent (EL) display devices provided with pixel circuits including organic EL elements have been coming into practical use. The organic EL elements are also called organic light-emitting diodes (OLEDs), each of which is a self-luminous type display element configured to emit light at a luminance depending on a current flowing in itself. Thus, since the organic EL elements are the self-luminous type display elements, the organic EL display devices can be easily thinned, reduced in power consumption, increased in luminance, and the like, as compared with liquid crystal display devices requiring backlights, color filters, and the like.

With regard to the pixel circuit of the organic EL display device, a thin film transistor (TFT) is typically used as a drive transistor for controlling the supply of a current to the organic EL element. However, a variation in characteristics of the thin film transistor is likely to occur. Specifically, a variation in threshold voltage is likely to occur. When the variation in threshold voltage occurs in the drive transistors provided in a display portion, a variation in luminance occurs and thus the display quality is degraded. Accordingly, various types of processing (compensation processing) configured to compensate for threshold voltage variations are proposed.

As the compensation processing methods, well known are an internal compensation method in which compensation processing is performed by providing a capacitor in a pixel circuit to hold the threshold voltage information of the drive transistor, and an external compensation method in which, for example, a magnitude of a current flowing through the drive transistor is measured under predetermined conditions with a circuit provided outside the pixel circuit, and compensation processing is performed by correcting an image signal on the basis of the measurement result.

A well-known pixel circuit of an organic EL display device using the internal compensation method for compensation processing is constituted by one organic EL element, a plurality of P-channel thin film transistors, and one holding capacitor. On the other hand, U.S. Pat. No. 10,304,378 discloses in FIG. 4 a pixel circuit constituted by one organic EL element, six N-channel thin film transistors, and one holding capacitor. An oxide TFT (thin film transistor including a channel region formed of an oxide semiconductor) is adopted as the N-channel thin film transistor, thereby reducing power consumption.

In the display device disclosed in U.S. Pat. No. 10,304,378, a drive circuit (hereinafter referred to as "scanning-side drive circuit") for driving control signal lines (hereinafter referred to as "first scanning signal lines") connected to control terminals of transistors T3, T6, control signal lines (hereinafter referred to as "second scanning signal lines") connected to a control terminal of a transistor T1, control signal lines (hereinafter referred to as "first light emission control lines") connected to a control terminal of a transistor T5, and control signal lines (hereinafter referred to as "second light emission control lines") connected to a control terminal of a transistor T4 are provided at an end portion of a display portion. Note that JP 2008-216961 A discloses a configuration in which light emission control lines are collectively driven two by two to reduce an area of the drive circuit.

CITATION LIST

Patent Literature

PTL 1: U.S. Pat. No. 10,304,378
PTL 2: JP 2008-216961 A

SUMMARY

Technical Problem

As illustrated in FIG. 35, an organic EL display device including a pixel circuit (pixel circuit disclosed in FIG. 4 of U.S. Pat. No. 10,304,378) constituted by one organic EL element, six N-channel thin film transistors, and one holding capacitor is provided with a scanning-side drive circuit composed of a first scanning signal line drive circuit 91 configured to drive the first scanning signal lines, a second scanning signal line drive circuit 92 configured to drive the second scanning signal lines, a first light emission control line drive circuit 93 configured to drive the first light emission control lines, and a second light emission control line drive circuit 94 configured to drive the second light emission control lines. Note that FIG. 35 illustrates only the configuration of a portion corresponding to four rows (the same applies to FIGS. 1, 18, 21, 24, 30, and 34). Further, in FIG. 35, one pixel circuit included in each of the four rows described above is represented by a rectangle denoted by reference sign 90.

The first scanning signal line drive circuit 91, the second scanning signal line drive circuit 92, the first light emission control line drive circuit 93, and the second light emission control line drive circuit 94 are each constituted by a shift register. Specifically, the first scanning signal line drive circuit 91 is constituted by a shift register including unit circuits 910 equal in number to a number of first scanning signal lines, the second scanning signal line drive circuit 92 is constituted by a shift register including unit circuits 920 equal in number to a number of the second scanning signal lines, the first light emission control line drive circuit 93 is constituted by a shift register including unit circuits 930 equal in number to a number of the first light emission control lines, and the second light emission control line drive circuit 94 is constituted by a shift register including unit circuits 940 equal in number to a number of the second light emission control lines.

In recent years, there has been an increasing demand for frame narrowing a mobile terminal device such as a smartphone. However, according to the configuration described above, as a region for the scanning-side drive circuit, a region in which a large number of circuit elements (thin film transistors, capacitors, and the like) are formed is required around the periphery of the display portion. Such a requirement makes it difficult to realize frame narrowing.

Therefore, an object of the disclosure described below is to realize frame narrowing of a display device that uses a display element driven by a current.

Solution to Problem

A display device according to some embodiments of the present disclosure is a display device using a display element driven by a current, the display device including:

a display portion including a plurality of data signal lines, a plurality of first scanning signal lines, a plurality of second scanning signal lines, a plurality of first light emission control lines, a plurality of second light emission control lines, a first power source line, a second power source line, an initialization power source line, and a plurality of pixel circuits;

a data-side drive circuit configured to apply data signals to the plurality of data signal lines; and a scanning-side drive circuit including a first scanning signal line drive circuit configured to selectively drive the plurality of first scanning signal lines, a second scanning signal line drive circuit configured to selectively drive the plurality of second scanning signal lines, and a light emission control line drive circuit configured to selectively drive the plurality of first light emission control lines and the plurality of second light emission control lines, wherein each of the plurality of pixel circuits corresponds to one of the plurality of data signal lines, one of the plurality of first scanning signal lines, one of the plurality of second scanning signal lines, one of the plurality of first light emission control lines, and one of the plurality of second light emission control lines, each of the plurality of pixel circuits includes the display element including a first terminal, and a second terminal connected to the second power source line, a drive transistor including a control terminal, a first conduction terminal, and a second conduction terminal, and provided in series with the display element, a holding capacitor connected at one end to the control terminal of the drive transistor, a writing control transistor including a control terminal connected to a corresponding second scanning signal line, a first conduction terminal connected to a corresponding data signal line, and a second conduction terminal connected to the second conduction terminal of the drive transistor, a threshold voltage compensation transistor including a control terminal connected to a corresponding first scanning signal line, a first conduction terminal connected to the first conduction terminal of the drive transistor, and a second conduction terminal connected to the control terminal of the drive transistor, a power supply control transistor including a control terminal connected to a corresponding second light emission control line, a first conduction terminal connected to the first power source line, and a second conduction terminal connected to the first conduction terminal of the drive transistor, a light emission control transistor including a control terminal connected to a corresponding first light emission control line, a first conduction terminal connected to the second conduction terminal of the drive transistor, and a second conduction terminal connected to the first terminal of the display element, and an initialization transistor including a control terminal connected to a corresponding first scanning signal line, a first conduction terminal connected to the first terminal of the display element, and a second conduction terminal connected to the initialization power source line, the first scanning signal line drive circuit is constituted by a shift register including unit circuits equal in number to a number of the plurality of first scanning signal lines, the second scanning signal line drive circuit is constituted by a shift register including unit circuits equal in number to 1/Q of a number of the plurality of second scanning signal lines, where Q is an integer of 2 or greater, each of the unit circuits included in the shift register constituting the first scanning signal line drive circuit drives one corresponding first scanning signal line, each of the unit circuits included in the shift register constituting the second scanning signal line drive circuit collectively drives Q second scanning signal lines corresponding thereto and adjacent to each other, and in a period during which the writing control transistor is maintained in an on state in all pixel circuits each being connected to any one of Q second scanning signal lines collectively driven in a period during which the power supply control transistor and the light emission control transistor are maintained in an off state in the all pixel circuits each being connected to any one of the Q second scanning signal lines collectively driven, Q first scanning signal lines corresponding to the Q second scanning signal lines collectively driven are sequentially set to a select state for a predetermined period each.

A display device according to some other embodiments of the present disclosure is a display device using a display element driven by a current, the display device including:

a display portion including a plurality of data signal lines, a plurality of first scanning signal lines, a plurality of second scanning signal lines, a plurality of third scanning signal lines, a plurality of first light emission control lines, a plurality of second light emission control lines, a first power source line, a second power source line, an initialization power source line, and a plurality of pixel circuits;

a data-side drive circuit configured to apply data signals to the plurality of data signal lines; and a scanning-side drive circuit including a first scanning signal line drive circuit configured to selectively drive the plurality of first scanning signal lines, a second scanning signal line drive circuit configured to selectively drive the plurality of second scanning signal lines, a third scanning signal line drive circuit configured to selectively drive the plurality of third scanning signal lines, and a light emission control line drive circuit configured to selectively drive the plurality of first light emission control lines and the plurality of second light emission control lines, wherein each of the plurality of pixel circuits corresponds to one of the plurality of data signal lines, one of the plurality of first scanning signal lines, one of the plurality of second scanning signal lines, one of the plurality of third scanning signal lines, one of the plurality of first light emission control lines, and one of the plurality of second light emission control lines, each of the plurality of pixel circuits includes the display element including a first terminal, and a second terminal connected to the second power source line, a drive transistor including a control terminal, a first conduction terminal, and a second conduction terminal, and provided in series with the display element, a holding capacitor connected at one end to the control terminal of the drive transistor, a writing control transistor including a control terminal connected to a corresponding second scanning signal line, a first conduction terminal connected to a corresponding data signal line, and a second conduction terminal connected to the second conduction terminal of the drive transistor, a threshold voltage compensation transistor including a control terminal connected to a corresponding first scanning signal line, a first conduction terminal connected to the first conduction terminal of the drive transistor, and a second conduction terminal connected to the control terminal of the drive transistor, a power supply control transistor including a control terminal connected to a corresponding second light emission control line, a first conduction terminal connected to the first power source line, and a second conduction terminal connected to the first conduction terminal of the drive transistor, a light emission control transistor including a control terminal connected to a corresponding first light emission control line, a first conduction terminal connected to the second conduction terminal of the drive transistor, and a second conduction terminal connected to the first terminal of the display element, and an initialization transistor including a control terminal connected to a corresponding third scanning signal line, a first conduction terminal connected to the first terminal of the display element, and a second conduction terminal connected to the initialization power source line, the first scanning signal line drive circuit is constituted by a shift register including unit circuits equal in number to a number of the plurality of first scanning signal lines, the second scanning signal line drive circuit is constituted by a shift register including unit circuits equal in number to 1/Q of a number of the plurality of second scanning signal lines, where Q is an integer of 2 or greater, the third scanning signal line drive circuit is constituted by a shift register including unit circuits equal in number to 1/Q of a number of the plurality of third scanning signal lines, each of the unit circuits included in the shift register constituting the first scanning signal line drive circuit drives one corresponding first scanning signal line, each of the unit circuits included in the shift register constituting the second scanning signal line drive circuit collectively drives Q second scanning signal lines corresponding thereto and adjacent to each other, each of the unit circuits included in the shift register constituting the third scanning signal line drive circuit collectively drives Q third scanning signal lines corresponding thereto and adjacent to each other, and in a period during which the writing control transistor is maintained in an on state in all pixel circuits each being connected to any one of the Q second scanning signal lines collectively driven and connected to any one of the Q third scanning signal lines collectively driven in a period during which the initialization transistor is maintained in an on state and the power supply control transistor and the light emission control transistor are maintained in an off state in the all pixel circuits each being connected to any one of the Q second scanning signal lines collectively driven and connected to any one of the Q third scanning signal lines collectively driven, Q first scanning signal lines corresponding to the Q second scanning signal lines collectively driven are sequentially set to a select state for a predetermined period each.

A method for driving (for a display device) according to some embodiments of the present disclosure is a method for driving a display device using a display element driven by a current, the display device including a display portion including a plurality of data signal lines, a plurality of first scanning signal lines, a plurality of second scanning signal lines, a plurality of first light emission control lines, a plurality of second light emission control lines, a first power source line, a second power source line, an initialization power source line, and a plurality of pixel circuits, a data-side drive circuit configured to apply data signals to the plurality of data signal lines, and a scanning-side drive circuit including a first scanning signal line drive circuit configured to selectively drive the plurality of first scanning signal lines, a second scanning signal line drive circuit configured to selectively drive the plurality of second scanning signal lines, and a light emission control line drive circuit configured to selectively drive the plurality of first light emission control lines and the plurality of second light emission control lines, wherein each of the plurality of pixel circuits corresponds to one of the plurality of data signal lines, one of the plurality of first scanning signal lines, one of the plurality of second scanning signal lines, one of the plurality of first light emission control lines, and one of the plurality of second light emission control lines, each of the plurality of pixel circuits includes the display element including a first terminal, and a second terminal connected to the second power source line, a drive transistor including a control terminal, a first conduction terminal, and a second conduction terminal, and provided in series with the display element, a holding capacitor connected at one end to the control terminal of the drive transistor, a writing control transistor including a control terminal connected to a corresponding second scanning signal line, a first conduction terminal connected to a corresponding data signal line, and a second conduction terminal connected to the second conduction terminal of the drive transistor, a threshold voltage compensation transistor including a control terminal connected to a corresponding first scanning signal line, a first conduction terminal connected to the first conduction terminal of the drive transistor, and a second conduction terminal connected to the control terminal of the drive transistor, a power supply control transistor including a control terminal connected to a corresponding second light emission control line, a first conduction terminal connected to the first power source line, and a second conduction terminal connected to the first conduction terminal of the drive transistor, a light emission control transistor including a control terminal connected to a corresponding first light emission control line, a first conduction terminal connected to the second conduction terminal of the drive transistor, and a second conduction terminal connected to the first terminal of the display element, and an initialization transistor including a control terminal connected to a corresponding first scanning signal line, a first conduction terminal connected to the first terminal of the display element, and a second conduction terminal connected to the initialization power source line, the first scanning signal line drive circuit is constituted by a shift register including unit circuits equal in number to a number of the plurality of first scanning signal lines, the second scanning signal line drive circuit is constituted by a shift register including unit circuits equal in number to 1/Q of a number of the plurality of second scanning signal lines, where Q is an integer of 2 or greater, each of the unit circuits included in the shift register constituting the first scanning signal line drive circuit drives one corresponding first scanning signal line, and each of the unit circuits included in the shift register constituting the second scanning signal line drive circuit collectively drives Q second scanning signal lines corresponding thereto and adjacent to each other, the method including:

a data writing step of writing the data signals to the plurality of pixel circuits; and a pause step of stopping the writing the data signals to the plurality of pixel circuits throughout a period of one frame period or longer wherein, in the data writing step, after a holding voltage of the holding capacitor and a voltage of the first terminal of the display element are initialized inpixel circuits each being connected to any one of the Q second scanning signal lines collectively driven by subsequently setting each of Q first scanning signal lines corresponding to the Q second scanning signal lines collectively driven to a select state for a predetermined period in a period during which the writing control transistor and the light emission control transistor are maintained in an off state and the power supply control transistor is maintained in an on state in all pixel circuits each being connected to any one of the Q second scanning signal lines collectively driven, writing the data signals to the pixel circuits each being connected to any one of the Q second scanning signal lines collectively driven is performed by sequentially setting each of the Q first scanning signal lines corresponding to the Q second scanning signal lines collectively driven to a select state for a predetermined period in a period during which the light emission control transistor and the power supply control transistor are maintained in an off state and the writing control transistor is maintained in an on state in the all pixel circuits each being connected to any one of the Q second scanning signal lines collectively driven, and in the pause step, the voltage of the first terminal of the display element is initialized in the pixel circuits each being connected to any one of the Q second scanning signal lines collectively driven by setting each of the Q second scanning signal lines collectively driven to a select state for a predetermined period in a period during which the threshold voltage compensation transistor, the initialization transistor, and the power supply control transistor are maintained in an off state and the light emission control transistor is maintained in an on state in the all pixel circuits each being connected to any one of the Q second scanning signal lines collectively driven.

A method for driving (for a display device) according to some other embodiments of the present disclosure is a method for driving a display device using a display element driven by a current, the display device including a display portion including a plurality of data signal lines, a plurality of first scanning signal lines, a plurality of second scanning signal lines, a plurality of third scanning signal lines, a plurality of first light emission control lines, a plurality of second light emission control lines, a first power source line, a second power source line, an initialization power source line, and a plurality of pixel circuits, a data-side drive circuit configured to apply data signals to the plurality of data signal lines, and a scanning-side drive circuit including a first scanning signal line drive circuit configured to selectively drive the plurality of first scanning signal lines, a second scanning signal line drive circuit configured to selectively drive the plurality of second scanning signal lines, a third scanning signal line drive circuit configured to selectively drive the plurality of third scanning signal lines, and a light emission control line drive circuit configured to selectively drive the plurality of first light emission control lines and the plurality of second light emission control lines, wherein each of the plurality of pixel circuits corresponds to one of the plurality of data signal lines, one of the plurality of first scanning signal lines, one of the plurality of second scanning signal lines, one of the plurality of third scanning signal lines, one of the plurality of first light emission control lines, and one of the plurality of second light emission control lines, each of the plurality of pixel circuits includes the display element including a first terminal, and a second terminal connected to the second power source line, a drive transistor including a control terminal, a first conduction terminal, and a second conduction terminal, and provided in series with the display element, a holding capacitor connected at one end to the control terminal of the drive transistor, a writing control transistor including a control terminal connected to a corresponding second scanning signal line, a first conduction terminal connected to a corresponding data signal line, and a second conduction terminal connected to the second conduction terminal of the drive transistor, a threshold voltage compensation transistor including a control terminal connected to a corresponding first scanning signal line, a first conduction terminal connected to the first conduction terminal of the drive transistor, and a second conduction terminal connected to the control terminal of the drive transistor, a power supply control transistor including a control terminal connected to a corresponding second light emission control line, a first conduction terminal connected to the first power source line, and a second conduction terminal connected to the first conduction terminal of the drive transistor, a light emission control transistor including a control terminal connected to a corresponding first light emission control line, a first conduction terminal connected to the second conduction terminal of the drive transistor, and a second conduction terminal connected to the first terminal of the display element, and an initialization transistor including a control terminal connected to a corresponding third scanning signal line, a first conduction terminal connected to the first terminal of the display element, and a second conduction terminal connected to the initialization power source line, the first scanning signal line drive circuit is constituted by a shift register including unit circuits equal in number to a number of the plurality of first scanning signal lines, the second scanning signal line drive circuit is constituted by a shift register including unit circuits equal in number to 1/Q of a number of the plurality of second scanning signal lines, where Q is an integer of 2 or greater, the third scanning signal line drive circuit is constituted by a shift register including unit circuits equal in number to 1/Q of a number of the plurality of third scanning signal lines, each of the unit circuits included in the shift register constituting the first scanning signal line drive circuit drives one corresponding first scanning signal line, each of the unit circuits included in the shift register constituting the second scanning signal line drive circuit collectively drives Q second scanning signal lines corresponding thereto and adjacent to each other, and each of the unit circuits included in the shift register constituting the third scanning signal line drive circuit collectively drives Q third scanning signal lines corresponding thereto and adjacent to each other, the method including:

a data writing step of writing the data signals to the plurality of pixel circuits; and a pause step of stopping the writing the data signals to the plurality of pixel circuits throughout a period of one frame period or longer, wherein, in the data writing step, after a holding voltage of the holding capacitor and a voltage of the first terminal of the display element are initialized in pixel circuits each being connected to any one of the Q second scanning signal lines collectively driven and connected to any one of the Q third scanning signal lines collectively driven by sequentially setting each of Q first scanning signal lines corresponding to the Q second scanning signal lines collectively driven to a select state for a predetermined period in a period during which the writing control transistor and the light emission control transistor are maintained in an off state and the power supply control transistor and the initialization transistor are maintained in an on state in all pixel circuits each being connected to any one of the Q second scanning signal lines collectively driven and connected to any one of the Q third scanning signal lines collectively driven, writing the data signals to the pixel circuits each being connected to any one of the Q second scanning signal lines collectively driven and connected to any one of the Q third scanning signal lines collectively driven is performed by sequentially setting each of the Q first scanning signal lines corresponding to the Q second scanning signal lines collectively driven to a select state for a predetermined period in a period during which the light emission control transistor and the power supply control transistor are maintained in an off state and the writing control transistor and the initialization transistor are maintained in an on state in the all pixel circuits each being connected to any one of the Q second scanning signal lines collectively driven and connected to any one of the Q third scanning signal lines collectively driven, and in the pause step, the threshold voltage compensation transistor and the writing control transistor are maintained in an off state and the power supply control transistor is maintained in an on state in the all pixel circuits each being connected to any one of the Q second scanning signal lines collectively driven and connected to any one of the Q third scanning signal lines collectively driven, and the voltage of the first terminal of the display element is initialized in the pixel circuits each being connected to any one of the Q second scanning signal lines collectively driven and connected to any one of the Q third scanning signal lines collectively driven by setting each of the Q third scanning signal lines corresponding to the Q second scanning signal lines collectively driven to a select state for a predetermined period and setting each of the Q first light emission control lines corresponding to the Q second scanning signal lines collectively driven to a non-select state for a predetermined period.

Advantageous Effects of Disclosure

According to some embodiments of the disclosure, the second scanning signal line drive circuit is constituted by the shift register including the unit circuits equal in number to 1/Q of the number of the second scanning signal lines, where Q is an integer of 2 or greater, so that Q second scanning signal lines are driven at a time. As a result, the area of the circuit region required around the periphery of the display portion for driving the second scanning signal lines is reduced. That is, it is possible to reduce the area of the frame region. From the above, the frame narrowing of a display device including a pixel circuit constituted by one display element (display element driven by a current), six transistors, and one holding capacitor is realized.

According to some other embodiments of the disclosure, the second scanning signal line drive circuit is constituted by the shift register including the unit circuits equal in number to 1/Q of the number of the second scanning signal lines, where Q is an integer of 2 or greater, so that Q second scanning signal lines are driven at a time, and the third scanning signal line drive circuit is constituted by the shift register including the unit circuits equal in number to 1/Q of the number of the third scanning signal lines so that Q third scanning signal lines are driven at a time. As a result, the area of the circuit region required around the periphery of the display portion for driving the second scanning signal lines and the third scanning signal lines is reduced. That is, it is possible to reduce the area of the frame region. From the above, the frame narrowing of a display device including a pixel circuit constituted by one display element (display element driven by a current), six transistors, and one holding capacitor is realized.

DESCRIPTION OF EMBODIMENTS

Embodiments will be described below with reference to the accompanying drawings. In a second embodiment and a third embodiment, only points different from those of a first embodiment will be mainly described, and description of points that are the same as those in the first embodiment will be omitted as appropriate. Note that the following description is based on the premise that i and j each represent an integer equal to or greater than 2. Further, in each of the following embodiments, an N-channel thin film transistor is used as a transistor, and thus a high level corresponds to an on level, and a low level corresponds to an off level.

1. First Embodiment

1.1 Overall Configuration

Figure 2:
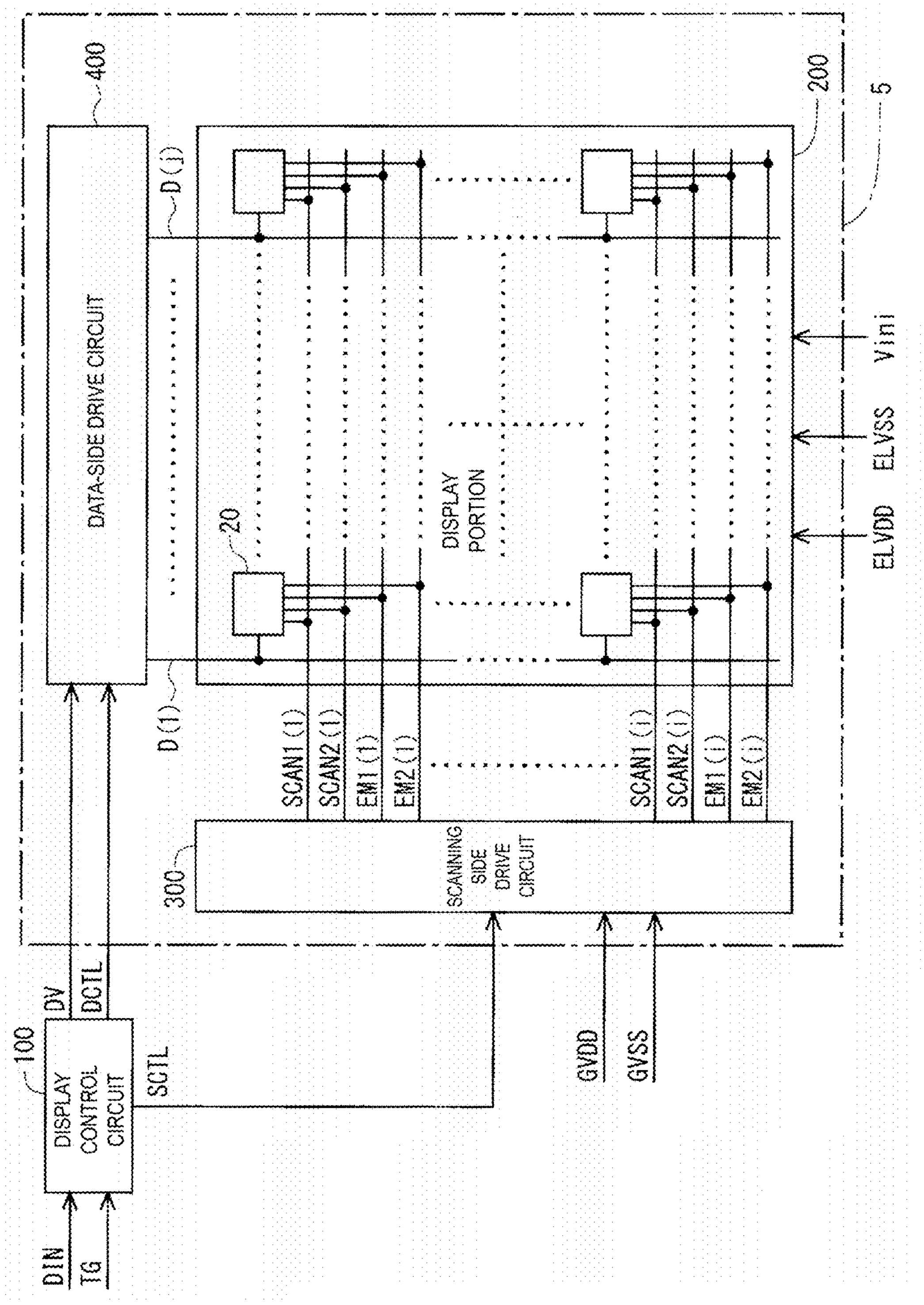
FIG. 2 is a block diagram illustrating an overall configuration of an organic electroluminescent (EL) display device according to the first embodiment.

FIG. 2 is a block diagram illustrating the overall configuration of an organic electroluminescent (EL) display device according to a first embodiment. As illustrated in FIG. 2, this organic EL display device includes a display control circuit 100, a display portion 200, a scanning-side drive circuit 300, and a data-side drive circuit 400. The scanning-side drive circuit 300 and the data-side drive circuit 400 are included in an organic EL display panel 5 including the display portion 200. In the present embodiment, the scanning-side drive circuit 300 is monolithic. The data-side drive circuit 400 may be monolithic or may not be monolithic.

In the display portion 200, i first scanning signal lines SCAN1(1) to SCAN1(*i*), i second scanning signal lines SCAN2(1) to SCAN2(*i*), i first light emission control lines EM1(1) to EM1(*i*), i second light emission control lines EM2(1) to EM2(*i*), and j data signal lines D(1) to D(j) are arranged. Each first scanning signal line SCAN1 transmits a first scanning signal, each second scanning signal line SCAN2 transmits a second scanning signal, each first light emission control line EM1 transmits a first light emission control signal, and each second light emission control line EM2 transmits a second light emission control signal. The display portion 200 is also provided with i×j pixel circuits 20. Each of the i×j pixel circuits 20 corresponds to one of the i first scanning signal lines SCAN1(1) to SCAN1(*i*), one of the i second scanning signal lines SCAN2(1) to SCAN2(*i*), one of the i first light emission control lines EM1(1) to EM1(*i*), one of the i second light emission control lines EM2(1) to EM2(*i*), and one of the j data signal lines D(1) to D(j). The first scanning signal lines SCAN1(1) to SCAN1(*i*), the second scanning signal lines SCAN2(1) to SCAN2(*i*), the first light emission control lines EM1(1) to EM1(*i*), and the second light emission control lines EM2(1) to EM2(*i*) are typically parallel to each other. The first scanning signal lines SCAN1(1) to SCAN1(*i*) and the data signal lines D(1) to D(j) are orthogonal to each other. Hereinafter, as necessary, the first scanning signals supplied to the first scanning signal lines SCAN1(1) to SCAN1(*i*) are also denoted by reference signs SCAN1(1) to SCAN1(*i*), the second scanning signals supplied to the second scanning signal lines SCAN2(1) to SCAN2(*i*) are also denoted by reference signs SCAN2(1) to SCAN2(*i*), the first light emission control signals supplied to the first light emission control lines EM1(1) to EM1(*i*) are also denoted by reference signs EM1(1) to EM1(*i*), the second light emission control signals supplied to the second light emission control lines EM2(1) to EM2(*i*) are also denoted by reference signs EM2(1) to EM2(*i*), and the data signals supplied to the data signal lines D(1) to D(j) are also denoted by reference signs D(1) to D(j).

Furthermore, in the display portion 200, power source lines (not illustrated) common to each of the pixel circuits 20 are also arranged. To be more specific, a power source line which supplies a high-level power supply voltage ELVDD for driving the organic EL element (hereinafter, referred to as a "high-level power source line"), a power source line which supplies a low-level power supply voltage ELVSS for driving the organic EL element (hereinafter, referred to as a "low-level power source line"), and a power source line which supplies an initialization voltage Vini (hereinafter, referred to as an "initialization power source line") are disposed. The high-level power supply voltage ELVDD, the low-level power supply voltage ELVSS, and the initialization voltage Vini are supplied from a power source circuit (not illustrated). Note that the high-level power source line corresponds to a first power source line, and the low-level power source line corresponds to a second power source line.

Operations of the constituent elements illustrated in FIG. 2 will be described below. The display control circuit 100 receives an input image signal DIN and a timing signal group (such as a horizontal synchronization signal and a vertical synchronization signal) TG that are transmitted from the outside, and outputs a digital video signal DV, a control signal SCTL configured to control operations of the scanning-side drive circuit 300, and a control signal DCTL configured to control operations of the data-side drive circuit 400.

The scanning-side drive circuit 300 is connected to the first scanning signal lines SCAN1(1) to SCAN1(*i*), the second scanning signal lines SCAN2(1) to SCAN2(*i*), the first light emission control lines EM1(1) to EM1(*i*), and the second light emission control lines EM2(1) to EM2(*i*). On the basis of the control signal SCTL output from the display control circuit 100, the scanning-side drive circuit 300 applies first scanning signals to the first scanning signal lines SCAN1(1) to SCAN1(*i*), applies second scanning signals to the second scanning signal lines SCAN2(1) to SCAN2(*i*), applies first light emission control signals to the first light emission control lines EM1(1) to EM1(*i*), and applies second light emission control signals to the second light emission control lines EM2(1) to EM2(*i*). Note that the scanning-side drive circuit 300 is also supplied with a high-level power supply voltage GVDD and a low-level power supply voltage GVSS for controlling the operations of each unit circuit described below. The detailed configuration and operations of the scanning-side drive circuit 300 will be described below.

The data-side drive circuit 400 is connected to the data signal lines D(1) to D(j). The data-side drive circuit 400 includes a j-bit shift register, a sampling circuit, a latch circuit, and j D/A converters, which are not illustrated. The shift register includes j registers cascade-connected to each other. The shift register sequentially transfers a start pulse included in the control signal DCTL from an input terminal (register of first stage) to an output terminal (register of last stage) on the basis of a clock signal included in the control signal DCTL. As a result, sampling pulses are output from respective stages of the shift register. The sampling circuit stores the digital video signal DV based on the sampling pulses. The latch circuit acquires and holds the digital video signals DV for one row stored in the sampling circuit in accordance with a latch strobe signal included in the control signal DCTL. The D/A converters are provided correspondingly to the respective data signal lines D(1) to D(j). The D/A converters convert the digital video signals DV held in the latch circuit into analog voltages. The converted analog voltages are simultaneously applied, as data signals, to all of the data signal lines D(1) to D(j).

With the data signals being applied to the data signal lines D(1) to D(j), the first scanning signals being applied to the first scanning signal lines SCAN1(1) to SCAN1(*i*), the second scanning signals being applied to the second scanning signal lines SCAN2(1) to SCAN2(*i*), the first light emission control signals being applied to the first light emission control lines EM1(1) to EM1(*i*), and the second light emission control signals being applied to the second light emission control lines EM2(1) to EM2(*i*) as described above, an image based on the input image signal DIN is displayed on the display portion 200.

1.2 Configuration and Operations of Pixel Circuit

Next, a configuration of the pixel circuit 20 in the display portion 200 will be described. The pixel circuit 20 illustrated in FIG. 3 includes one organic EL element (organic light-emitting diode) 21 as the display element, six transistors T1 to T6 (a writing control transistor T1, a drive transistor T2, a threshold voltage compensation transistor T3, a power supply control transistor T4, a light emission control transistor T5, and an initialization transistor T6), and one holding capacitor Cst. In the present embodiment, the transistors T1 to T6 are thin film transistors including channel regions formed of oxide semiconductors (hereinafter referred to as "oxide TFTs"), and are N-channel transistors. As the oxide TFT, typically, a thin film transistor including a channel region formed of an oxide semiconductor including indium, gallium, zinc, and oxygen is employed. The holding capacitor Cst is a capacitance element including two electrodes (first electrode and second electrode).

In the writing control transistor T1, a control terminal is connected to the second scanning signal line SCAN2, a first conduction terminal is connected to the data signal line D, and a second conduction terminal is connected to a second conduction terminal of the drive transistor T2 and a first conduction terminal of the light emission control transistor T5. In the drive transistor T2, a control terminal is connected to a second conduction terminal of the threshold voltage compensation transistor T3 and a first electrode of the holding capacitor Cst, a first conduction terminal is connected to a first conduction terminal of the threshold voltage compensation transistor T3 and a second conduction terminal of the power supply control transistor T4, and the second conduction terminal is connected to the second conduction terminal of the writing control transistor T1 and the first conduction terminal of the light emission control transistor T5. In the threshold voltage compensation transistor T3, a control terminal is connected to the first scanning signal line SCAN1, the first conduction terminal is connected to the second conduction terminal of the power supply control transistor T4 and the first conduction terminal of the drive transistor T2, and the second conduction terminal is connected to the control terminal of the drive transistor T2 and the first electrode of the holding capacitor Cst.

In the power supply control transistor T4, a control terminal is connected to the second light emission control line EM2, a first conduction terminal is connected to the high-level power source line, and the second conduction terminal is connected to the first conduction terminal of the drive transistor T2 and the first conduction terminal of the threshold voltage compensation transistor T3. In the light emission control transistor T5, a control terminal is connected to the first light emission control line EM1, the first conduction terminal is connected to the second conduction terminal of the writing control transistor T1 and the second conduction terminal of the drive transistor T2, and a second conduction terminal is connected to a first conduction terminal of the initialization transistor T6, an anode terminal of the organic EL element 21, and a second electrode of the holding capacitor Cst. In the initialization transistor T6, a control terminal is connected to the first scanning signal line SCAN1, the first conduction terminal is connected to the second conduction terminal of the light emission control transistor T5, the anode terminal of the organic EL element 21, and the second electrode of the holding capacitor Cst, and a second conduction terminal is connected to the initialization power source line.

In the holding capacitor Cst, the first electrode is connected to the control terminal of the drive transistor T2 and the second conduction terminal of the threshold voltage compensation transistor T3, and the second electrode is connected to the second conduction terminal of the light emission control transistor T5, the first conduction terminal of the initialization transistor T6, and the anode terminal of the organic EL element 21. In the organic EL element 21, the anode terminal is connected to the second conduction terminal of the light emission control transistor T5, the first conduction terminal of the initialization transistor T6, and the second electrode of the holding capacitor Cst, and a cathode terminal is connected to the low-level power source line. In the organic EL element 21, the anode terminal corresponds to a first terminal, and the cathode terminal corresponds to a second terminal.

Figure 3:
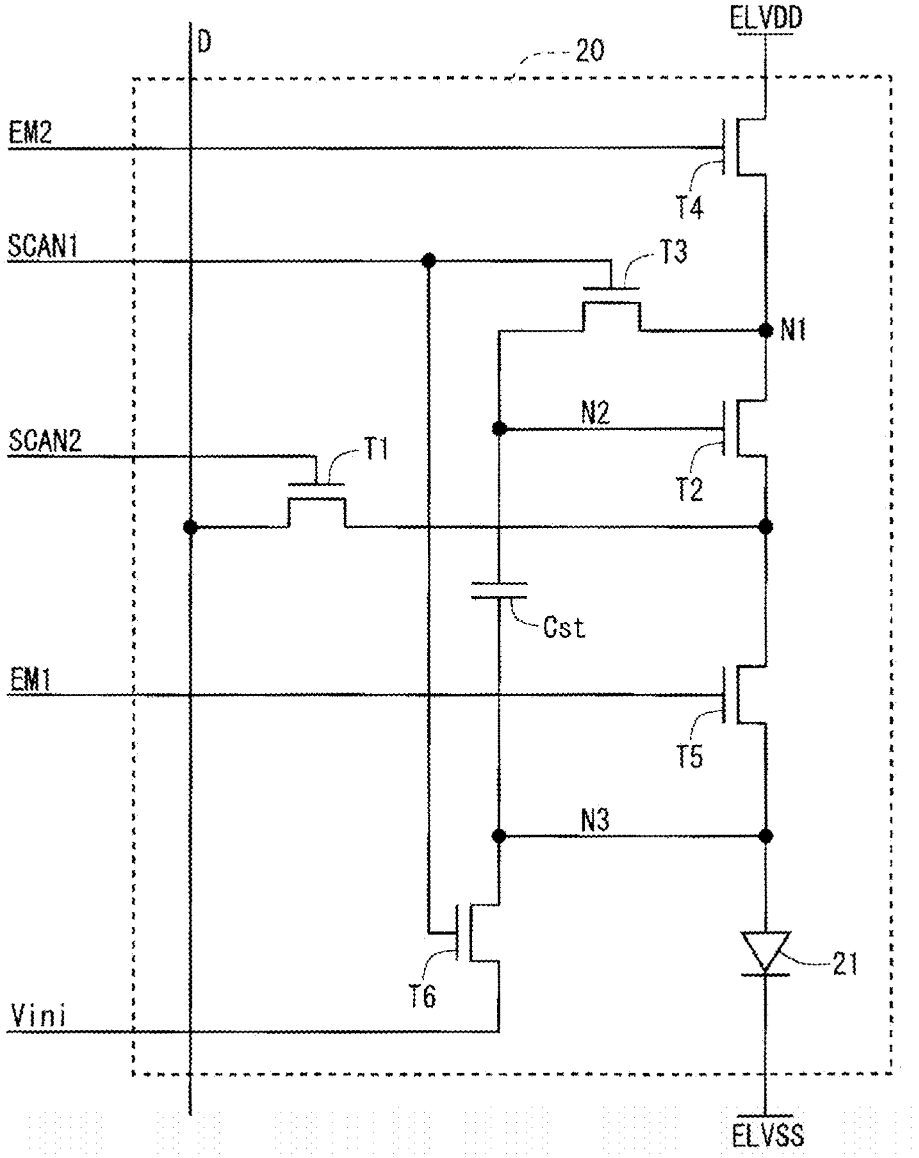
FIG. 3 is a circuit diagram illustrating a configuration of a pixel circuit according to the first embodiment.

Note that, in FIG. 3, a node connected to the first conduction terminal of the drive transistor T2, the first conduction terminal of the threshold voltage compensation transistor T3, and the second conduction terminal of the power supply control transistor T4 is denoted by reference sign N1, a node connected to the control terminal of the drive transistor T2, the second conduction terminal of the threshold voltage compensation transistor T3, and the first electrode of the holding capacitor Cst is denoted by reference sign N2, and a node connected to the second conduction terminal of the light emission control transistor T5, the first conduction terminal of the initialization transistor T6, the anode terminal of the organic EL element 21, and the second electrode of the holding capacitor Cst is denoted by reference sign N3.

In the present embodiment, pause driving (also referred to as intermittent driving or low-frequency driving) is employed to realize low power consumption. Pause driving is a driving method in which a drive period (refresh period) and a pause period (non-refresh period) are provided when the same image is continuously displayed, and a drive circuit is activated in the drive period and operations of the drive circuit are stopped in the pause period. In this way, in the pause period, the writing of the data signals D to all pixel circuits 20 is stopped throughout a period of one frame period or longer. Pause driving can be applied when the off-leak characteristics of the transistor in the pixel circuit 20 is favorable (off-leak current is small). Accordingly, as described above, for the transistors T1 to T6 in the pixel circuit 20 according to the present embodiment, oxide TFTs are adopted.

Operations of the pixel circuit 20 illustrated in FIG. 3 will now be described. As described below, the first scanning signal lines SCAN1(1) to SCAN1($i$) are driven one by one, but the second scanning signal lines SCAN2(1) to SCAN2 ($i$), the first light emission control lines EM1(1) to EM1($i$), and the second light emission control lines EM2(1) to EM2($i$) are driven two by two. Accordingly, herein, n is an even number, and the focus is placed on the pixel circuit 20 in the (n−1)-th row and the pixel circuit 20 in the n-th row, which are two pixel circuits 20 adjacent to each other in an extending direction of the data signal line D. For convenience, the pixel circuit 20 in the (n−1)-th row is referred to as a "first pixel circuit," and the pixel circuit 20 in the n-th row is referred to as a "second pixel circuit."

Figure 4:
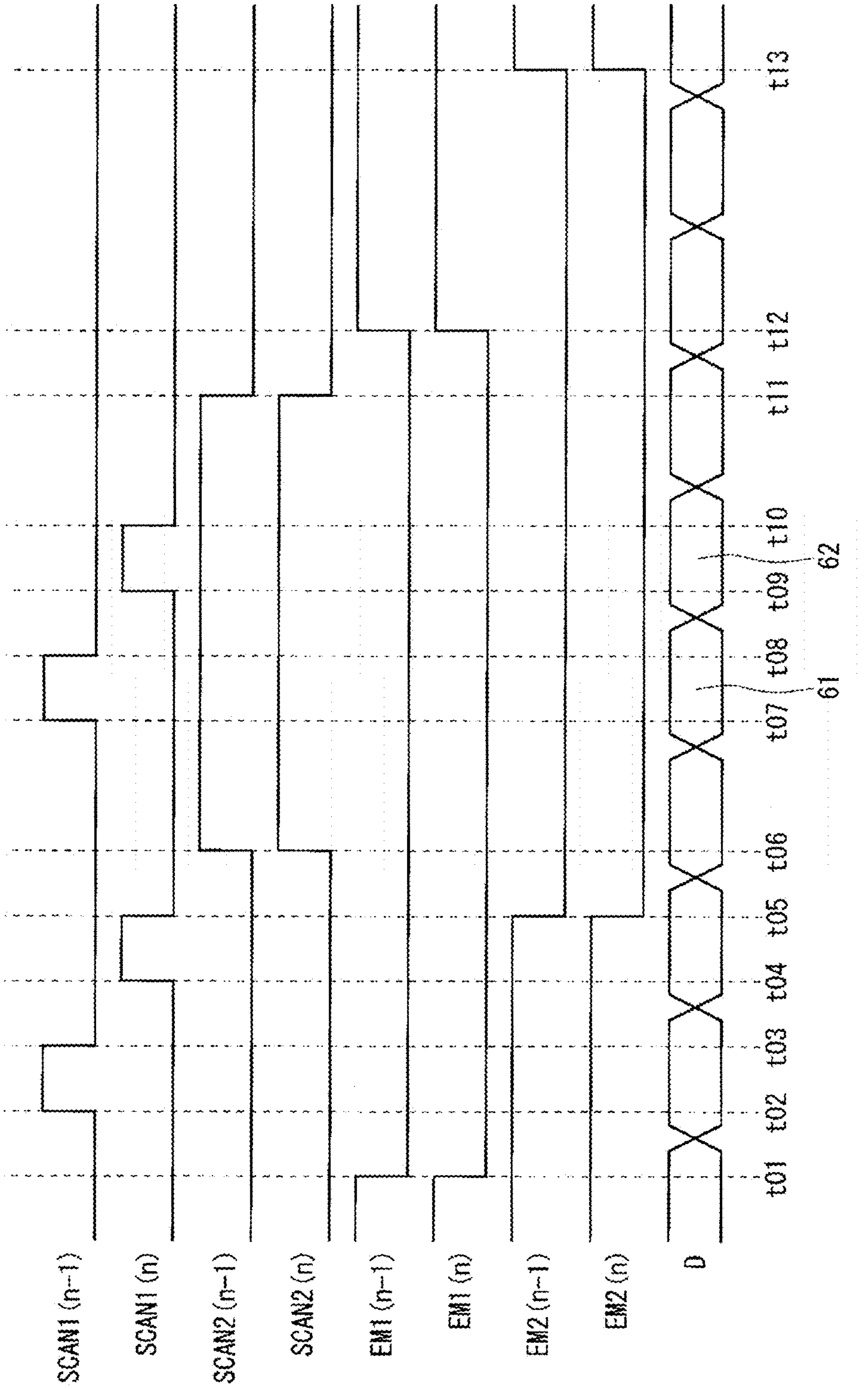
FIG. 4 is a timing chart for describing operations of the pixel circuit in a drive period according to the first embodiment.

First, the operations of the pixel circuit 20 in the drive period will be described with reference to a timing chart illustrated in FIG. 4. Note that, in FIG. 4, lengths of the periods during which each signal is maintained at a high level or a low level are not exactly illustrated (the same applies to other drawings illustrating timing charts). Data writing step is realized by the operations in this drive period.

At a time point immediately before time t01, the first scanning signal SCAN1($n$−1), the first scanning signal SCAN1($n$), the second scanning signal SCAN2($n$−1), and the second scanning signal SCAN2($n$) are at a low level, and the first light emission control signal EM1($n$−1), the first light emission control signal EM1($n$), the second light emission control signal EM2($n$−1), and the second light emission control signal EM2($n$) are at a high level. At this time, in the first pixel circuit and the second pixel circuit, the writing control transistor T1, the threshold voltage compensation transistor T3, and the initialization transistor T6 are in an off state, and the power supply control transistor T4 and the light emission control transistor T5 are in an on state. Accordingly, the organic EL element 21 emits light in accordance with the magnitude of the drive current.

At time t01, the first light emission control signal EM1 ($n$−1) and the first light emission control signal EM1($n$) change from a high level to a low level. This places the light emission control transistor T5 in the first pixel circuit and the second pixel circuit in an off state. As a result, the supply of current to the organic EL element 21 is cut off, switching the organic EL element 21 off.

At time t02, the first scanning signal SCAN1($n$−1) changes from a low level to a high level. This places the threshold voltage compensation transistor T3 and the initialization transistor T6 in the first pixel circuit in an on state. At this time, the power supply control transistor T4 is maintained in an on state. From the above, in the first pixel circuit, the high-level power supply voltage ELVDD is supplied to the node N2, and the initialization voltage Vini is supplied to the node N3. As a result, in the first pixel circuit, a holding voltage of the holding capacitor Cst and an anode voltage of the organic EL element 21 are initialized.

At time t03, the first scanning signal SCAN1(*n*−1) changes from a high level to a low level. This places the threshold voltage compensation transistor T3 and the initialization transistor T6 in the first pixel circuit in an off state.

At time t04, the first scanning signal SCAN1(*n*) changes from a low level to a high level. This places the threshold voltage compensation transistor T3 and the initialization transistor T6 in the second pixel circuit in an on state. At this time, the power supply control transistor T4 is maintained in an on state. From the above, in the second pixel circuit, the high-level power supply voltage ELVDD is supplied to the node N2, and the initialization voltage Vini is supplied to the node N3. As a result, in the second pixel circuit, the holding voltage of the holding capacitor Cst and the anode voltage of the organic EL element 21 are initialized.

At time t05, the first scanning signal SCAN1(*n*) changes from a high level to a low level. This places the threshold voltage compensation transistor T3 and the initialization transistor T6 in the second pixel circuit in an off state. Further, at time t05, the second light emission control signal EM2(*n*−1) and the second light emission control signal EM2(*n*) change from a high level to a low level. This places the power supply control transistor T4 in the first pixel circuit and the second pixel circuit in an off state.

At time t06, the second scanning signal SCAN2(*n*−1) and the second scanning signal SCAN2(*n*) change from a low level to a high level. This places the writing control transistor T1 in the first pixel circuit and the second pixel circuit in an on state.

At time t07, the first scanning signal SCAN1(*n*−1) changes from a low level to a high level. This places the threshold voltage compensation transistor T3 and the initialization transistor T6 in the first pixel circuit in an on state. At this time, the power supply control transistor T4 and the light emission control transistor T5 are in an off state. From the above, in the first pixel circuit, the data signal D is supplied to the node N2 via the writing control transistor T1, the drive transistor T2, and the threshold voltage compensation transistor T3, and the initialization voltage Vini is supplied to the node N3 via the initialization transistor T6. As a result, in the first pixel circuit, the holding capacitor Cst is charged with a voltage corresponding to the data signal D so as to compensate for the variation in the threshold voltage of the drive transistor T2. Note that, in FIG. 4, a portion in which the data signal D is a voltage for the first pixel circuit is denoted by reference sign 61.

At time t08, the first scanning signal SCAN1(*n*−1) changes from a high level to a low level. This places the threshold voltage compensation transistor T3 and the initialization transistor T6 in the first pixel circuit in an off state.

At time t09, the first scanning signal SCAN1(*n*) changes from a low level to a high level. This places the threshold voltage compensation transistor T3 and the initialization transistor T6 in the second pixel circuit in an on state. At this time, the power supply control transistor T4 and the light emission control transistor T5 are in an off state. From the above, in the second pixel circuit, the data signal D is supplied to the node N2 via the writing control transistor T1, the drive transistor T2, and the threshold voltage compensation transistor T3, and the initialization voltage Vini is supplied to the node N3 via the initialization transistor T6. As a result, in the second pixel circuit, the holding capacitor Cst is charged with a voltage corresponding to the data signal D so as to compensate for the variation in the threshold voltage of the drive transistor T2. Note that, in FIG. 4, a portion in which the data signal D is a voltage for the second pixel circuit is denoted by reference sign 62.

At time t10, the first scanning signal SCAN1(*n*) changes from a high level to a low level. This places the threshold voltage compensation transistor T3 and the initialization transistor T6 in the second pixel circuit in an off state.

At time t11, the second scanning signal SCAN2(*n*−1) and the second scanning signal SCAN2(*n*) change from a high level to a low level. This places the writing control transistor T1 in the first pixel circuit and the second pixel circuit in an off state.

At time t12, the first light emission control signal EM1(*n*−1) and the first light emission control signal EM1(*n*) change from a low level to a high level. This places the light emission control transistor T5 in the first pixel circuit and the second pixel circuit in an on state. At this time, the power supply control transistor T4 is maintained in an off state. Accordingly, in the first pixel circuit and the second pixel circuit, the organic EL element 21 is maintained in an off state.

At time t13, the second light emission control signal EM2(*n*−1) and the second light emission control signal EM2(*n*) change from a low level to a high level. This places the power supply control transistor T4 in the first pixel circuit and the second pixel circuit in an on state. As a result, in the first pixel circuit and the second pixel circuit, a drive current corresponding to the charged voltage (holding voltage) of the holding capacitor Cst is supplied to the organic EL element 21, and the organic EL element 21 emits light in accordance with the magnitude of the drive current. Subsequently, in the first pixel circuit and the second pixel circuit, the organic EL element 21 emits light throughout the period until the first light emission control signal EM1(*n*−1) and the first light emission control signal EM1(*n*) next change from a high level to a low level.

Figure 5:
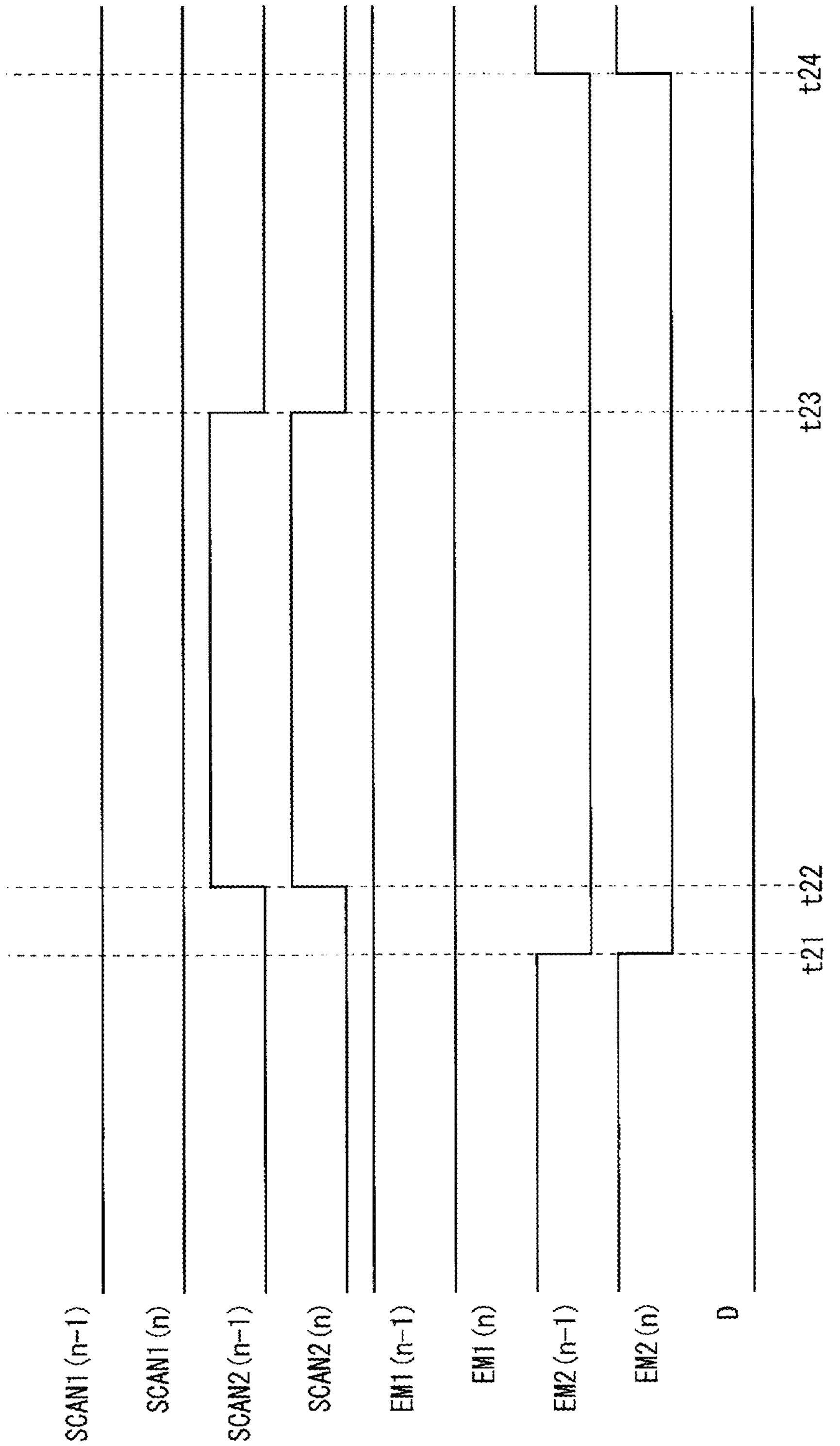
FIG. 5 is a timing chart for describing operations of the pixel circuit in a pause period according to the first embodiment.

Next, the operations of the pixel circuit 20 in the pause period will be described with reference to a timing chart illustrated in FIG. 5. Note that, throughout the pause period, an anode reset voltage (voltage for initializing the anode voltage of the organic EL element 21) is applied to the data signal line D. In the present embodiment, the low-level power supply voltage ELVSS is applied to the data signal line D as the anode reset voltage. Further, throughout the pause period, the first scanning signal SCAN1(*n*−1) and the first scanning signal SCAN1(*n*) are maintained at a low level, and the first light emission control signal EM1(*n*−1) and the first light emission control signal EM1(*n*) are maintained at a high level. The pause step is realized by the operations in the pause period.

At a time point immediately before time t21, in the first pixel circuit and the second pixel circuit, the organic EL element 21 emits light in accordance with the magnitude of the drive current similarly to the time point immediately before time t01 (refer to FIG. 4) in the drive period.

At time t21, the second light emission control signal EM2(*n*−1) and the second light emission control signal EM2(*n*) change from a high level to a low level. This places the power supply control transistor T4 in the first pixel circuit and the second pixel circuit in an off state. As a result, in the first pixel circuit and the second pixel circuit, the supply of current to the organic EL element 21 is cut off, switching the organic EL element 21 off.

At time t22, the second scanning signal SCAN2(*n*−1) and the second scanning signal SCAN2(*n*) change from a low level to a high level. This places the writing control transistor T1 in the first pixel circuit and the second pixel circuit in an on state. At this time, the light emission control transistor T5 is in an on state, and the low-level power supply voltage ELVSS is applied to the data signal line D as described above. From the above, the low-level power supply voltage ELVSS is supplied to the node N3 via the writing control transistor T1 and the light emission control transistor T5. As a result, in the first pixel circuit and the second pixel circuit, the anode voltage of the organic EL element 21 is initialized.

At time t23, the second scanning signal SCAN2(*n*−1) and the second scanning signal SCAN2(*n*) change from a high level to a low level. This places the writing control transistor T1 in the first pixel circuit and the second pixel circuit in an off state.

At time t24, the second light emission control signal EM2(*n*−1) and the second light emission control signal EM2(*n*) change from a low level to a high level. This places the power supply control transistor T4 in the first pixel circuit and the second pixel circuit in an on state. As a result, in the first pixel circuit and the second pixel circuit, a drive current corresponding to the charged voltage of the holding capacitor Cst is supplied to the organic EL element 21, and the organic EL element 21 emits light in accordance with the magnitude of the drive current. Subsequently, in the first pixel circuit and the second pixel circuit, the organic EL element 21 emits light throughout the period until the second light emission control signal EM2(*n*−1) and the second light emission control signal EM2(*n*) next change from a high level to a low level. In the pause period, the threshold voltage compensation transistor T3 is maintained in an off state, and thus the potential of the node N2 does not change. Accordingly, the charged voltage of the holding capacitor Cst is equal to the voltage charged in the holding capacitor Cst on the basis of the data signal D in the previous drive period.

1.3 Schematic Configuration of Scanning-Side Drive Circuit

Figure 1:
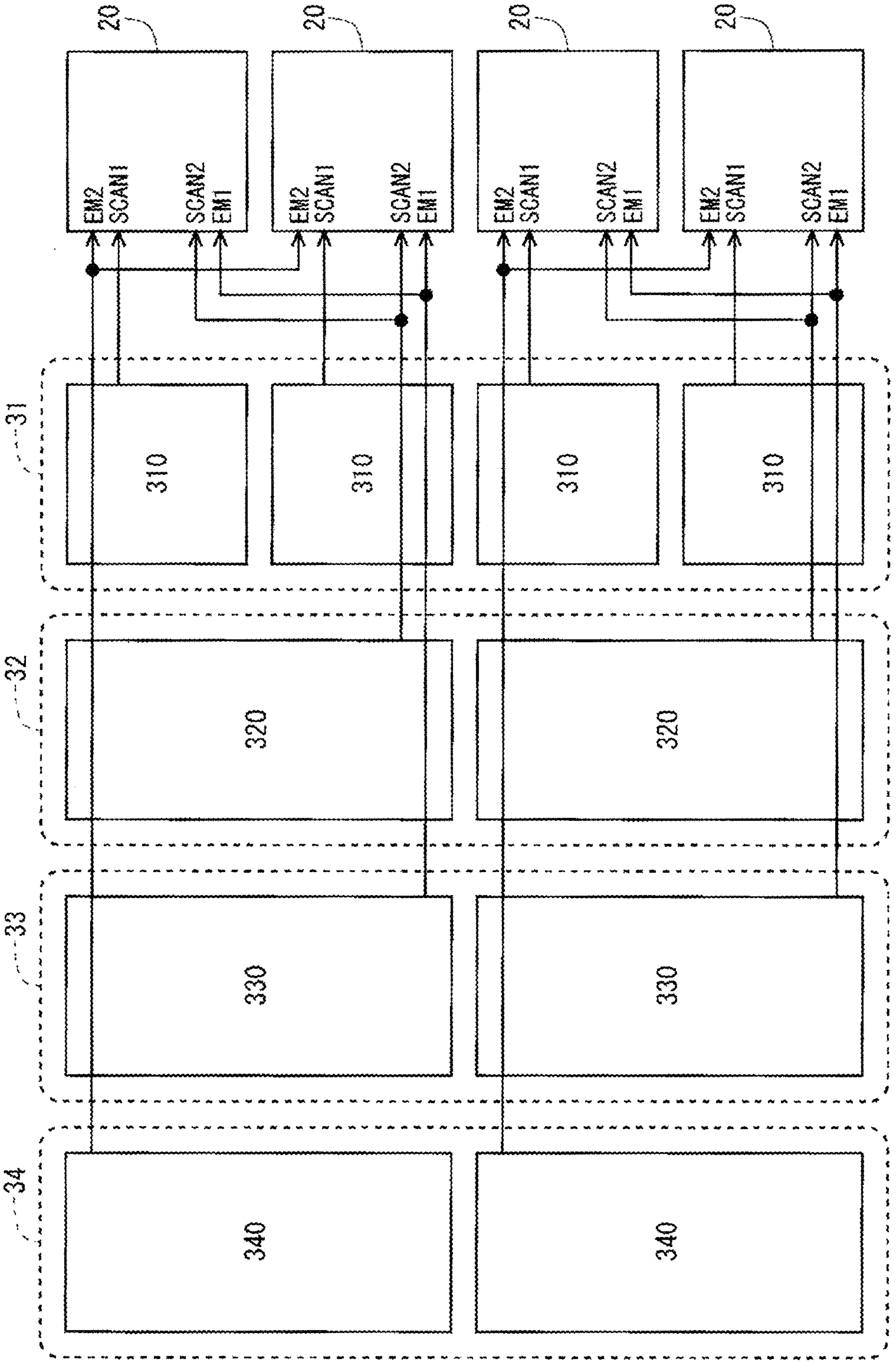
FIG. 1 is a block diagram illustrating a schematic configuration of a scanning-side drive circuit according to a first embodiment.

FIG. 1 is a block diagram illustrating a schematic configuration of the scanning-side drive circuit 300 in the present embodiment. The scanning-side drive circuit 300 is constituted by a first scanning signal line drive circuit 31, a second scanning signal line drive circuit 32, a first light emission control line drive circuit 33, and a second light emission control line drive circuit 34. The first scanning signal line drive circuit 31 applies the first scanning signals SCAN1 to the first scanning signal lines, the second scanning signal line drive circuit 32 applies the second scanning signals SCAN2 to the second scanning signal lines, the first light emission control line drive circuit 33 applies the first light emission control signals EM1 to the first light emission control lines, and the second light emission control line drive circuit 34 applies the second light emission control signals EM2 to the second light emission control lines.

The first scanning signal line drive circuit 31 is constituted by a shift register including unit circuits 310 equal in number to a number of the first scanning signal lines SCAN1. That is, each unit circuit included in the shift register constituting the first scanning signal line drive circuit 31 corresponds to one first scanning signal line SCAN1. Accordingly, the i first scanning signal lines SCAN1(1) to SCAN1(*i*) are driven one by one by the first scanning signal line drive circuit 31.

The second scanning signal line drive circuit 32 is constituted by a shift register including unit circuits 320 equal in number to half a number of the second scanning signal lines SCAN2. That is, each unit circuit included in the shift register constituting the second scanning signal line drive circuit 32 corresponds to two second scanning signal lines SCAN2. Accordingly, the i second scanning signal lines SCAN2(1) to SCAN2(*i*) are driven two by two by the second scanning signal line drive circuit 32.

The first light emission control line drive circuit 33 is constituted by a shift register including unit circuits 330 equal in number to half a number of the first light emission control lines EM1. That is, each unit circuit included in the shift register constituting the first light emission control line drive circuit 33 corresponds to two first light emission control lines EM1. Accordingly, the i first light emission control lines EM1(1) to EM1(*i*) are driven two by two by the first light emission control line drive circuit 33.

The second light emission control line drive circuit 34 is constituted by a shift register including unit circuits 340 equal in number to half a number of the second light emission control lines EM2. That is, each unit circuit included in the shift register constituting the second light emission control line drive circuit 34 corresponds to two second light emission control lines EM2. Accordingly, the i second light emission control lines EM2(1) to EM2(*i*) are driven two by two by the second light emission control line drive circuit 34.

1.4 First Scanning Signal Line Drive Circuit

1.4.1 Configuration of Shift Register

Figure 6:
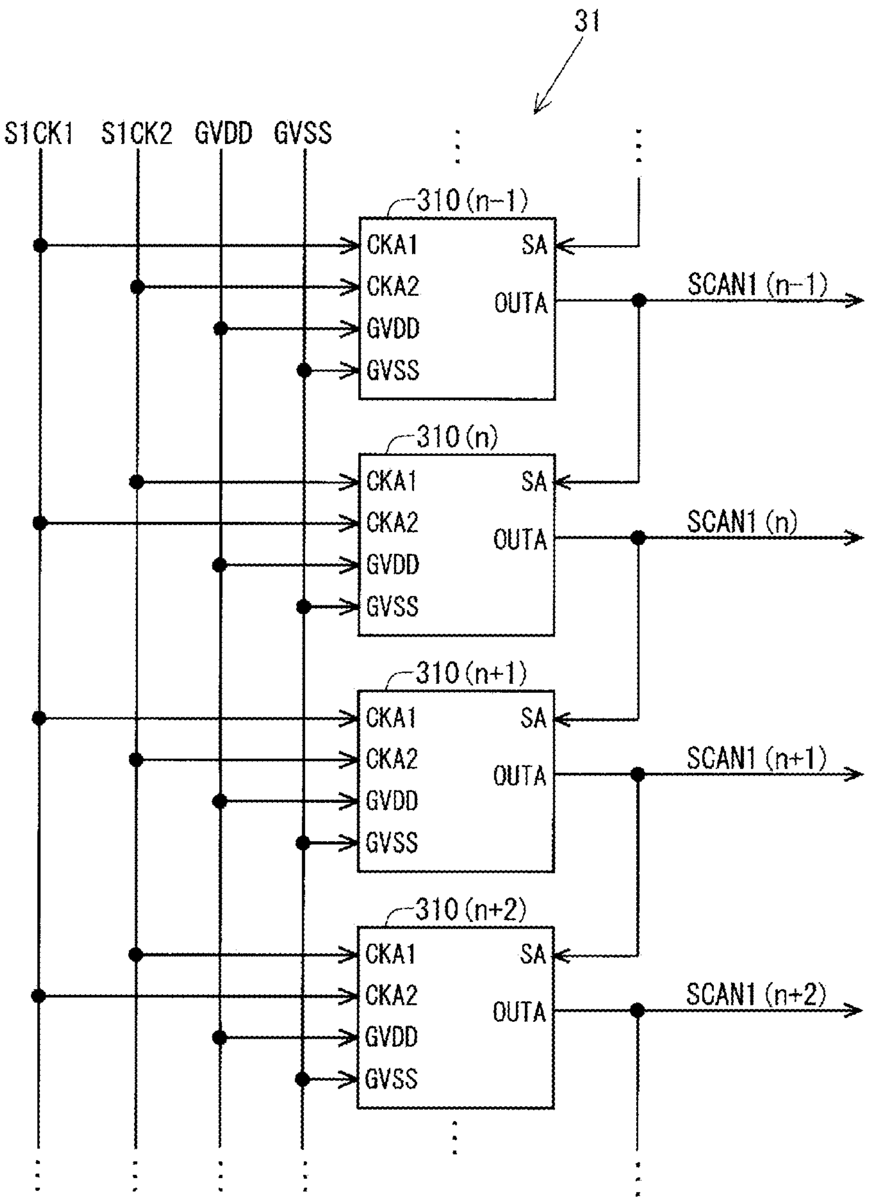
FIG. 6 is a block diagram illustrating a configuration of a first scanning signal line drive circuit according to the first embodiment.

FIG. 6 is a block diagram illustrating a configuration of the first scanning signal line drive circuit 31. The first scanning signal line drive circuit 31 is constituted by a shift register including i stages (i unit circuits 310) corresponding to the i first scanning signal lines SCAN1(1) to SCAN1(*i*) on a one-to-one basis. Note that FIG. 6 illustrates only the unit circuits 310(*n*−1), 310(*n*), 310(*n*+1), and 310(*n*+2) of the (n−1)th stage, the n-th stage, the (n+1)-th stage, and the (n+2)-th stage, where n is an even number.

The shift register constituting the first scanning signal line drive circuit 31 is supplied with a clock signal S1CK1, a clock signal S1CK2, a start pulse S1SP (not illustrated in FIG. 6), the high-level power supply voltage GVDD, and the low-level power supply voltage GVSS.

Each unit circuit 310 includes input terminals for respectively receiving a clock signal CKA1, a clock signal CKA2, a set signal SA, the high-level power supply voltage GVDD, and the low-level power supply voltage GVSS, and an output terminal for outputting an output signal OUTA.

The unit circuits 310 at odd-numbered stages are supplied with the clock signal S1CK1 as the clock signal CKA1, and are supplied with the clock signal S1CK2 as the clock signal CKA2. The unit circuits 310 at even-numbered stages are supplied with the clock signal S1CK2 as the clock signal CKA1, and are supplied with the clock signal S1CK1 as the clock signal CKA2. The high-level power supply voltage GVDD and the low-level power supply voltage GVSS are commonly supplied to all unit circuits 310. Further, the unit circuit 310 at each stage is supplied with the output signal OUTA from the unit circuit 310 of the preceding stage as the set signal SA. However, a unit circuit 310(1) at the first stage is supplied with the start pulse S1SP as the set signal SA.

The output signal OUTA from the unit circuit 310 at each stage is supplied to the corresponding first scanning signal line SCAN1 as the first scanning signal and to the unit circuit 310 of the next stage as the set signal SA.

1.4.2 Configuration of Unit Circuit

Figure 7:
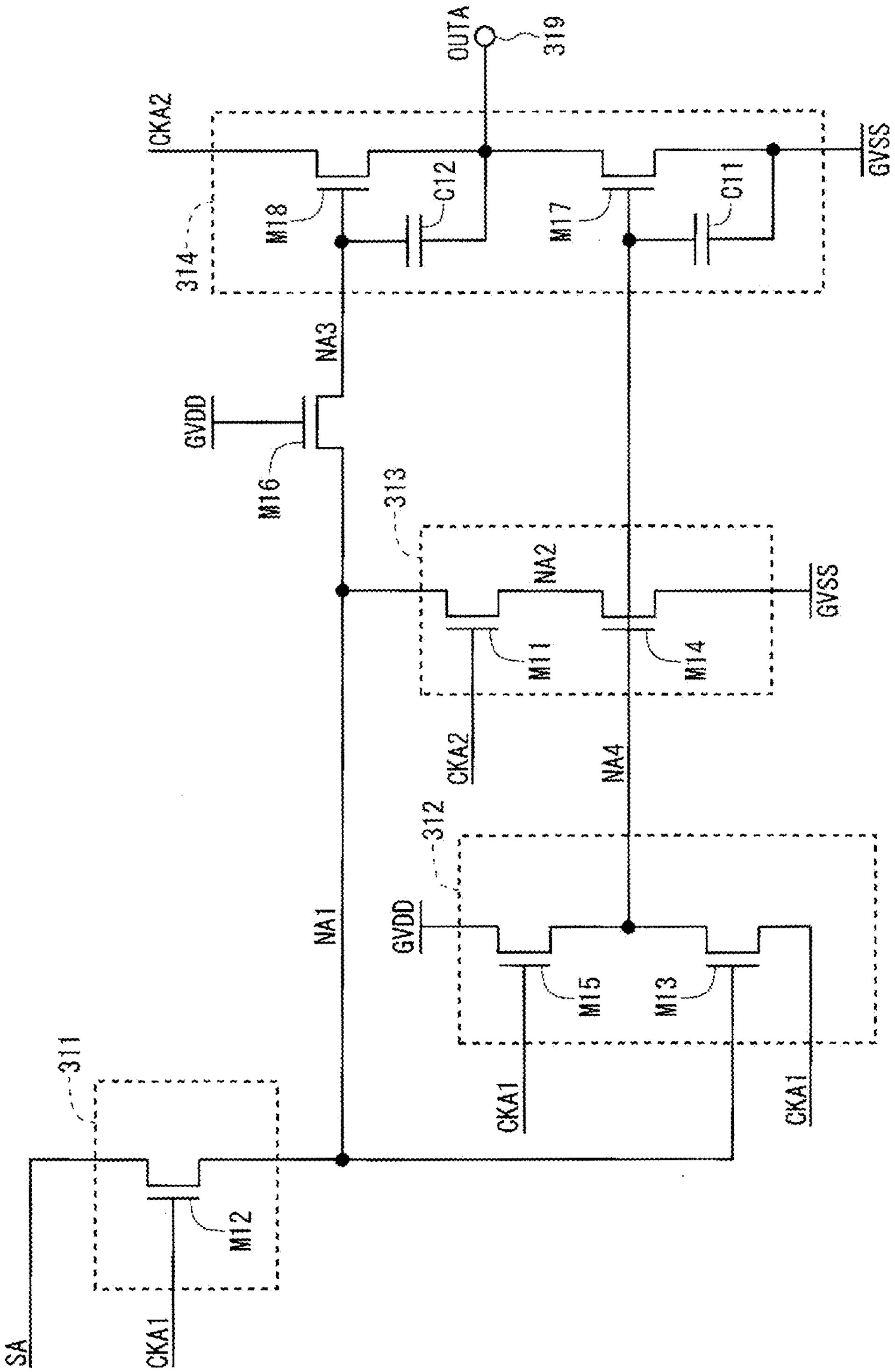
FIG. 7 is a circuit diagram illustrating a configuration of a unit circuit included in a shift register constituting the first scanning signal line drive circuit according to the first embodiment.

FIG. 7 is a circuit diagram illustrating a configuration of the unit circuit 310. As illustrated in FIG. 7, the unit circuit 310 includes eight transistors M11 to M18 and two capacitors C11, C12. The transistors M11 to M18 are N-channel type oxide TFTs. Note that, in FIG. 7, the output terminal outputting the output signal OUTA is denoted by reference sign 319.

In FIG. 7, a node connected to a first conduction terminal of the transistor M11, a second conduction terminal of the transistor M12, a control terminal of the transistor M13, and a first conduction terminal of the transistor M16 is denoted by reference sign NA1, a node connected to a second conduction terminal of the transistor M11 and a first conduction terminal of the transistor M14 is denoted by reference sign NA2, a node connected to a second conduction terminal of the transistor M16, a control terminal of the transistor M18, and a first electrode of the capacitor C12 is denoted by reference sign NA3, and a node connected to a first conduction terminal of the transistor M13, a control terminal of the transistor M14, a second conduction terminal of the transistor M15, a control terminal of a transistor M17, and a first electrode of the capacitor C11 is denoted by the reference sign NA4.

The unit circuit 310 includes three control circuits 311 to 313 and one output circuit 314. The control circuit 311 includes the transistor M12. The control circuit 312 includes the transistor M13 and the transistor M15. The control circuit 313 includes the transistor M11 and the transistor M14. The output circuit 314 includes the transistor M17, the transistor M18, the capacitor C11, and the capacitor C12.

In the transistor M11, a control terminal is supplied with the clock signal CKA2, the first conduction terminal is connected to the node NA1, and the second conduction terminal is connected to the node NA2. In the transistor M12, a control terminal is supplied with the clock signal CKA1, a first conduction terminal is supplied with the set signal SA, and the second conduction terminal is connected to the node NA1. In the transistor M13, the control terminal is connected to the node NA1, the first conduction terminal is connected to the node NA4, and a second conduction terminal is supplied with the clock signal CKA1. In the transistor M14, a control terminal is connected to the node NA4, the first conduction terminal is connected to the node NA2, and a second conduction terminal is supplied with the low-level power supply voltage GVSS.

In the transistor M15, a control terminal is supplied with the clock signal CKA1, a first conduction terminal is supplied with the high-level power supply voltage GVDD, and the second conduction terminal is connected to the node NA4. In the transistor M16, a control terminal is supplied with the high-level power supply voltage GVDD, the first conduction terminal is connected to the node NA1, and the second conduction terminal is connected to the node NA3. In the transistor M17, the control terminal is connected to the node NA4, a first conduction terminal is connected to the output terminal 319, and a second conduction terminal is connected to the low-level power supply voltage GVSS. In the transistor M18, the control terminal is connected to the node NA3, a first conduction terminal is supplied with the clock signal CKA2, and a second conduction terminal is connected to the output terminal 319.

In the capacitor C11, the first electrode is connected to the control terminal of the transistor M17 and a second electrode is connected to the second conduction terminal of the transistor M17. In the capacitor C12, the first electrode is connected to the control terminal of the transistor M18 and a second electrode is connected to the second conduction terminal of the transistor M18.

1.4.3 Operations of Unit Circuit

Figure 8:
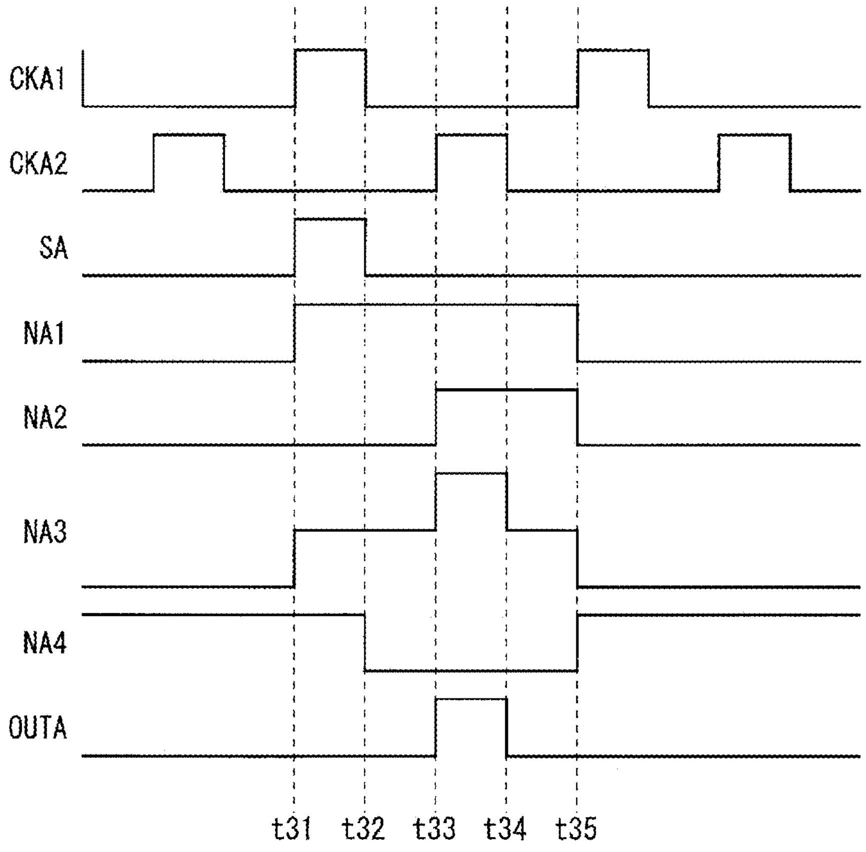
FIG. 8 is a timing chart for describing operations of the unit circuit included in the shift register constituting the first scanning signal line drive circuit according to the first embodiment.

Operations of the unit circuit 310 will now be described with reference to FIG. 8. At a time point immediately before time t31, potentials of the node NA1, the node NA2, and the node NA3 are at a low level, a potential of the node NA4 is at a high level, and the output signal OUTA is at a low level.

At time t31, the clock signal CKA1 changes from a low level to a high level. This places the transistor M12 in an on state. Further, at time t31, the set signal SA changes from a low level to a high level. This increases the potential of the node NA1. At this time, the transistor M16 is in an on state and, in association with the rise in the potential of the node NA1, the potential of the node NA3 also rises. As a result, the transistor M18 is placed in an on state. However, the clock signal CKA2 is maintained at a low level, and thus the output signal OUTA is maintained at a low level. Further, although the transistor M13 and the transistor M15 are placed in an on state, the potential of the node NA4 is maintained at a high level because the clock signal CKA1 is at a high level.

At time t32, the clock signal CKA1 changes from a high level to a low level. This places the transistor M12 and the transistor M15 in an off state. At this time, the transistor M13 is maintained in an on state and the clock signal CKA1 is at a low level, and thus the potential of the node NA4 changes from a high level to a low level. As a result, the transistor M14 and the transistor M17 are placed in an off state. Further, at time t32, the set signal SA changes from a high level to a low level.

At time t33, the clock signal CKA2 changes from a low level to a high level. At this time, the transistor M18 is in an on state, and thus the potential of the output terminal 319 (potential of the output signal OUTA) rises along with the rise of the potential of the first conduction terminal of the transistor M18. In association, the potential of the third node NA3 further rises via the capacitor C12. As a result, a large voltage is applied to the control terminal of the transistor M18, and the potential of the output signal OUTA rises to a level sufficient to place the threshold voltage compensation transistor T3 and the initialization transistor T6 (refer to FIG. 3) being connection destinations of the output terminal 319 in an on state. Note that, in the period from time t33 to time t34, the potential of the node NA3 becomes higher than the potential of the high-level power supply voltage GVDD. However, because the transistor M16 is placed in an off state, the potential of the node NA1 does not change. This prevents a high voltage from being applied to the first conduction terminal or the second conduction terminal of the transistors connected to the node NA1. Further, at time t33, the transistor M11 is placed in an on state. At this time, the potential of the node NA1 is at a high level, and thus the potential of the node NA2 is also placed at a high level.

At time t34, the clock signal CKA2 changes from a high level to a low level. At this time, the transistor M18 is in an on state, and thus the potential of the output terminal 319 (potential of the output signal OUTA) decreases along with the decrease of the potential of the first conduction terminal of the transistor M18. When the potential of the output terminal 319 decreases, the potential of the node NA3 also decreases via the capacitor C12.

At time t35, the clock signal CKA1 changes from a low level to a high level. This places the transistor M12 in an on state. At this time, the set signal SA is at a low level, and thus the potential of the node NA1 changes to a low level. In association, the potential of the node NA3 is also placed at a low level. With the potential of the node NA1 being placed at a low level, the transistor M13 changes to an off state. Further, at time t35, the clock signal CKA1 is placed at a high level, placing the transistor M15 in an on state. As a result, the potential of the node NA4 is placed at a high level, and the transistor M14 and the transistor M17 are placed in an on state. With the transistor M14 being placed in an on state, the potential of the node NA2 is placed at a low level, and with the transistor M17 being placed in an on state, the potential of the output terminal 319 (potential of the output signal OUTA) is maintained at a low level even if noise occurs.

Note that, in a period before time t31 and a period after time t35, the transistor M11 is placed in an on state when the clock signal CKA2 is placed at a high level. At this time, the transistor M14 is maintained in an on state and the potential of the node NA2 is maintained at a low level and thus, even if noise occurs, the potential of the node NA1 is reliably maintained at a low level. As a result, the occurrence of abnormal operation is suppressed.

1.5 Second Scanning Signal Line Drive Circuit

1.5.1 Configuration of Shift Register

Figure 9:
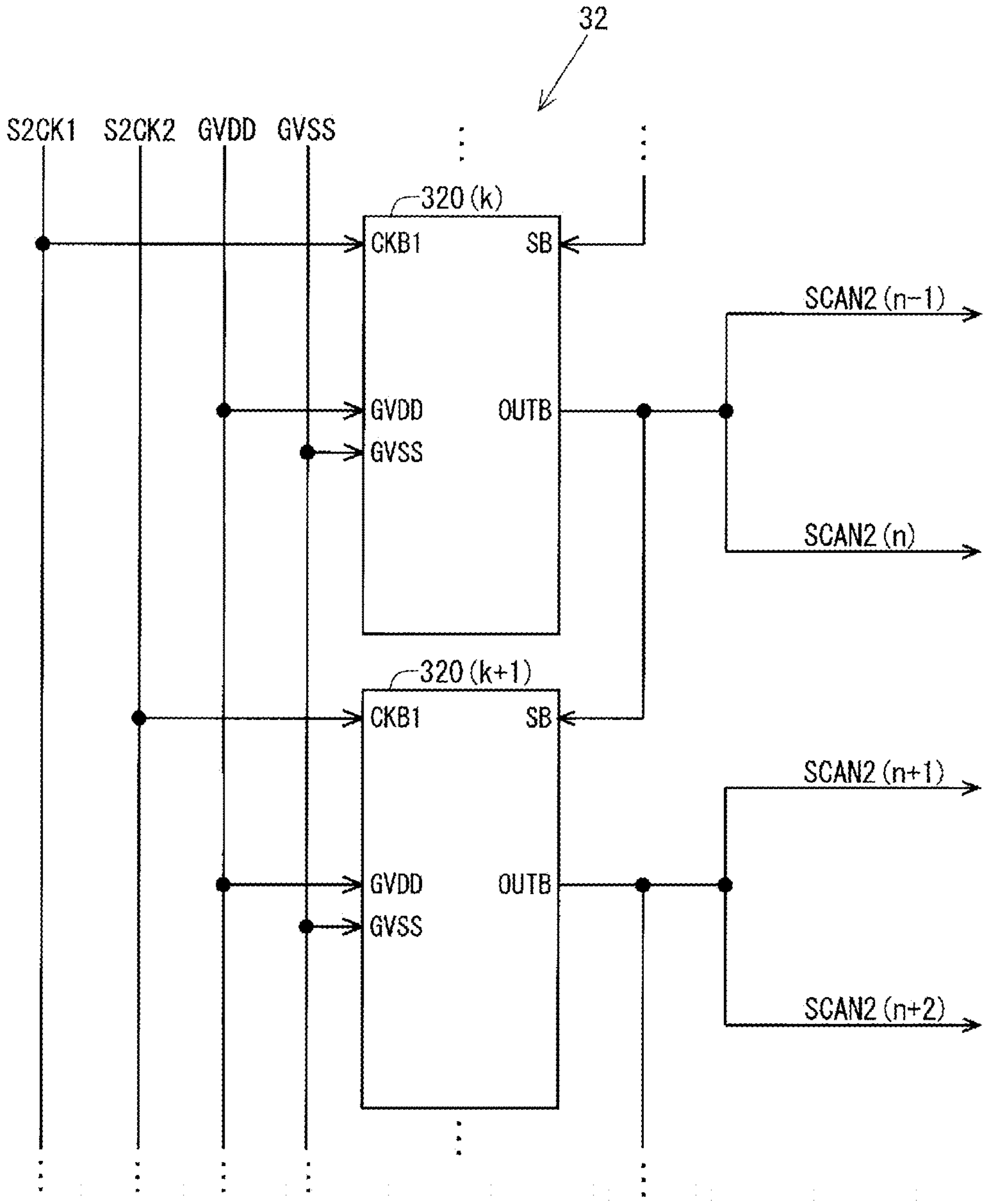
FIG. 9 is a block diagram illustrating a configuration of a second scanning signal line drive circuit according to the first embodiment.

FIG. 9 is a block diagram illustrating a configuration of the second scanning signal line drive circuit 32. Given p=i/2, the second scanning signal line drive circuit 32 is constituted by a shift register composed of p stages (p unit circuits 320). Each stage (each unit circuit 320) corresponds to two second scanning signal lines SCAN2 adjacent to each other. Note that, given k=n/2 and k is an odd number, only two unit circuits 320 (*k*) and 320(*k*+1) corresponding to four second scanning signal lines SCAN2(*n*−1) to SCAN2(*n*+2) are illustrated in FIG. 9.

A clock signal S2CK1, a clock signal S2CK2, a start pulse S2SP (not illustrated in FIG. 9), the high-level power supply voltage GVDD, and the low-level power supply voltage GVSS are supplied to the shift register constituting the second scanning signal line drive circuit 32.

Each unit circuit 320 includes input terminals for respectively receiving a clock signal CKB1, a set signal SB, the high-level power supply voltage GVDD, and the low-level power supply voltage GVSS, and an output terminal for outputting an output signal OUTB.

The unit circuits 320 at odd-numbered stages are supplied with the clock signal S2CK1 as the clock signal CKB1. The unit circuits 320 at even-numbered stages are supplied with the clock signal S2CK2 as the clock signal CKB1. The high-level power supply voltage GVDD and the low-level power supply voltage GVSS are commonly supplied to all unit circuits 320. Further, the unit circuit 320 at each stage is supplied with the output signal OUTB from the unit circuit 320 of the preceding stage as the set signal SB. However, a unit circuit 320(1) at the first stage is supplied with the start pulse S2SP as the set signal SB. The output signal OUTB from the unit circuit 320 at each stage is supplied to the corresponding two second scanning signal lines SCAN2 as the second scanning signal and to the unit circuit 320 of the next stage as the set signal SB.

As described above, two second scanning signal lines SCAN2 adjacent to each other form one pair, and the second scanning signals SCAN2 having the same waveform are supplied to the two second scanning signal lines SCAN2 forming each pair.

1.5.2 Configuration of Unit Circuit

Figure 10:
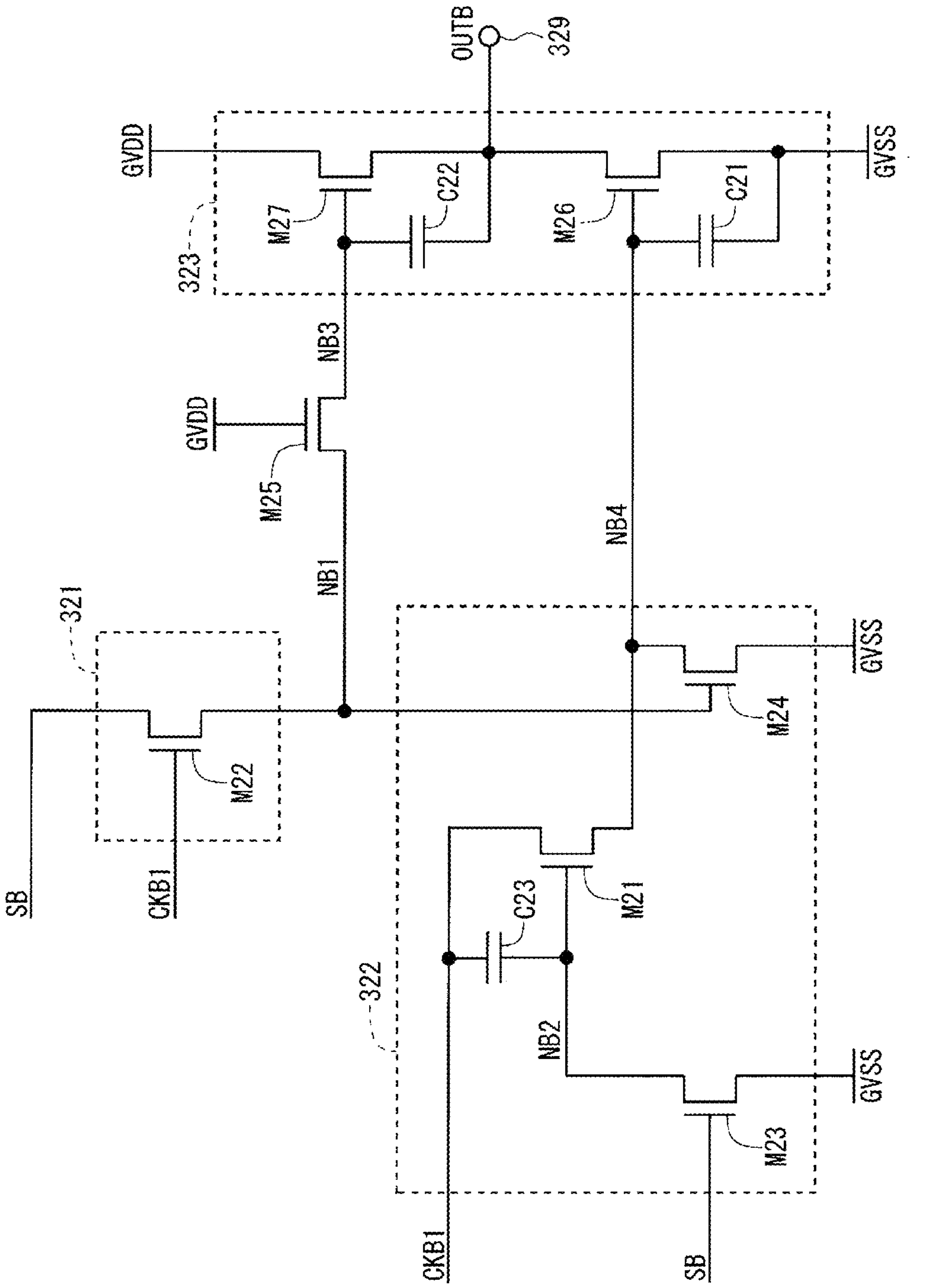
FIG. 10 is a circuit diagram illustrating a configuration of a unit circuit included in a shift register constituting the second scanning signal line drive circuit according to the first embodiment.

FIG. 10 is a circuit diagram illustrating a configuration of the unit circuit 320. As illustrated in FIG. 10, the unit circuit 320 includes seven transistors M21 to M27 and three capacitors C21 to C23. The transistors M21 to M27 are N-channel type oxide TFTs. Note that, in FIG. 10, the output terminal outputting the output signal OUTB is denoted by reference sign 329.

In FIG. 10, a node connected to a second conduction terminal of the transistor M22, a control terminal of the transistor M24, and a first conduction terminal of the transistor M25 is denoted by reference sign NB1, a node connected to a control terminal of the transistor M21, a first conduction terminal of the transistor M23, and a first electrode of the capacitor C23 is denoted by reference sign NB2, a node connected to a second conduction terminal of the transistor M25, a control terminal of the transistor M27, and a first electrode of the capacitor C22 is denoted by reference sign NB3, and a node connected to a second conduction terminal of the transistor M21, a first conduction terminal of the transistor M24, a control terminal of the transistor M26, and a first electrode of the capacitor C21 is denoted by reference sign NB4.

The unit circuit 320 includes two control circuits 321, 322 and one output circuit 323. The control circuit 321 includes the transistor M22. The control circuit 322 includes the transistor M21, the transistor M23, the transistor M24, and the capacitor C23. The output circuit 323 includes the transistor M26, the transistor M27, the capacitor C21, and the capacitor C22.

In the transistor M21, the control terminal is connected to the node NB2, a first conduction terminal is supplied with the clock signal CKB1, and the second conduction terminal is connected to the node NB4. In the transistor M22, a control terminal is supplied with the clock signal CKB1, a first conduction terminal is supplied with the set signal SB, and the second conduction terminal is connected to the node NB1. In the transistor M23, a control terminal is supplied with the set signal SB, the first conduction terminal is connected to the node NB2, and a second conduction terminal is supplied with the low-level power supply voltage GVSS. In the transistor M24, the control terminal is connected to the node NB1, the first conduction terminal is connected to the node NB4, and a second conduction terminal is connected to the low-level power supply voltage GVSS.

In the transistor M25, a control terminal is supplied with the high-level power supply voltage GVDD, the first conduction terminal is connected to the node NB1, and the second conduction terminal is connected to the node NB3. In the transistor M26, the control terminal is connected to the node NB4, a first conduction terminal is connected to the output terminal 329, and a second conduction terminal is connected to the low-level power supply voltage GVSS. In the transistor M27, the control terminal is connected to the node NB3, a first conduction terminal is supplied with the high-level power supply voltage GVDD, and a second conduction terminal is connected to the output terminal 329.

In the capacitor C21, the first electrode is connected to the control terminal of the transistor M26 and a second electrode is connected to the second conduction terminal of the transistor M26. In the capacitor C22, the first electrode is connected to the control terminal of the transistor M27 and a second electrode is connected to the second conduction terminal of the transistor M27. In the capacitor C23, a first electrode is connected to the control terminal of the transistor M21 and a second electrode is connected to the first conduction terminal of the transistor M21. Note that it is assumed that a capacitance of the capacitor C23 is sufficiently larger than a parasitic capacitance of the node NB2.

In the present embodiment, a first transistor is realized by the transistor M21, a second transistor is realized by the transistor M22, a third transistor is realized by the transistor M23, a fourth transistor is realized by the transistor M24, a fifth transistor is realized by the transistor M25, a sixth transistor is realized by the transistor M26, a seventh transistor is realized by the transistor M27, a first capacitor is realized by the capacitor C21, a second capacitor is realized by the capacitor C22, a third capacitor is realized by the capacitor C23, a first internal node is realized by the node NB1, a second internal node is realized by the node NB2, a third internal node is realized by the node NB3, a fourth internal node is realized by the node NB4, and a control clock signal is realized by the clock signal CKB1.

1.5.3 Operations of Unit Circuit

Figure 11:
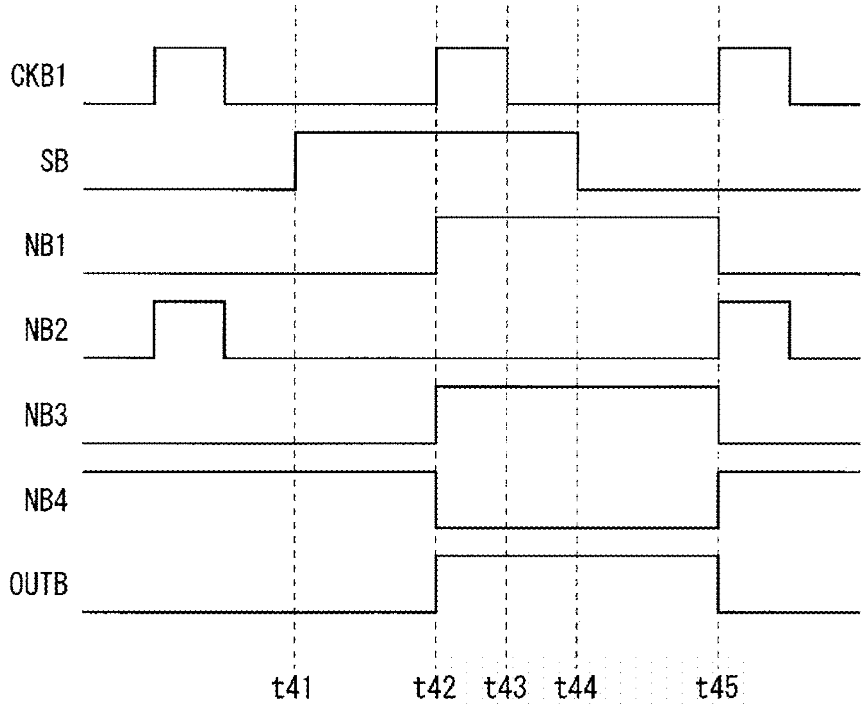
FIG. 11 is a timing chart for describing operations of the unit circuit included in the shift register constituting the second scanning signal line drive circuit according to the first embodiment.

Operations of the unit circuit 320 will now be described with reference to FIG. 11. At a time point immediately before time t41, potentials of the node NB1, the node NB2, and the node NB3 are at a low level, a potential of the node NB4 is at a high level, and the output signal OUTB is at a low level.

At time t41, the set signal SB changes from a low level to a high level. At this time, the clock signal CKB1 is maintained at a low level and the transistor M22 is in an off state, and thus the potential of the node NB1 is maintained at a low level. Note that, during the period in which the set signal SB is maintained at a high level (period from time t41 to time t44), the transistor M23 is maintained in an on state, and thus the potential of the node NB2 is maintained at a low level regardless of the change in the level of the clock signal CKB1.

At time t42, the clock signal CKB1 changes from a low level to a high level. This places the transistor M22 in an on state. The set signal SB is maintained at a high level, and thus the potential of the node NB1 rises. With this, the transistor M24 is placed in an on state, and the potential of the node NB4 changes from a high level to a low level. This places the transistor M26 in an off state. Further, at time t42, the transistor M25 is in an on state and, in association with the rise in the potential of the node NB1, the potential of the node NB3 also rises. This places the transistor M27 in an on state and causes the potential of the output terminal 329 (potential of the output signal OUTB) to rise. In association, the potential of the third node NB3 further rises via the capacitor C22. As a result, a large voltage is applied to the control terminal of the transistor M27, and the potential of the output signal OUTB rises to a level sufficient to place the writing control transistor T1 (refer to FIG. 3) being a connection destination of the output terminal 329 to an on state.

At time t43, the clock signal CKB1 changes from a high level to a low level. This places the transistor M22 in an off state.

At time t44, the set signal SB changes from a high level to a low level. This places the transistor M23 in an off state. At this time, the clock signal CKB1 is maintained at a low level, and thus the potential of the node NB2 is maintained at a low level.

At the time t45, the clock signal CKB1 changes from a low level to a high level. This places the transistor M22 in an on state. At this time, the set signal SB is at a low level, and thus the potential of the node NB1 decreases. This places the transistor M24 in an off state. Further, the transistor M23 is in an off state, and thus by the clock signal CKB1 changing from a low level to a high level, the potential of node NB2 changes from a low level to a high level via the capacitor C23. This places the transistor M21 in an on state, and changes the potential of the node NB4 from a low level to a high level. This places the transistor M26 in an on state. Further, in association with the decrease in the potential of the node NB1, the potential of the node NB3 also decreases. This places the transistor M27 in an off state. With the transistor M27 placed in an off state and the transistor M26 placed in an on state as described above, the potential of the output terminal 329 (potential of the output signal OUTB) changes to a low level.

Note that, in a period before time t41 and a period after time t45, the transistor M21 is placed in an on state each time the clock signal CKB1 changes from a low level to a high level, and thus the potential of the node NB4 is maintained at a high level. As a result, the transistor M26 is maintained in an on state, and thus the output signal OUTB is reliably maintained at a low level even if noise occurs. As a result, the occurrence of abnormal operation is suppressed.

Figure 12:
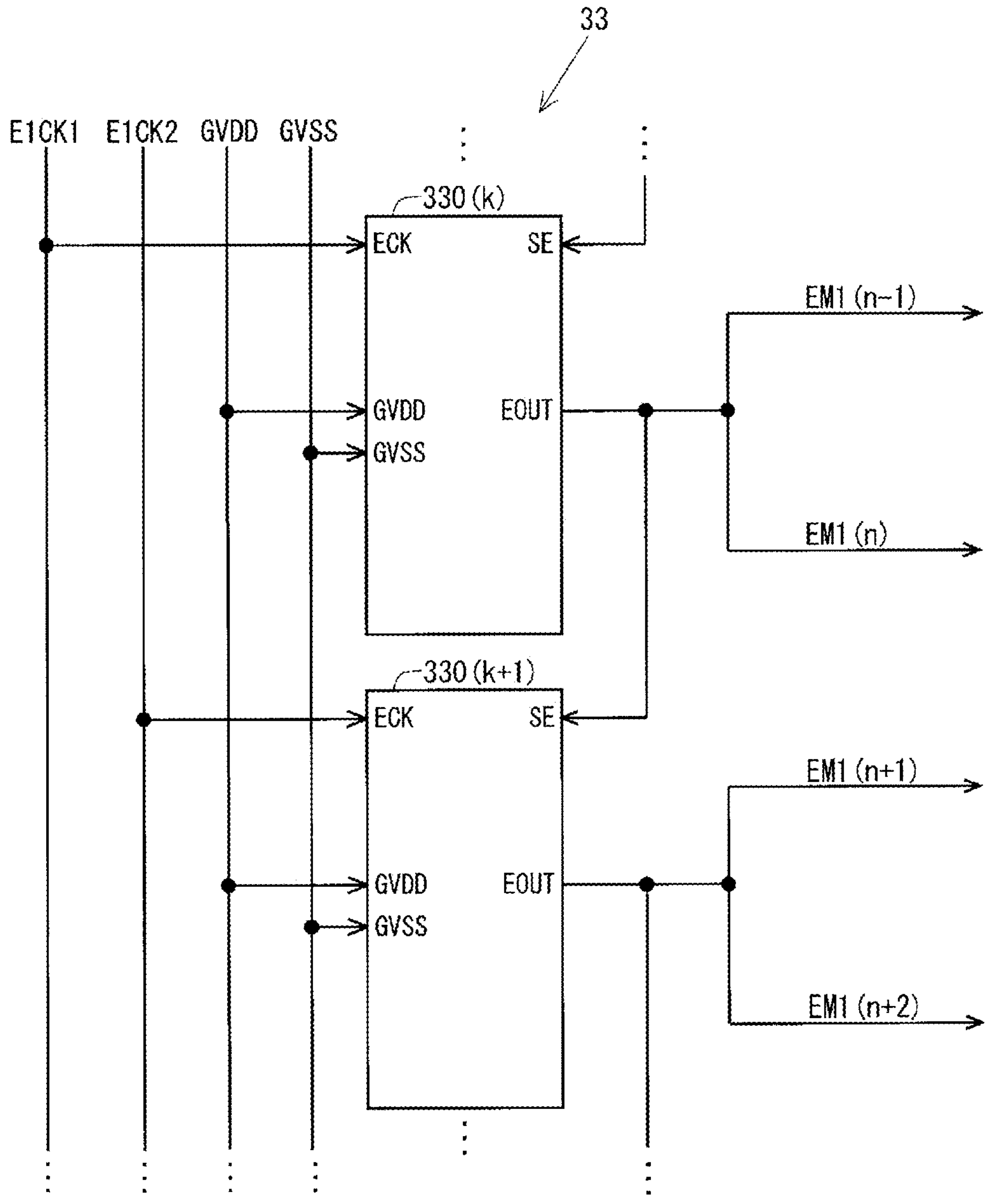
FIG. 12 is a block diagram illustrating a configuration of a first light emission control line drive circuit according to the first embodiment.

1.6 Light Emission Control Line Drive Circuit 1.6.1 Configuration of Shift Register FIG. 12 is a block diagram illustrating a configuration of the first light emission control line drive circuit 33. Similarly to the second scanning signal line drive circuit 32, given p=i/2, the first light emission control line drive circuit 33 is constituted by a shift register composed of p stages (p unit circuits 330). Each stage (each unit circuit 330) corresponds to two first light emission control lines EM1 adjacent to each other.

The shift register constituting the first light emission control line drive circuit 33 is supplied with a clock signal E1CK1, a clock signal E1CK2, a start pulse E1SP (not illustrated in FIG. 12), the high-level power supply voltage GVDD, and the low-level power supply voltage GVSS.

Each unit circuit 330 includes input terminals for respectively receiving a clock signal ECK, a set signal SE, the high-level power supply voltage GVDD, and the low-level power supply voltage GVSS, and an output terminal for outputting an output signal EOUT.

The unit circuits 330 at odd-numbered stages are supplied with the clock signal E1CK1 as the clock signal ECK. The unit circuits 330 at even-numbered stages are supplied with the clock signal E1CK2 as the clock signal ECK. The high-level power supply voltage GVDD and the low-level power supply voltage GVSS are commonly supplied to all unit circuits 330. Further, the unit circuit 330 at each stage is supplied with the output signal EOUT from the unit circuit 330 of the preceding stage as the set signal SE. However, a unit circuit 330(1) at the first stage is supplied with the start pulse E1SP as the set signal SE. The output signal EOUT from the unit circuit 330 at each stage is supplied to the corresponding two first light emission control lines EM1 as the first light emission control signal and to the unit circuit 330 of the next stage as the set signal SE.

As described above, two first light emission control lines EM1 adjacent to each other form one pair, and the first light emission control signals EM1 having the same waveform are supplied to the two first light emission control lines EM1 forming each pair.

Figure 13:
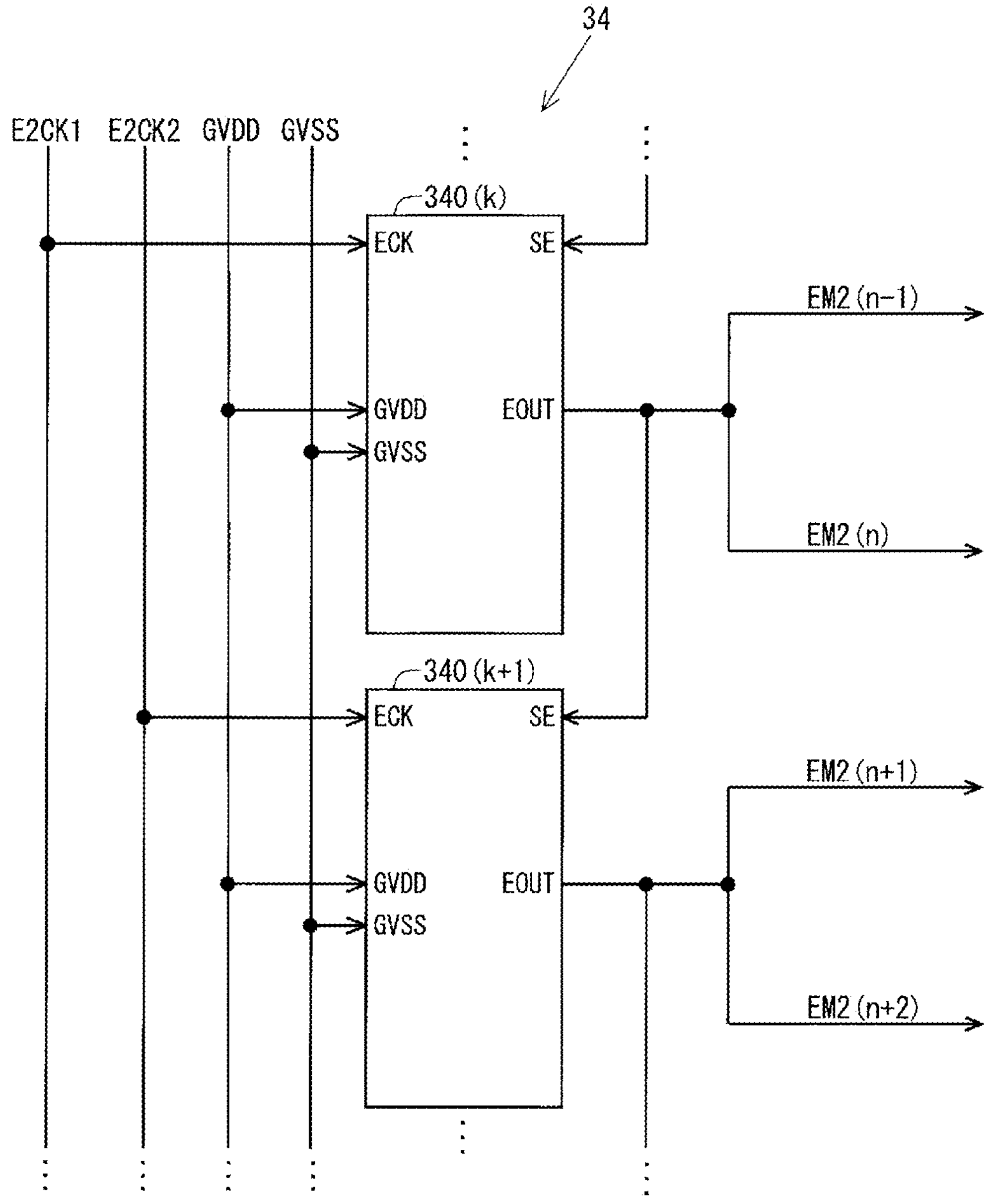
FIG. 13 is a block diagram illustrating a configuration of a second light emission control line drive circuit according to the first embodiment.

FIG. 13 is a block diagram illustrating a configuration of the second light emission control line drive circuit 34. The shift register constituting the second light emission control line drive circuit 34 is supplied with a clock signal E2CK1, a clock signal E2CK2, a start pulse E2SP (not illustrated in FIG. 13), the high-level power supply voltage GVDD, and the low-level power supply voltage GVSS. Other points are the same as those of the first light emission control line drive circuit 33, and thus a detailed description of the second light emission control line drive circuit 34 will be omitted.

1.6.2 Configuration of Unit Circuit

Figure 14:
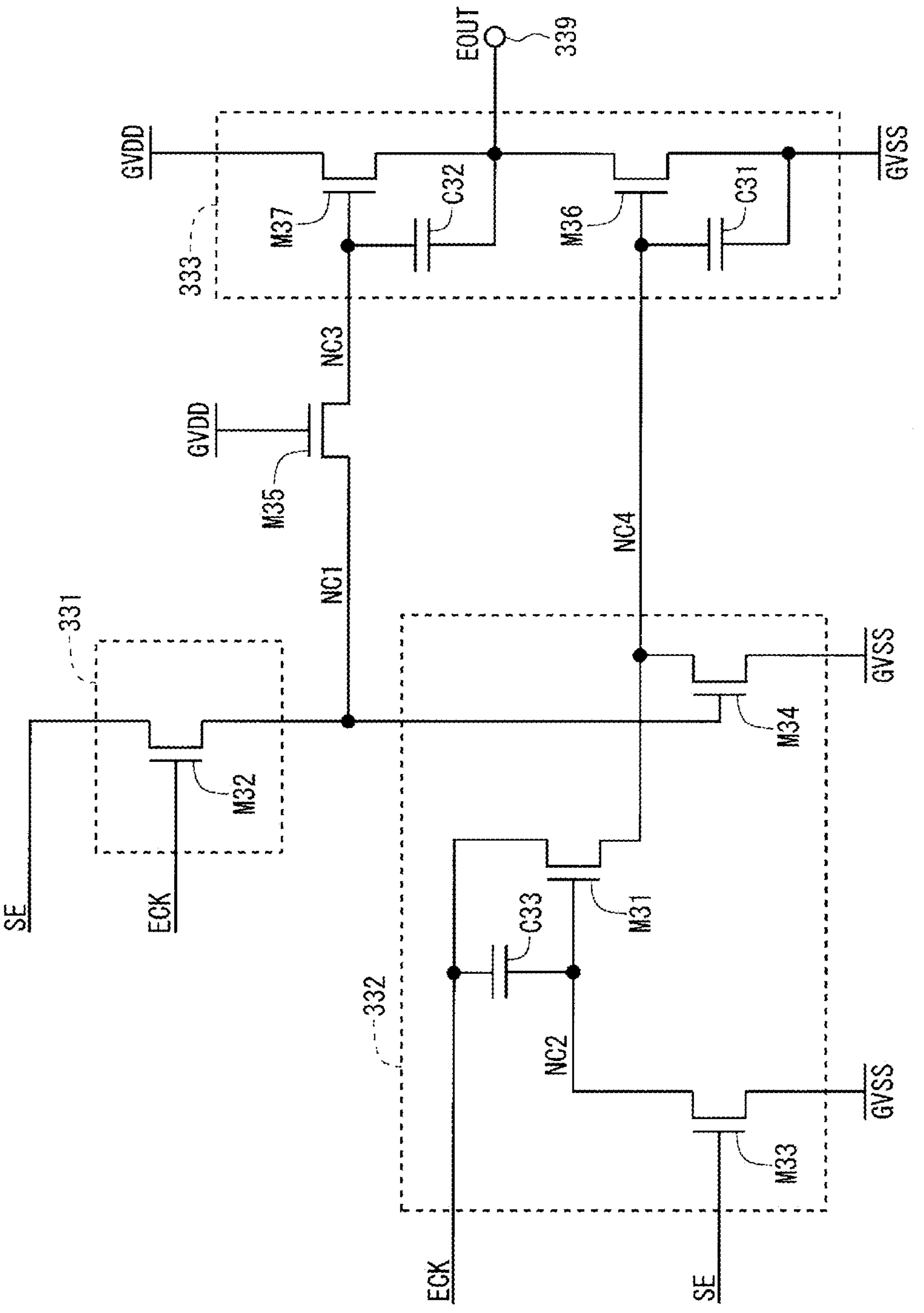
FIG. 14 is a circuit diagram illustrating a configuration of a unit circuit included in a shift register constituting the first light emission control line drive circuit according to the first embodiment.

FIG. 14 is a circuit diagram illustrating a configuration of the unit circuit 330. As illustrated in FIG. 14, the unit circuit 330 includes seven transistors M31 to M37 and three capacitors C31 to C33. As understood from FIG. 10 and FIG. 14, the unit circuits 330 included in the shift register constituting the first light emission control line drive circuit 33 have the same configuration as that of the unit circuits 320 included in the shift register constituting the second scanning signal line drive circuit 32. The transistors M31 to M37, the capacitors C31 to C33, nodes NC1 to NC4, an output terminal 339, a control circuit 331, a control circuit 332, an output circuit 333, the set signal SE, the clock signal ECK, and the output signal EOUT in FIG. 14 correspond to the transistors M21 to M27, the capacitors C21 to C23, the nodes NB1 to NB4, the output terminal 329, the control circuit 321, the control circuit 322, the output circuit 323, the set signal SB, the clock signal CKB1, and the output signal OUTB in FIG. 10, respectively. Accordingly, a detailed description of the configuration of the unit circuit 330 will be omitted.

1.6.3 Operations of Unit Circuit

Figure 15:
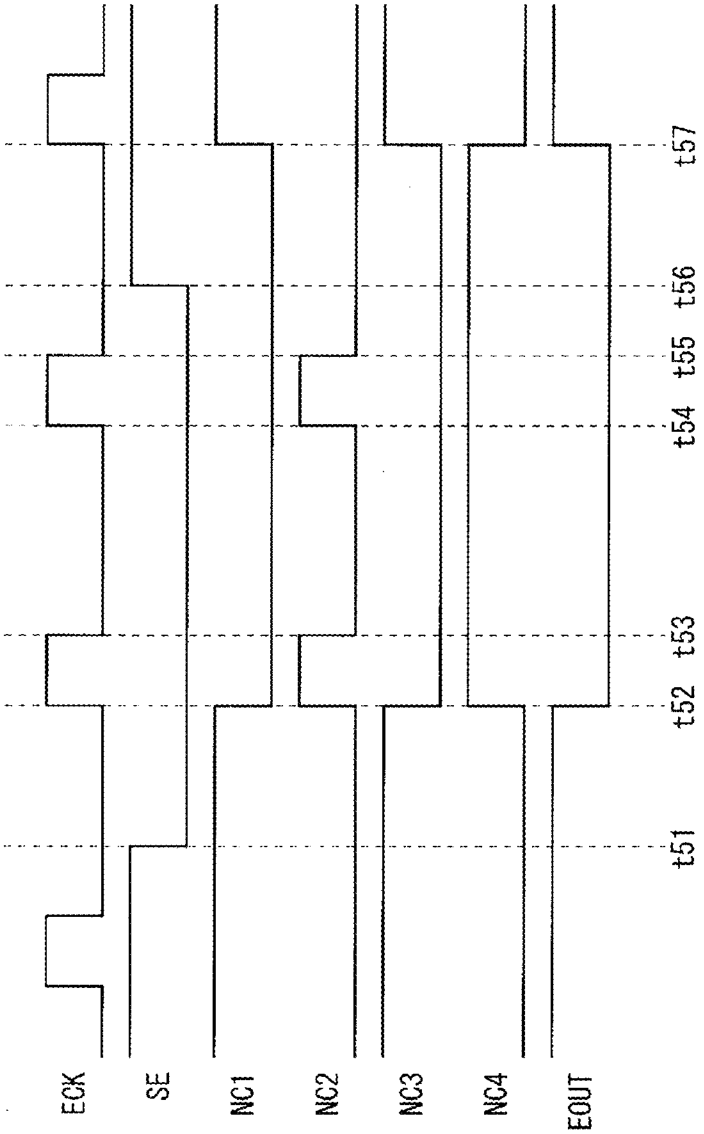
FIG. 15 is a timing chart for describing operations of the unit circuit included in the shift register constituting the first light emission control line drive circuit according to the first embodiment.

Operations of the unit circuit 330 will be described with reference to FIG. 15. At a time point immediately before time t51, potentials of the node NC1 and the node NC3 are at a high level, potentials of the node NC2 and the node NC4 are at a low level, and the output signal EOUT is at a high level.

At time t51, the set signal SE changes from a high level to a low level. This places the transistor M33 in an off state. Further, at this time, the clock signal ECK is maintained at a low level and the transistor M32 is in an off state, and thus the potential of the node NC1 is maintained at a high level.

At time t52, the clock signal ECK changes from a low level to a high level. This places the transistor M32 in an on state. At this time, the set signal SE is at a low level, and thus the potential of the node NC1 decreases. This places the transistor M34 in an off state. Further, the transistor M33 is in an off state, and thus by the clock signal ECK changing from a low level to a high level, the potential of node NC2 changes from a low level to a high level via the capacitor C33. This places the transistor M31 in an on state, and changes the potential of the node NC4 from a low level to a high level. This places the transistor M36 in an on state. Further, in association with the decrease in the potential of the node NC1, the potential of the node NC3 also decreases. This places the transistor M37 in an off state. With the transistor M37 placed in an off state and the transistor M36 placed in an on state as described above, the potential of the output terminal 339 (potential of the output signal EOUT) changes to a low level.

At time t53, the clock signal ECK changes from a high level to a low level. This places the transistor M32 in an off state. Further, the potential of the node NC2 changes from a high level to a low level via the capacitor C33.

At time t54, the clock signal ECK changes from a low level to a high level. This places the transistor M32 in an on state. At this time, the set signal SE is at a low level, and thus the potential of the node NC1 is maintained at a low level. Further, the transistor M33 is in an off state, and thus by the clock signal ECK changing from a low level to a high level, the potential of node NC2 changes from a low level to a high level via the capacitor C33. With this, the transistor M31 is placed in an on state, and the potential of the node NC4 is maintained at high level. As a result, the transistor M36 is maintained in an on state, and thus the output signal EOUT is reliably maintained at a low level even if noise occurs.

At time t55, the clock signal ECK changes from a high level to a low level. This places the transistor M32 in an off state. Further, the potential of the node NC2 changes from a high level to a low level via the capacitor C33.

At time t56, the set signal SE changes from a low level to a high level. At this time, the clock signal ECK is maintained at a low level and the transistor M32 is in an off state, and thus the potential of the node NC1 is maintained at a low level.

At time t57, the clock signal ECK changes from a low level to a high level. This places the transistor M32 in an on state. The set signal SE is maintained at a high level, and thus the potential of the node NC1 rises. With this, the transistor M34 is placed in an on state, and the potential of the node NC4 changes from a high level to a low level. This places the transistor M36 in an off state. Further, at time t57, the transistor M35 is in an on state and, in association with the rise in the potential of the node NC1, the potential of the node NC3 also rises. This places the transistor M37 in an on state and causes the potential of the output terminal 339 (potential of the output signal EOUT) to rise. In association, the potential of the third node NC3 further rises via the capacitor C32. As a result, a large voltage is applied to the control terminal of the transistor M37, and the potential of the output signal EOUT rises to a level sufficient to cause the light emission control transistor T5 (refer to FIG. 3) being a connection destination of the output terminal 339 to change to an on state.

During the period following time t57, the potentials of the node NC1 and the node NC3 are maintained at a high level, the potentials of the node NC2 and the node NC4 are maintained at a low level, and the output signal EOUT is maintained at a high level.

1.7 Overall Operations

Overall operations will be described below. However, the operations described hereinafter are merely examples, and no such limitation is intended. Note that, in the following, a length of a period corresponding to z horizontal scanning periods with z as an integer is referred to as "zH." For example, "8H" represents the length of a period corresponding to eight horizontal scanning periods.

Figure 16:
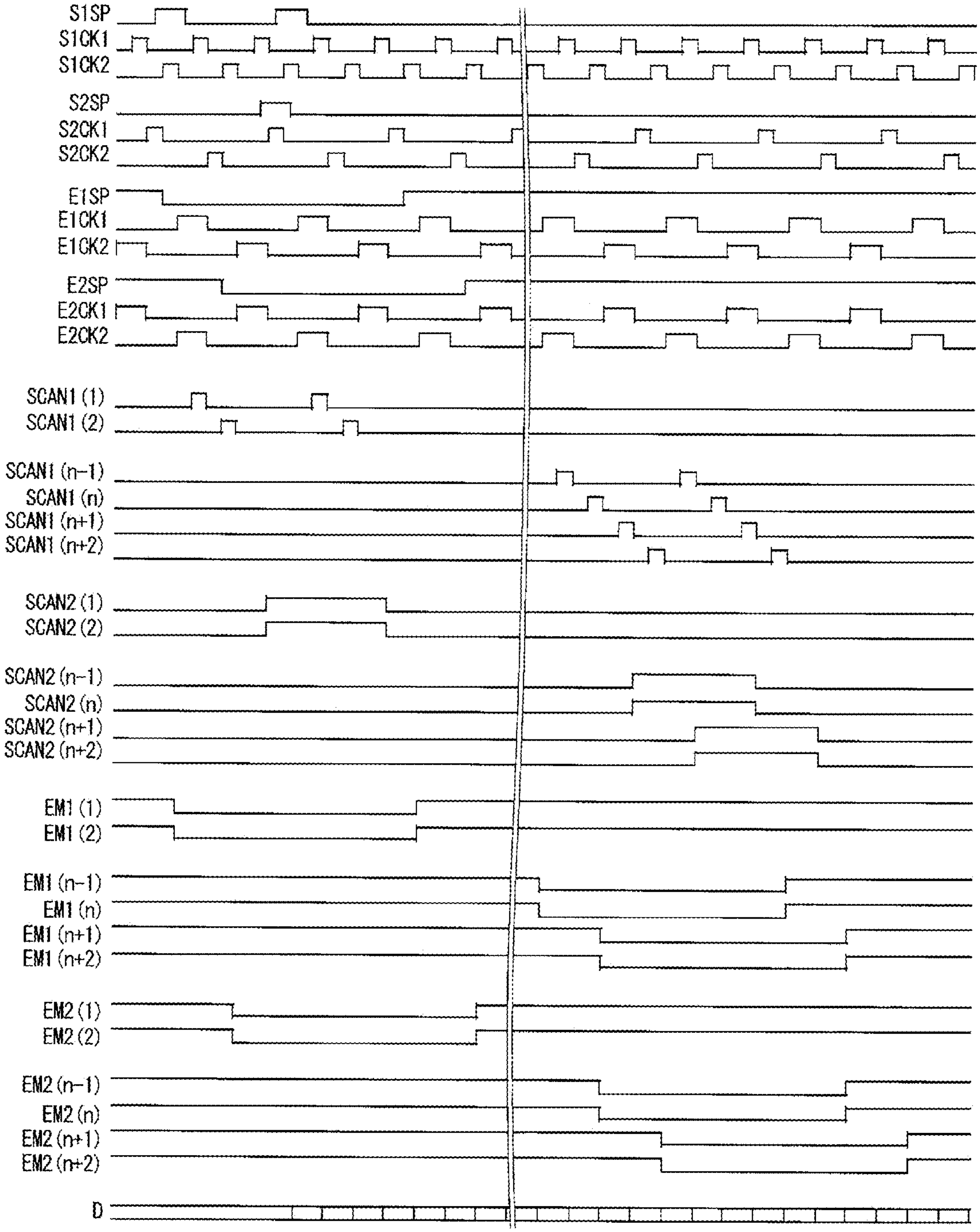
FIG. 16 is a timing chart for describing overall operations in the drive period according to the first embodiment.

First, overall operations in the drive period will be described with reference to a timing chart illustrated in FIG. 16. A pulse width (length of the high-level period) of the start pulses S1SP, S2SP is 2H. For the clock signals S1CK1, S1CK2, the length of the high-level period is 0.5H and the length of the low-level period is 1.5H. For the clock signals S2CK1, S2CK2, the length of the high-level period is 0.5H, and the length of the low-level period is 3.5H. A pulse width (length of the low-level period) of the start pulses E1SP, E2SP is 8H. For the clock signals E1CK1, E1CK2, the length of the high-level period is 1H, and the length of the low-level period is 3H. For the clock signals E2CK1, E2CK2, the length of the high-level period is 1H, and the length of the low-level period is 3H.

The clock signal E1CK1 changes from a low level to a high level after the start pulse E1SP changes from a high level to a low level, thereby changing the light emission control signals EM1(1), EM1(2) from a high level to a low level. This places the light emission control transistor T5 in an off state, switching the organic EL element 21 off, in the pixel circuit 20 of the first row and the pixel circuit 20 of the second row. Note that, before the start pulse E1SP changes from a high level to a low level, the start pulse S1SP changes from a low level to a high level.

Subsequently, the clock signal S1CK1 changes from a low level to a high level, thereby changing the first scanning signal SCAN1(1) from a low level to a high level. This places the threshold voltage compensation transistor T3 and the initialization transistor T6 in an on state, and the holding voltage of the holding capacitor Cst and the anode voltage of the organic EL element 21 are initialized in the pixel circuit 20 of the first row. Furthermore, the clock signal S1CK2 changes from a low level to a high level, thereby changing the first scanning signal SCAN1(2) from a low level to a high level. This places the threshold voltage compensation transistor T3 and the initialization transistor T6 in an on state, and the holding voltage of the holding capacitor Cst and the anode voltage of the organic EL element 21 are initialized in the pixel circuit 20 of the second row. Note that, at the timing at which the first scanning signal SCAN1(2) changes from a low level to a high level, the start pulse E2SP changes from a high level to a low level.

Subsequently, the clock signal E2CK1 changes from a low level to a high level, thereby changing the second light emission control signals EM2(1), EM2(2) from a high level to a low level. This places the power supply control transistor T4 in the pixel circuit 20 of the first row and the pixel circuit 20 of the second row in an off state.

Subsequently, after the start pulse S2SP changes from a low level to a high level, the clock signal S2CK1 changes from a low level to a high level, thereby changing the second scanning signals SCAN2(1), SCAN2(2) from a low level to a high level. This places the writing control transistor T1 in the pixel circuit 20 of the first row and the pixel circuit 20 of the second row in an on state.

Subsequently, the start pulse S1SP changes from a low level to a high level again. Then, the clock signal S1CK1 changes from a low level to a high level, thereby changing the first scanning signal SCAN1(1) from a low level to a high level. This places the threshold voltage compensation transistor T3 and the initialization transistor T6 in the pixel circuit 20 of the first row in an on state. At this time, in the pixel circuit 20 of the first row, the power supply control transistor T4 and the light emission control transistor T5 are in an off state. Accordingly, in the pixel circuit 20 of the first row, the holding capacitor Cst is charged with a voltage corresponding to the data signal D so as to compensate for the variation in the threshold voltage of the drive transistor T2. Furthermore, the clock signal S1CK2 changes from a low level to a high level, thereby changing the first scanning signal SCAN1(2) from a low level to a high level. As a result, in the pixel circuit 20 in the second row as well, the holding capacitor Cst is charged with a voltage corresponding to the data signal D so as to compensate for the variation in the threshold voltage of the drive transistor T2.

On the basis of the operations of the clock signals S1CK1, S1CK2, S2CK1, S2CK2, E1CK1, E1CK2, E2CK1, and E2CK2, the same operations are sequentially performed in the pixel circuits 20 of the third to i-th rows. At this time, as understood from FIG. 16, the first scanning signal lines SCAN1 are driven one by one, and the second scanning signal lines SCAN2, the first light emission control lines EM1, and the second light emission control lines EM2 are driven two by two. With the first light emission control lines EM1 and the second light emission control lines EM2 being driven two by two, switching between the lighting state and the non-lighting state of the organic EL element 21 is performed two rows at a time. Further, the second scanning signal lines SCAN2 are driven two by two, but the first scanning signal lines SCAN1 are driven one by one, and thus initialization of the state of the pixel circuit 20 and writing of data to the pixel circuit 20 are performed one row at a time.

Figure 17:
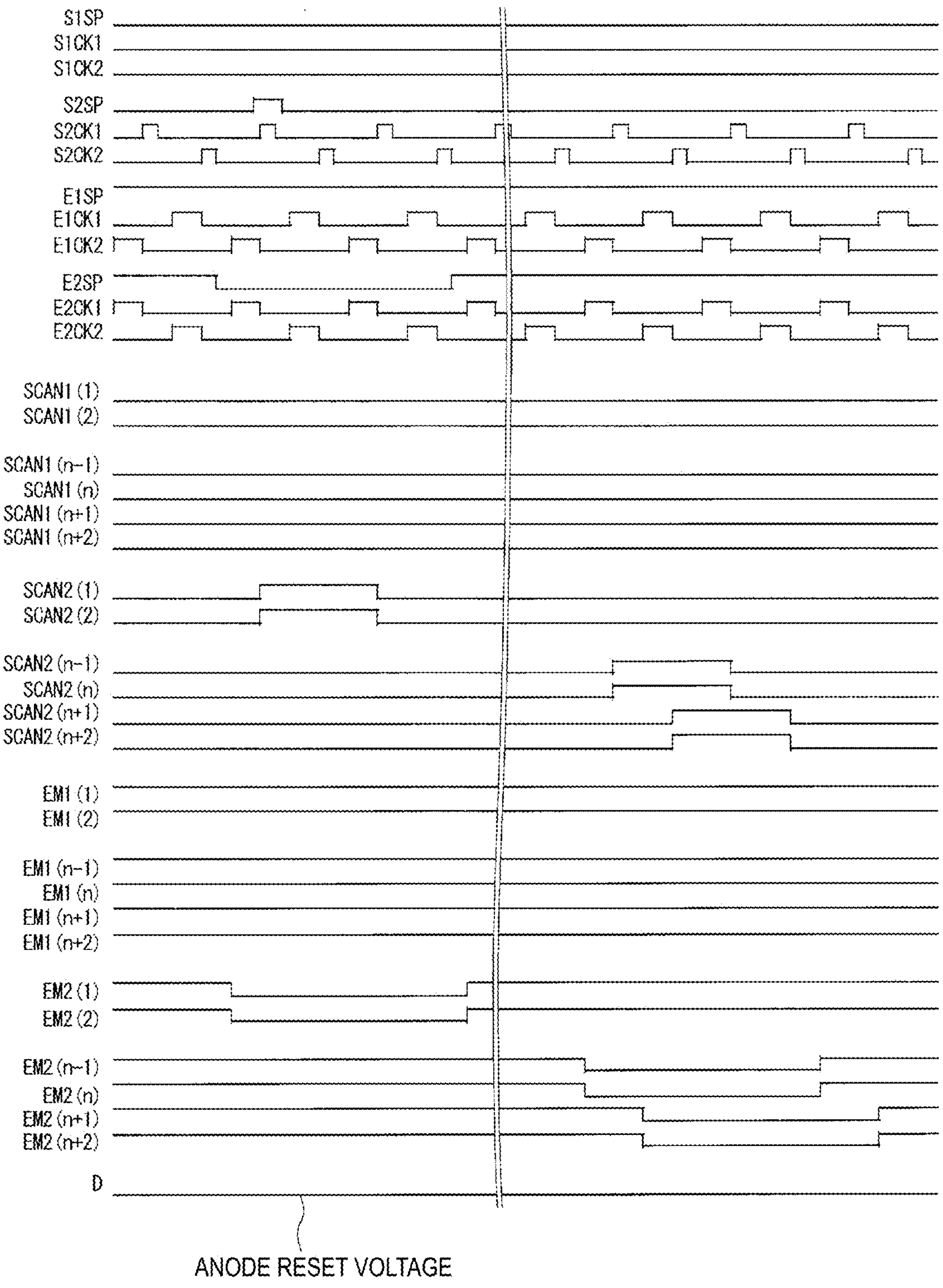
FIG. 17 is a timing chart for describing overall operations in the pause period according to the first embodiment.

Next, overall operations in the pause period will be described with reference to a timing chart illustrated in FIG. 17. The pulse width (length of the high-level period) of the start pulse S2SP is 2H. For the clock signals S2CK1, S2CK2, the length of the high-level period is 0.5H, and the length of the low-level period is 3.5H. For the clock signals E1CK1, E1CK2, the length of the high-level period is 1H, and the length of the low-level period is 3H. The pulse width (length of the low-level period) of the start pulses E2SP is 8H. For the clock signals E2CK1, E2CK2, the length of the high-level period is 1H, and the length of the low-level period is 3H. Note that the start pulse S1SP and the clock signals S1CK1, S1CK2 are maintained at a low level throughout the pause period, and the start pulse E1SP is maintained at a high level throughout the pause period. Further, as described above, the anode reset voltage (low-level power supply voltage ELVSS in the present embodiment) is applied to all data signal lines D throughout the pause period.

The clock signal E2CK1 changes from a low level to a high level after the start pulse E2SP changes from a high level to a low level, thereby changing the second light emission control signals EM2(1), EM2(2) from a high level to a low level. This places the power supply control transistor T4 in an off state, switching the organic EL element 21 off, in the pixel circuit 20 of the first row and the pixel circuit 20 of the second row.

Subsequently, after the start pulse S2SP changes from a low level to a high level, the clock signal S2CK1 changes from a low level to a high level, thereby changing the second scanning signals SCAN2(1), SCAN2(2) from a low level to a high level. This places the writing control transistor T1 in the pixel circuit 20 of the first row and the pixel circuit 20 of the second row in an on state. At this time, in the pixel circuit 20 of the first row and in the pixel circuit 20 of the second row, the power supply control transistor T4 is in an off state, but the light emission control transistor T5 is in an on state. Further, an anode reset voltage is applied to the data signal line D. From the above, in the pixel circuit 20 of the first row and the pixel circuit 20 of the second row, the anode voltage of the organic EL element 21 is initialized.

On the basis of the operations of the clock signals S2CK1, S2CK2, E2CK1, and E2CK2, the same operations are sequentially performed in the pixel circuits 20 of the third to i-th rows. At this time, with the second scanning signal lines SCAN2 and the second light emission control lines EM2 being driven two by two, initialization of the anode voltage of the organic EL element 21 is performed two rows at a time.

1.8 Effect

According to the present embodiment, the second scanning signal line drive circuit 32 is constituted by the shift register composed of the unit circuits 320 equal in number to half the number of the second scanning signal lines SCAN2 so that the second scanning signal lines SCAN2 are driven two by two, the first light emission control line drive circuit 33 is constituted by the shift register composed of the unit circuits 330 equal in number to half the number of the first light emission control lines EM1 so that the first light emission control lines EM1 are driven two by two, and the second light emission control line drive circuit 34 is constituted by the shift register composed of the unit circuits 340 equal in number to half the number of the second light emission control lines EM2 so that the second light emission control lines EM2 are driven two by two. As a result, the area of the circuit region required around the periphery of the display portion 200 for driving the second scanning signal lines SCAN2, the first light emission control lines EM1, and the second light emission control lines EM2 is reduced. That is, it is possible to reduce the area of the frame region of the organic EL display panel 5. As described above, according to the present embodiment, frame narrowing of the organic EL display device including the pixel circuit 20 constituted by one organic EL element 21, six N-channel transistors T1 to T6, and one holding capacitor Cst as illustrated in FIG. 3 is realized.

1.9 Modified Examples

In the first embodiment described above, the second scanning signal lines SCAN2, the first light emission control lines EM1, and the second light emission control lines EM2 are driven two by two. However, no such limitation is intended, and the second scanning signal lines SCAN2, the first light emission control lines EM1, and the second light emission control lines EM2 may be driven three or more at a time. That is, the second scanning signal lines SCAN2, the first light emission control lines EM1, and the second light emission control lines EM2 may be driven Q lines at a time, where Q is an integer of 2 or greater. However, it should be noted that as the value of Q increases, the length of a light emission period (period during which the organic EL element 21 is maintained in a state of emitting light in each pixel circuit 20) decreases. Hereinafter, the case of "Q=3" is referred to as a first modified example, and the case of "Q=4" is referred to as a second modified example.

1.9.1 First Modified Example

Figure 18:
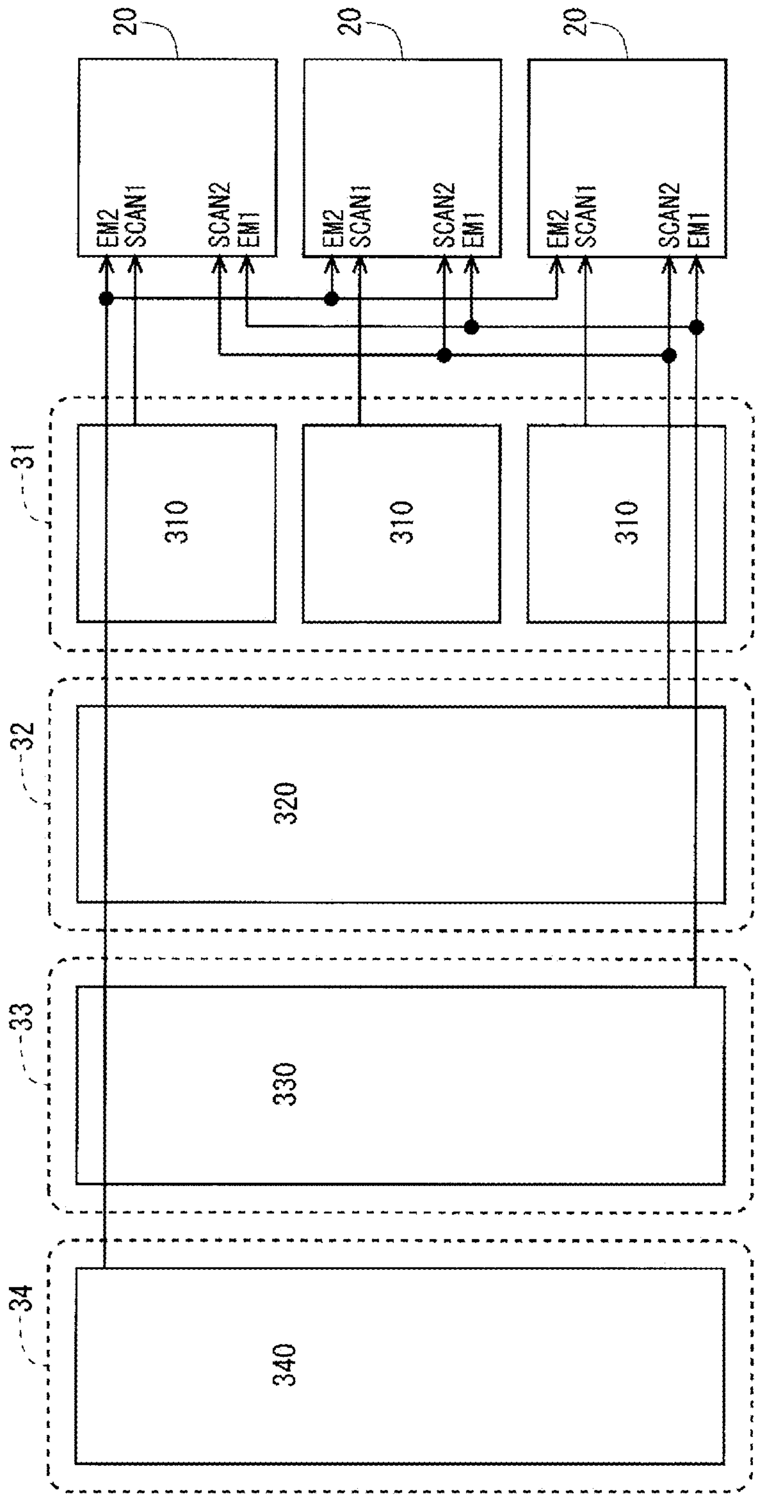
FIG. 18 is a block diagram illustrating a schematic configuration of the scanning-side drive circuit according to a first modified example of the first embodiment.

FIG. 18 is a block diagram illustrating a schematic configuration of the scanning-side drive circuit 300 in a first modified example. The first scanning signal line drive circuit 31 is similar to that in the first embodiment described above. The second scanning signal line drive circuit 32 is constituted by a shift register including the unit circuits 320 equal in number to one-third the number of second scanning signal lines SCAN2. However, FIG. 18 illustrates only one unit circuit 320. Each unit circuit included in the shift register constituting the second scanning signal line drive circuit 32 corresponds to three second scanning signal lines SCAN2. Accordingly, the i second scanning signal lines SCAN2(1) to SCAN2(*i*) are driven three by three by the second scanning signal line drive circuit 32. The first light emission control line drive circuit 33 is constituted by a shift register including the unit circuits 330 equal in number to one-third the number of the first light emission control lines EM1. However, FIG. 18 illustrates only one unit circuit 330. Each unit circuit included in the shift register constituting the first light emission control line drive circuit 33 corresponds to three first light emission control lines EM1. Accordingly, the i first light emission control lines EM1(1) to EM1(*i*) are driven three by three by the first light emission control line drive circuit 33. The second light emission control line drive circuit 34 is constituted by a shift register including the unit circuits 340 equal in number to one-third the number of the second light emission control lines EM2. However, FIG. 18 illustrates only one unit circuit 340. Each unit circuit included in the shift register constituting the second light emission control line drive circuit 34 corresponds to three second light emission control lines EM2. Accordingly, the i second light emission control lines EM2(1) to EM2(*i*) are driven three by three by the second light emission control line drive circuit 34.

Figure 19:
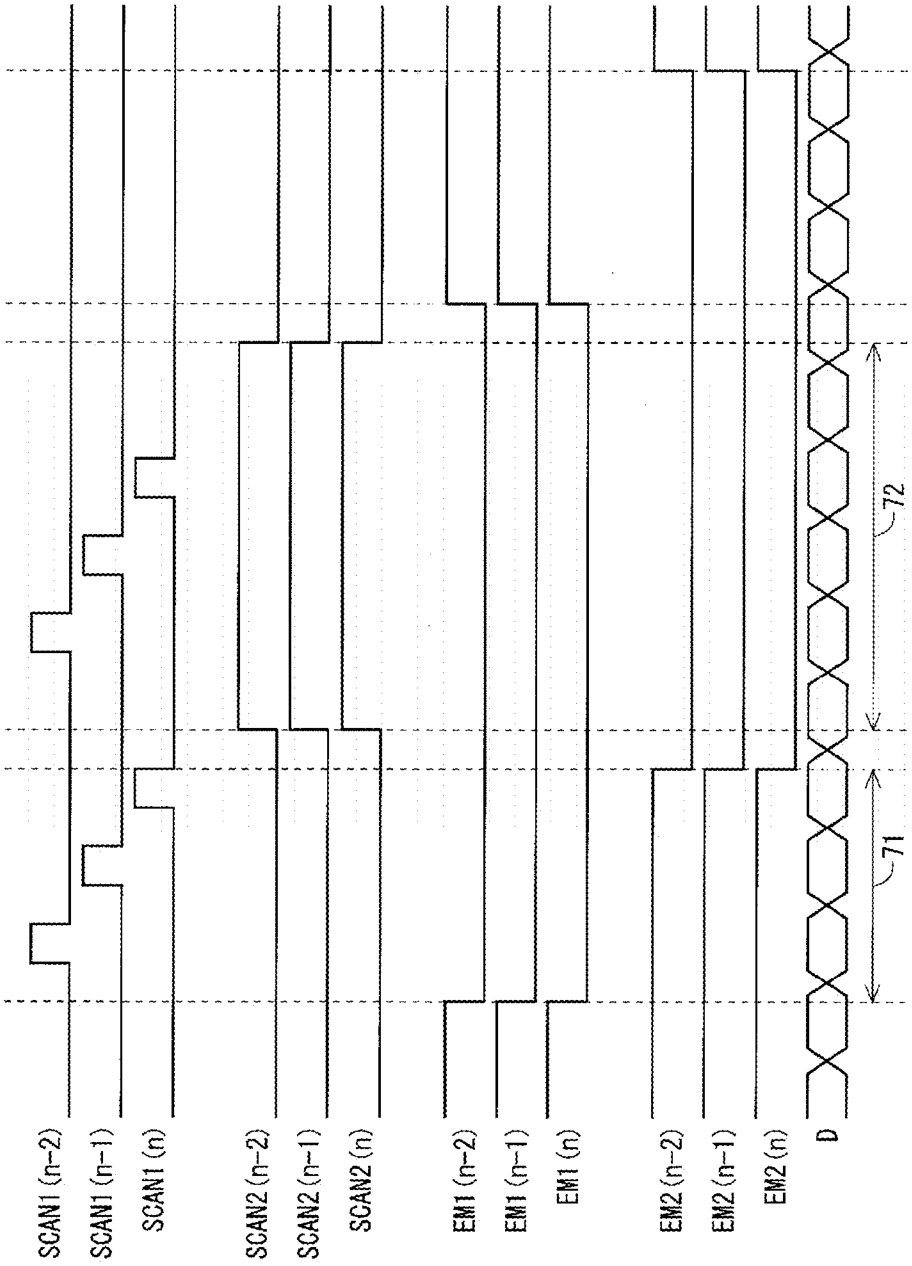
FIG. 19 is a timing chart for describing operations of the pixel circuit in the drive period according to the first modified example of the first embodiment.

In the present modified example, in the drive period, as illustrated in FIG. 19, in the period (period indicated by the arrow denoted by reference sign 71) during which the first light emission control signals EM1(*n*−2), EM1(*n*−1), EM1(*n*), respectively applied to three first light emission control lines EM1 driven collectively, are at a low level, and the second light emission control signals EM2(*n*−2), EM2(*n*−1), EM2(*n*), respectively applied to three second light emission control lines EM2 driven collectively, are at a high level, the first scanning signal SCAN1(*n*−2), the first scanning signal SCAN1(*n*−1), and the first scanning signal SCAN1(*n*), respectively applied to three first scanning signal lines SCAN1 corresponding to the (n−2)-th to n-th rows, are sequentially placed in an on state for a predetermined period each. As a result, in the pixel circuit 20 of the (n−2)-th row, the pixel circuit 20 of the (n−1)-th row, and the pixel circuit 20 of the n-th row, the holding voltage of the holding capacitor Cst is initialized and the anode voltage of the organic EL element 21 is initialized. Furthermore, in the drive period, as illustrated in FIG. 19, during a part of a period during which the first light emission control signals EM1(*n*−2), EM1(*n*−1), and EM1(*n*) are at a low level, and the second light emission control signals EM2(*n*−2), EM2(*n*−1), and EM2(*n*) are at a low level, the second scanning signal SCAN2(*n*−2), the second scanning signal SCAN2(*n*−1), and the second scanning signal SCAN2(*n*), respectively applied to three second scanning signal lines SCAN2 corresponding to the (n−2)-th to n-th rows, are maintained at a high level. In the period (period indicated by the arrow denoted by reference sign 72) during which the second scanning signal SCAN2 (n−2), the second scanning signal SCAN2(*n*−1), and the second scanning signal SCAN2(*n*) are maintained at a high level in this way, the first scanning signal SCAN1(*n*−2), the first scanning signal SCAN1(*n*−1), and the first scanning signal SCAN1(*n*) are sequentially placed in an on state again for a predetermined period each. As a result, in the pixel circuit 20 in the (n−2)-th row, the pixel circuit 20 in the (n−1)-th row, and the pixel circuit 20 in the n-th row, the holding capacitor Cst is charged with a voltage corresponding to the data signal D so as to compensate for the variation in the threshold voltage of the drive transistor T2.

Figure 20:
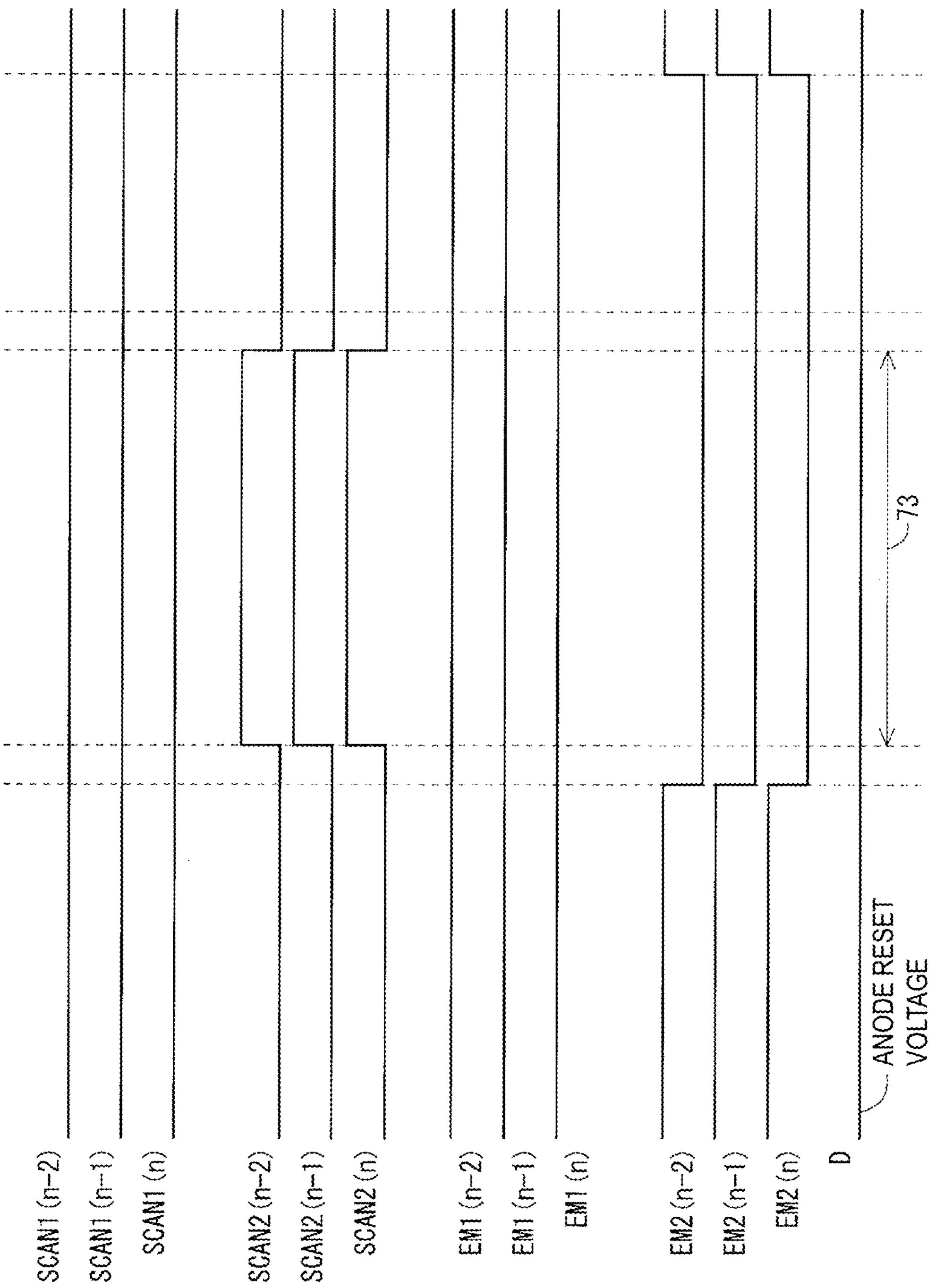
FIG. 20 is a timing chart for describing operations of the pixel circuit in the pause period according to the first modified example of the first embodiment.

In the present modified example, in the pause period, as illustrated in FIG. 20, during a part of a period during which the second light emission control signals EM2(*n*−2), EM2(*n*−1), and EM2(*n*), respectively applied to three second light emission control lines EM2 driven collectively, are at a low level (period indicated by the arrow denoted by reference sign 73), the second scanning signal SCAN2(*n*−2), the second scanning signal SCAN2(*n*−1), and the second scanning signal SCAN2(*n*), respectively applied to three second scanning signal lines SCAN2 corresponding to the (n−2)-th to n-th rows, are maintained at a high level. As a result, in the pixel circuit 20 of the (n−2)-th row, the pixel circuit 20 of the (n−1)-th row, and the pixel circuit 20 of the n-th row, the anode voltage of the organic EL element 21 is initialized.

1.9.2 Second Modified Example

Figure 21:
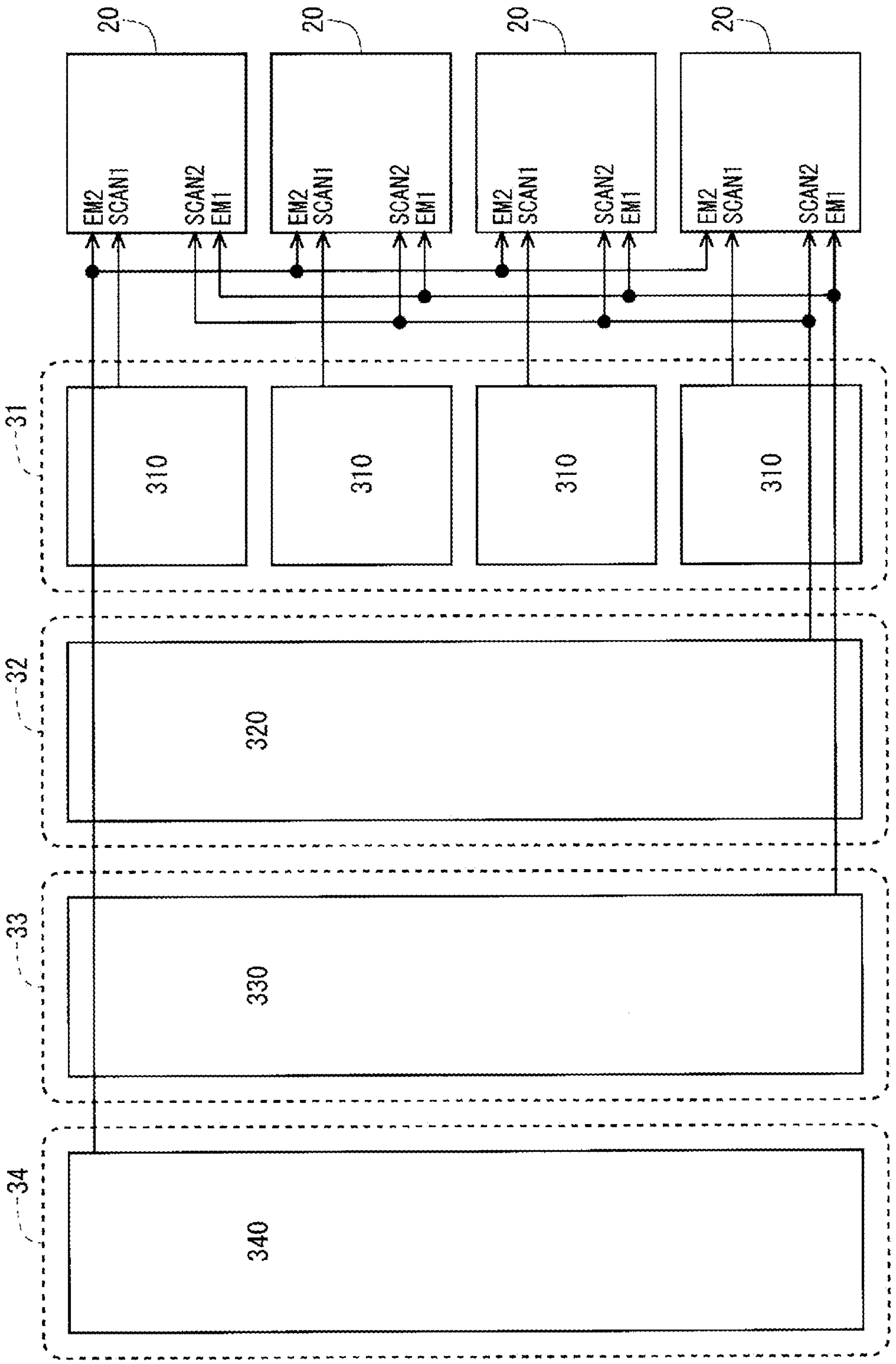
FIG. 21 is a block diagram illustrating a schematic configuration of the scanning-side drive circuit according to a second modified example of the first embodiment.

FIG. 21 is a block diagram illustrating a schematic configuration of the scanning-side drive circuit 300 in a second modified example. The first scanning signal line drive circuit 31 is similar to that in the first embodiment described above. The second scanning signal line drive circuit 32 is constituted by a shift register including the unit circuits 320 equal in number to one-fourth the number of second scanning signal lines SCAN2. However, FIG. 21 illustrates only one unit circuit 320. Each unit circuit included in the shift register constituting the second scanning signal line drive circuit 32 corresponds to four second scanning signal lines SCAN2. Accordingly, the i second scanning signal lines SCAN2(1) to SCAN2(*i*) are driven four by four by the second scanning signal line drive circuit 32. The first light emission control line drive circuit 33 is constituted by a shift register including the unit circuits 330 equal in number to one-fourth the number of the first light emission control lines EM1. However, FIG. 21 illustrates only one unit circuit 330. Each unit circuit included in the shift register constituting the first light emission control line drive circuit 33 corresponds to four first light emission control lines EM1. Accordingly, the i first light emission control lines EM1(1) to EM1(*i*) are driven four by four by the first light emission control line drive circuit 33. The second light emission control line drive circuit 34 is constituted by a shift register including the unit circuits 340 equal in number to one-fourth the number of the second light emission control lines EM2. However, FIG. 21 illustrates only one unit circuit 340. Each unit circuit included in the shift register constituting the second light emission control line drive circuit 34 corresponds to four second light emission control lines EM2. Accordingly, the i second light emission control lines EM2(1) to EM2(*i*) are driven four by four by the second light emission control line drive circuit 34.

Figure 22:
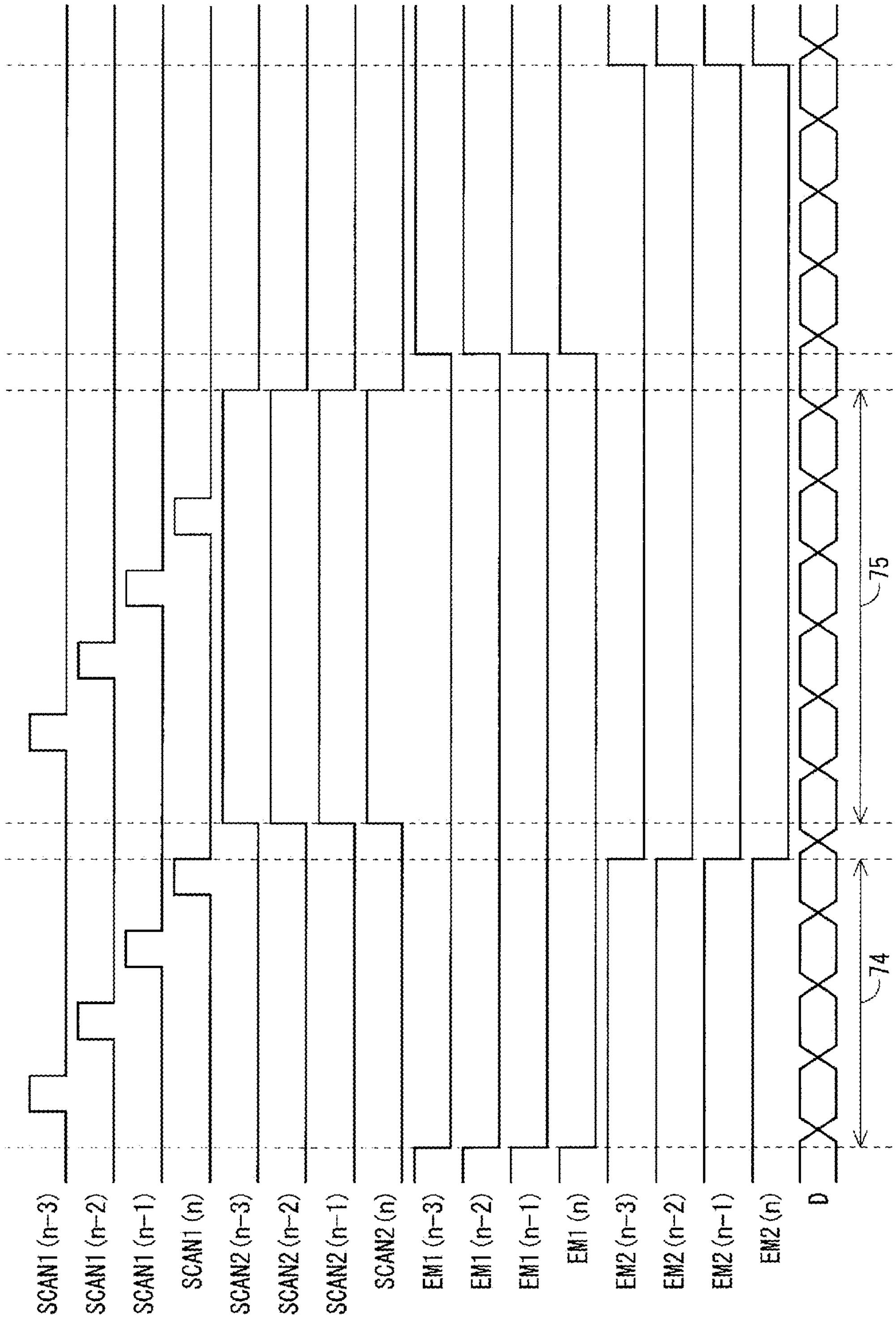
FIG. 22 is a timing chart for describing operations of the pixel circuit in the drive period according to the second modified example of the first embodiment.

In the present modified example, in the drive period, as illustrated in FIG. 22, in the period (period indicated by the arrow denoted by reference sign 74) during which the first light emission control signals EM1(*n*−3), EM1(*n*−2), EM1(*n*−1), EM1(*n*), respectively applied to four first light emission control lines EM1 driven collectively, are at a low level, and the second light emission control signals EM2(*n*−3), EM2(*n*−2), EM2(*n*−1), EM2(*n*), respectively applied to four second light emission control lines EM2 driven collectively, are at a high level, the first scanning signal SCAN1(*n*−3), the first scanning signal SCAN1(*n*−2), the first scanning signal SCAN1(*n*−1), and the first scanning signal SCAN1(*n*), respectively applied to the four first scanning signal lines SCAN1 corresponding to the (n−3)-th to n-th rows, are sequentially placed in an on state for a predetermined period each. As a result, in the pixel circuit 20 of the (n−3)-th row, the pixel circuit 20 of the (n−2)-th row, the pixel circuit 20 of the (n−1)-th row, and the pixel circuit 20 of the n-th row, the holding voltage of the holding capacitor Cst is initialized and the anode voltage of the organic EL element 21 is initialized. Furthermore, in the drive period, as illustrated in FIG. 22, during a part of a period during which the first light emission control signals EM1(*n*−3), EM1(*n*−2), EM1(*n*−1), and EM1(*n*) are at a low level, and the second light emission control signals EM2(*n*−3), EM2(*n*−2), EM2(*n*-1), and EM2(*n*) are at a low level, the second scanning signal SCAN2(*n*−3), the second scanning signal SCAN2(*n*−2), the second scanning signal SCAN2(*n*−1), and the second scanning signal SCAN2(*n*), respectively applied to four second scanning signal lines SCAN2 corresponding to the (n−3)-th to n-th rows, are maintained at a high level. In the period during which the second scanning signal SCAN2 (n−3), the second scanning signal SCAN2 (n−2), the second scanning signal SCAN2(*n*−1), and the second scanning signal SCAN2(*n*) are maintained at a high level in this way (period indicated by the arrow denoted by reference sign 75), the first scanning signal SCAN1(*n*−3), the first scanning signal SCAN1(*n*−2), the first scanning signal SCAN1(*n*−1), and the first scanning signal SCAN1(*n*) are sequentially placed in an on state again for a predetermined period each. As a result, in the pixel circuit 20 in the (n−3)-th row, the pixel circuit 20 in the (n−2)-th row, the pixel circuit 20 in the (n−1)-th row, and the pixel circuit 20 in the n-th row, the holding capacitor Cst is charged with a voltage corresponding to the data signal D so as to compensate for the variation in the threshold voltage of the drive transistor T2.

Figure 23:
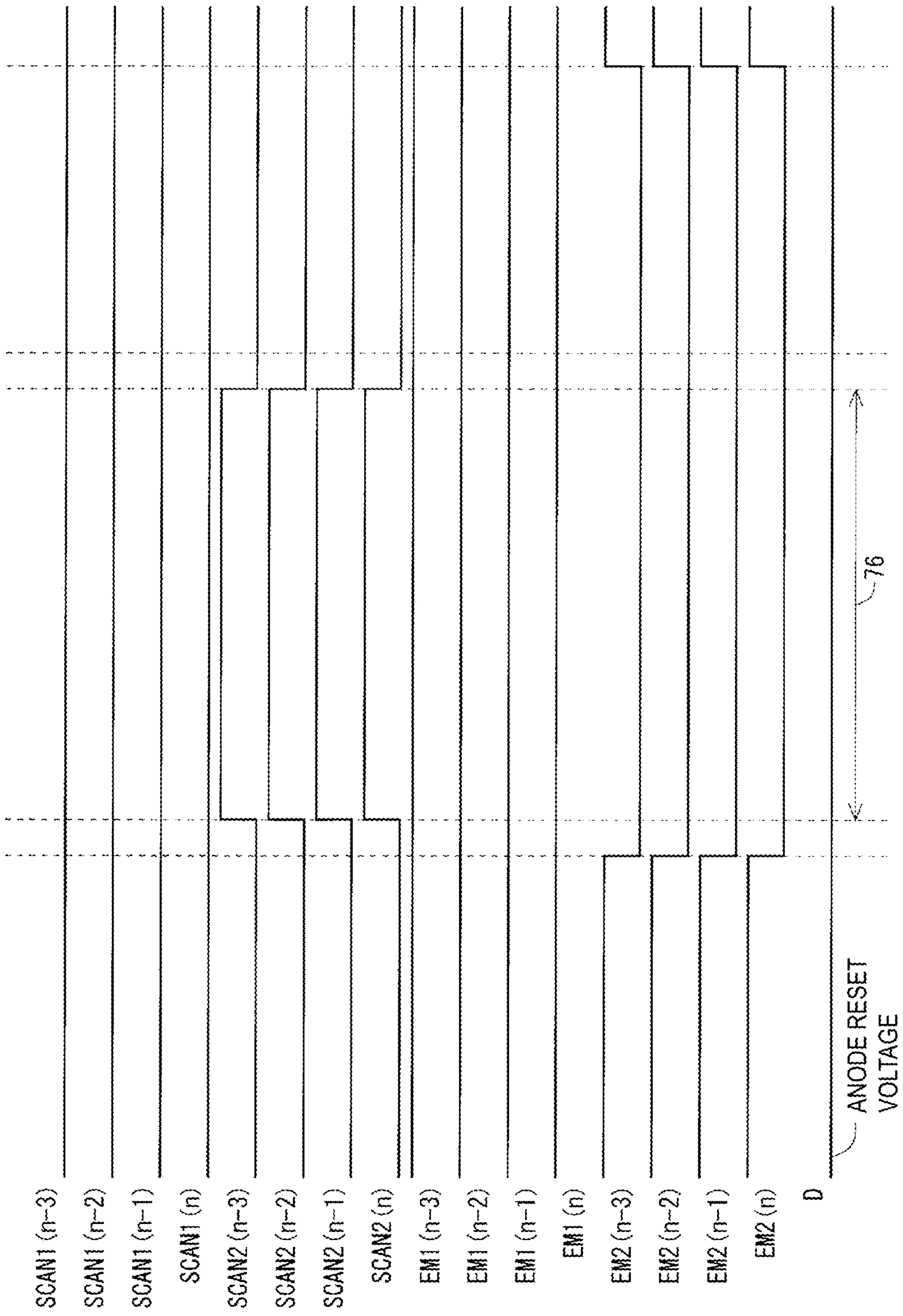
FIG. 23 is a timing chart for describing operations of the pixel circuit in the pause period according to the second modified example of the first embodiment.

In the present modified example, in the pause period, as illustrated in FIG. 23, during a part of a period during which the second light emission control signals EM2(*n*−3), EM2(*n*−2), EM2(*n*−1), and EM2(*n*), respectively applied to four second light emission control lines EM2 driven collectively, are at a low level (period indicated by the arrow denoted by reference sign 76), the second scanning signal SCAN2(*n*−3), the second scanning signal SCAN2(*n*−2), the second scanning signal SCAN2(*n*−1), and the second scanning signal SCAN2(*n*), respectively applied to four second scanning signal lines SCAN2 corresponding to the (n−3)-th to n-th rows, are maintained at a high level. As a result, in the pixel circuit 20 of the (n−3)-th row, the pixel circuit 20 of the (n−2)-th row, the pixel circuit 20 of the (n−1)-th row, and the pixel circuit 20 of the n-th row, the anode voltage of the organic EL element 21 is initialized.

2. Second Embodiment

2.1 Overview

In the first embodiment described above, the first light emission control line drive circuit 33 for driving the first light emission control lines EM1 and the second light emission control line drive circuit 34 for driving the second light emission control lines EM2 are separately provided. However, referring to FIG. 16, the waveforms of the first light emission control signals EM1(*n*+1), EM1(*n*+2) are the same as the waveforms of the second light emission control signals EM2(*n*−1) and EM2(*n*). Herein, in the organic EL display device according to the present embodiment, a configuration is adopted in which the first light emission control lines EM1 and the second light emission control lines EM2 are driven by one shift register.

The overall configuration and operations of the organic EL display device are similar to those of the first embodiment described above (refer to FIG. 2). The configuration and operations of the pixel circuit 20 are also similar to those of the first embodiment described above (refer to FIG. 3). That is, the organic EL display device according to the present embodiment also includes the pixel circuit 20 constituted by one organic EL element 21, six N-channel transistors T1 to T6, and one holding capacitor Cst.

2.2 Schematic Configuration of Scanning-Side Drive Circuit

Figure 24:
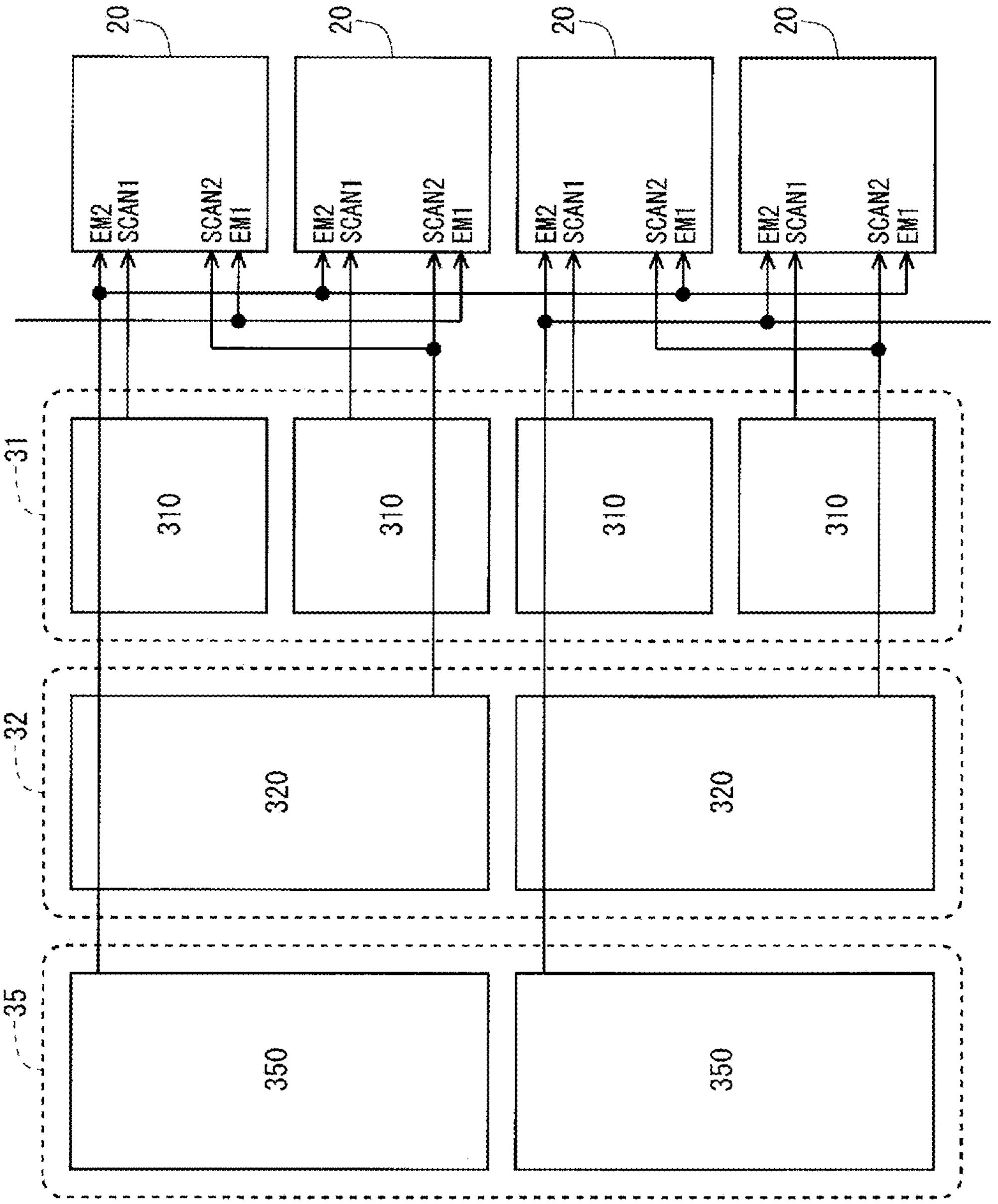
FIG. 24 is a block diagram illustrating a schematic configuration of the scanning-side drive circuit according to a second embodiment.

FIG. 24 is a block diagram illustrating a schematic configuration of the scanning-side drive circuit 300 in the present embodiment. The scanning-side drive circuit 300 is constituted by the first scanning signal line drive circuit 31, the second scanning signal line drive circuit 32, and a light emission control line drive circuit 35. The first scanning signal line drive circuit 31 applies the first scanning signals SCAN1 to the first scanning signal lines, the second scanning signal line drive circuit 32 applies the second scanning signals SCAN2 to the second scanning signal lines, and the light emission control line drive circuit 35 applies the first light emission control signals EM1 to the first light emission control lines and the second light emission control signal EM2 to the second light emission control lines.

The first scanning signal line drive circuit 31 and the second scanning signal line drive circuit 32 have the same configurations as those of the first embodiment described above. Accordingly, the i first scanning signal lines SCAN1(1) to SCAN1(*i*) are driven one by one by the first scanning signal line drive circuit 31, and the i second scanning signal lines SCAN2(1) to SCAN2(*i*) are driven two by two by the second scanning signal line drive circuit 32.

The light emission control line drive circuit 35 is constituted by a shift register including unit circuits 350 equal in number to half the number of the first light emission control lines EM1. As illustrated in FIG. 24, each unit circuit included in the shift register constituting the light emission control line drive circuit 35 corresponds to two second light emission control lines EM2 and two first light emission control lines EM1. Accordingly, in the present embodiment, the i first light emission control lines EM1(1) to EM1 (*i*) are driven two by two by the light emission control line drive circuit 35, and the i second light emission control lines EM2(1) to EM2(*i*) are driven two by two by the light emission control line drive circuit 35. That is, four light emission control lines (two first light emission control lines EM1 and two second light emission control lines EM2) are collectively driven by each unit circuit included in the shift register constituting the light emission control line drive circuit 35.

2.3 Light Emission Control Line Drive Circuit

Figure 25:
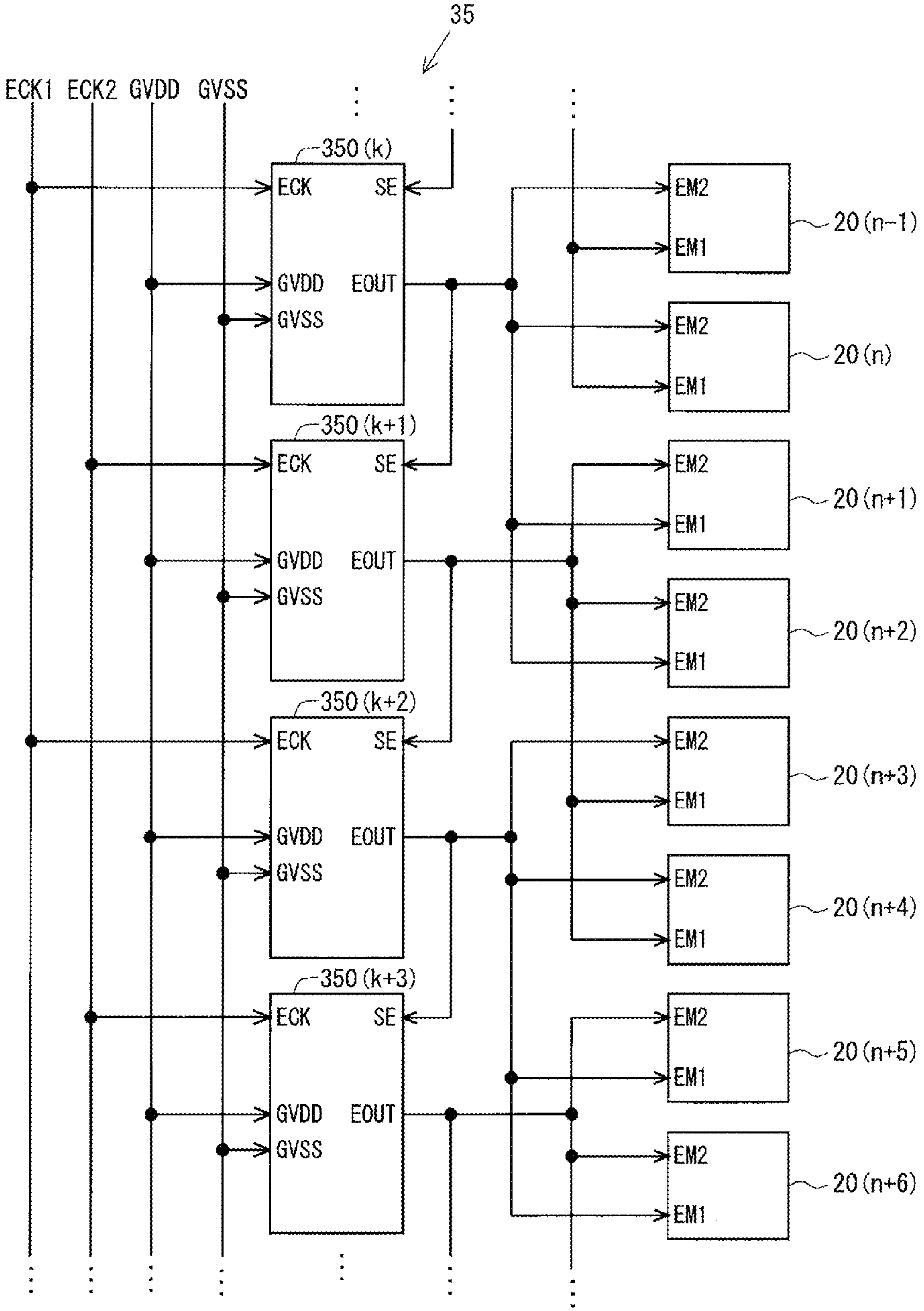
FIG. 25 is a block diagram illustrating a configuration of a light emission control line drive circuit according to the second embodiment.

FIG. 25 is a block diagram illustrating a configuration of the light emission control line drive circuit 35. Given p=i/2, the light emission control line drive circuit 35 is constituted by a shift register composed of p stages (p unit circuits 350). Each stage (each unit circuit 350) corresponds to two second light emission control lines EM2 adjacent to each other and two first light emission control lines EM1 adjacent to each other. Given k=n/2 and k is an odd number, the unit circuit 350(*k*) of the k-th stage corresponds to the second light emission control line EM2(*n*−1), the second light emission control line EM2(*n*), the first light emission control line EM1(*n*+1), and the first light emission control line EM1(*n*+2). Note that FIG. 25 illustrates only the four unit circuits 350(*k*) to 350(*k*+3) corresponding to the eight second light emission control lines EM2(*n*−1) to EM2(*n*+6) and the eight first light emission control lines EM1(*n*+1) to EM1(*n*+8). Each unit circuit 350 has the configuration illustrated in FIG. 14.

The shift register constituting the light emission control line drive circuit 35 is supplied with a clock signal ECK1, a clock signal ECK2, a start pulse ESP (not illustrated in FIG. 25), the high-level power supply voltage GVDD, and the low-level power supply voltage GVSS.

As described above, each unit circuit 350 has the configuration illustrated in FIG. 14. That is, each unit circuit 350 includes input terminals for respectively receiving the clock signal ECK, the set signal SE, the high-level power supply voltage GVDD, and the low-level power supply voltage GVSS, and an output terminal for outputting the output signal EOUT.

The unit circuits 350 at odd-numbered stages are supplied with the clock signal ECK1 as the clock signal ECK. The unit circuits 350 at even-numbered stages are supplied with the clock signal ECK2 as the clock signal ECK. The high-level power supply voltage GVDD and the low-level power supply voltage GVSS are commonly supplied to all unit circuits 350. Further, the unit circuit 350 at each stage is supplied with the output signal EOUT from the unit circuit 350 of the preceding stage as the set signal SE. However, a unit circuit 350(1) at the first stage is supplied with the start pulse ESP as the set signal SE. The output signal EOUT from the unit circuit 350 at each stage is supplied to the corresponding two second light emission control lines EM2 as the second light emission control signal, supplied to the corresponding two first light emission control lines EM1 as the first light emission control signal, and supplied to the unit circuit 350 of the next stage as the set signal SE.

As described above, four light emission control lines (two first light emission control lines EM1 and two second light emission control lines EM2) are established as a set, and light emission control signals having the same waveform are supplied to the four first light emission control lines constituting each set. Specifically, given K as an integer, the unit circuit 350(K) of the K-th stage included in the shift register constituting the light emission control line drive circuit 35 supplies the same signal to the (2K−1)-th second light emission control line EM2(2K−1), the 2K-th second light emission control line EM2(2K), the (2K+1)-th first light emission control line EM1 (2K+1), and the (2K+2)-th first light emission control line EM1 (2K+2), and thus drives the lines collectively.

2.4 Operations

Next, operations of the pixel circuit 20 according to the present embodiment will be described. However, the operations of the pixel circuit 20 during the drive period are the same as those of the first embodiment described above, and thus descriptions thereof will be omitted.

Figure 26:
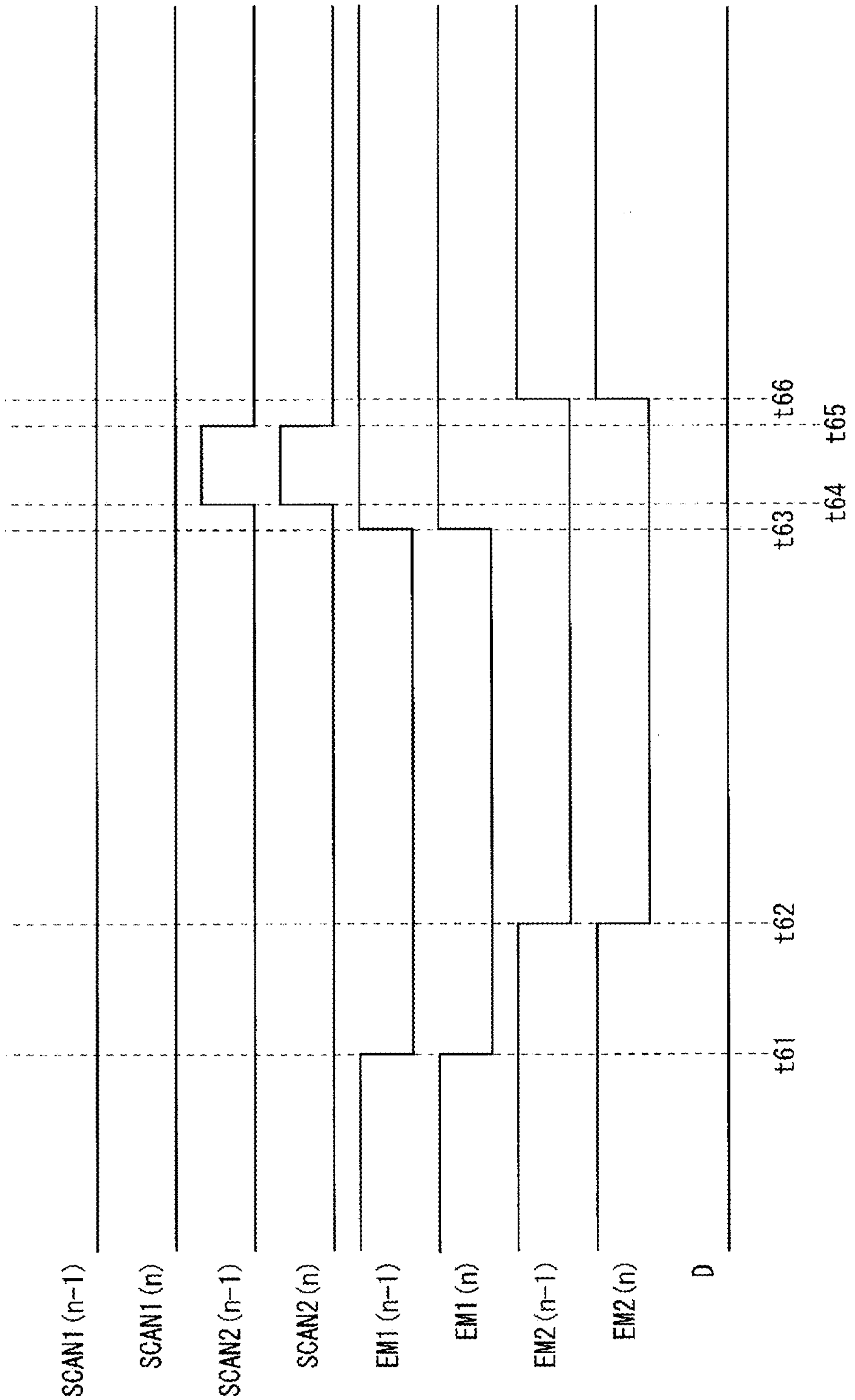
FIG. 26 is a timing chart for describing operations of the pixel circuit in the pause period according to the second embodiment.

The operations of the pixel circuit 20 in the pause period will now be described with reference to a timing chart illustrated in FIG. 26. Herein as well, focus will be placed on the first pixel circuit that is the pixel circuit 20 in the (n−1)-th row and the second pixel circuit that is the pixel circuit 20 in the n-th row. Note that, throughout the pause period, the low-level power supply voltage ELVSS is applied to the data signal line D as an anode reset voltage. Further, throughout the pause period, the first scanning signal SCAN1(*n*−1) and the first scanning signal SCAN1(*n*) are maintained at a low level.

At a time point immediately before time t61, the first scanning signal SCAN1(*n*−1), the first scanning signal SCAN1(*n*), the second scanning signal SCAN2(*n*−1), and the second scanning signal SCAN2(*n*) are at a low level, and the first light emission control signal EM1(*n*−1), the first light emission control signal EM1(*n*), the second light emission control signal EM2(*n*−1), and the second light emission control signal EM2(*n*) are at a high level. At this time, in the first pixel circuit and the second pixel circuit, the writing control transistor T1, the threshold voltage compensation transistor T3, and the initialization transistor T6 are in an off state, and the power supply control transistor T4 and the light emission control transistor T5 are in an on state.

Accordingly, the organic EL element 21 emits light in accordance with the magnitude of the drive current.

At time t61, the first light emission control signal EM1(*n*−1) and the first light emission control signal EM1(*n*) change from a high level to a low level. This places the light emission control transistor T5 in the first pixel circuit and the second pixel circuit in an off state. As a result, the supply of current to the organic EL element 21 is cut off, switching the organic EL element 21 off.

At time t62, the second light emission control signal EM2(*n*−1) and the second light emission control signal EM2(*n*) change from a high level to a low level. This places the power supply control transistor T4 in the first pixel circuit and the second pixel circuit in an off state.

At time t63, the first light emission control signal EM1(*n*−1) and the first light emission control signal EM1(*n*) change from a low level to a high level. This places the light emission control transistor T5 in the first pixel circuit and the second pixel circuit in an on state. At this time, in the first pixel circuit and the second pixel circuit, the power supply control transistor T4 is in an OFF state, and thus the organic EL element 21 is maintained in an OFF state.

At time t64, the second scanning signal SCAN2(*n*−1) and the second scanning signal SCAN2(*n*) change from a low level to a high level. This places the writing control transistor T1 in the first pixel circuit and the second pixel circuit in an on state. At this time, the light emission control transistor T5 is in an on state, and the low-level power supply voltage ELVSS is applied to the data signal line D as described above. From the above, the low-level power supply voltage ELVSS is supplied to the node N3 via the writing control transistor T1 and the light emission control transistor T5. As a result, in the first pixel circuit and the second pixel circuit, the anode voltage of the organic EL element 21 is initialized.

At time t65, the second scanning signal SCAN2(*n*−1) and the second scanning signal SCAN2(*n*) change from a high level to a low level. This places the writing control transistor T1 in the first pixel circuit and the second pixel circuit in an off state.

At time t66, the second light emission control signal EM2(*n*−1) and the second light emission control signal EM2(*n*) change from a low level to a high level. This places the power supply control transistor T4 in the first pixel circuit and the second pixel circuit in an on state. As a result, in the first pixel circuit and the second pixel circuit, a drive current corresponding to the charged voltage of the holding capacitor Cst is supplied to the organic EL element 21, and the organic EL element 21 emits light in accordance with the magnitude of the drive current. Subsequently, in the first pixel circuit and the second pixel circuit, the organic EL element 21 emits light throughout the period until the first light emission control signal EM1(*n*−1) and the first light emission control signal EM1(*n*) next change from a high level to a low level.

In the present embodiment, the first light emission control line EM1 and the second light emission control line EM2 are driven by one shift register. Therefore, unlike the first embodiment described above, the first light emission control signal EM1 cannot be maintained at a high level during the pause period. However, by driving the second scanning signal line SCAN2, the first light emission control line EM1, and the second light emission control line EM2 as described above, it is possible to initialize the anode voltage of the organic EL element 21 in each pixel circuit 20 in the pause period.

2.5 Effect

According to the present embodiment, the first light emission control lines EM1 and the second light emission control lines EM2 arrayed in the display portion 200 are driven by one shift register including unit circuits equal in number to half the number of the first light emission control lines EM1 (the number of the second light emission control lines EM2 is equal to the number of the first light emission control lines EM1). As a result, the area of the circuit region required around the periphery of the display portion 200 in order to drive the first light emission control lines EM1 and the second light emission control lines EM2 is reduced compared with that of the first embodiment described above. From the above, with the organic EL display device including the pixel circuit 20 constituted by one organic EL element 21, six N-channel transistors T1 to T6, and one holding capacitor Cst, it is possible to reduce the frame area as compared with that of the first embodiment described above.

2.6 Modified Example

In the second embodiment described above as well, as in the modified example of the first embodiment described above, the second scanning signal lines SCAN2, the first light emission control lines EM1, and the second light emission control lines EM2 may be driven Q lines at a time, where Q is an integer of 2 or greater. In this regard, in the present modified example, (Q×2) light emission control lines (Q first light emission control lines EM1 and Q second light emission control lines EM2) are driven collectively by each unit circuit included in the shift register constituting the light emission control line drive circuit 35.

For example, in the case of "Q=3," the light emission control line drive circuit 35 is constituted by a shift register including the unit circuits 350 equal in number to one-third the number of the first light emission control lines EM1. Then, six light emission control lines (three first light emission control lines EM1 and three second light emission control lines EM2) are established as a set, and light emission control signals having the same waveform are supplied to the six light emission control lines constituting each set. Specifically, given K as an integer, the unit circuit 350(K) of the K-th stage included in the shift register constituting the light emission control line drive circuit 35 supplies the same signal to the (3K−2)-th second light emission control line EM2(3K−2), the (3K−1)-th second light emission control line EM2(3K−1), the 3K-th second light emission control line EM2(3K), the (3K+1)-th first light emission control line EM1(3K+1), the (3K+2)-th first light emission control line EM1(3K+2), and the (3K+3)-th first light emission control line EM1(3K+3), and thus drives the lines collectively.

Further, for example, in the case of "Q=4," the light emission control line drive circuit 35 is constituted by a shift register including the unit circuits 350 equal in number to one-fourth the number of the first light emission control lines EM1. Then, eight light emission control lines (four first light emission control lines EM1 and four second light emission control lines EM2) are established as a set, and light emission control signals having the same waveform are supplied to the eight light emission control lines constituting each set. Specifically, given K as an integer, the unit circuit 350(K) of the K-th stage included in the shift register constituting the light emission control line drive circuit 35 supplies the same signal to the (4K−3)-th second light emission control line EM2(4K−3), the (4K−2)-th second light emission control line EM2(4K−2), the (4K−1)-th second light emission control line EM2(4K−1), the 4K-th second light emission control line EM2 (4K), the (4K+1)-th first light emission control line EM1(4K+1), the (4K+2)-th first light emission control line EM1(4K+2), the (4K+3)-th first light emission control line EM1(4K+3), and the (4K+4)-th first light emission control line EM1(4K+4), and thus drives the lines collectively.

As described above, in the present modified example, the light emission control line drive circuit 35 is constituted by a shift register including the unit circuits 350 equal in number to one-Qth the number of the first light emission control lines EM1. Then, given K as an integer, the unit circuit 350(K) of the K-th stage included in the shift register constituting the light emission control line drive circuit 35 collectively drives the (Q×K−(Q−1))-th to the (Q×K)-th second light emission control lines EM2, and the (Q×K+1)-th to the (Q×K+Q)-th first light emission control lines EM1.

3. Third Embodiment

3.1 Overview

In the first embodiment described above and the second embodiment described above, the threshold voltage compensation transistor T3 and the initialization transistor T6 are controlled by the same signal (first scanning signal SCAN1). However, no such limitation is intended, and a configuration in which the threshold voltage compensation transistor T3 and the initialization transistor T6 are controlled by different signals (configuration of the present embodiment) can also be employed. This will be described below.

In the present embodiment, the threshold voltage compensation transistor T3 is controlled by the first scanning signal SCAN1, and the initialization transistor T6 is controlled by the third scanning signal SCAN3. The third scanning signal SCAN3 is transmitted by the third scanning signal line.

The overall configuration and operations of the organic EL display device according to the present embodiment are similar to those of the first embodiment described above except that i third scanning signal lines SCAN3(1) to SCAN3(I) are arranged in the display portion 200 (refer to FIG. 2).

3.2. Configuration and Operations of Pixel Circuit

Figure 27:
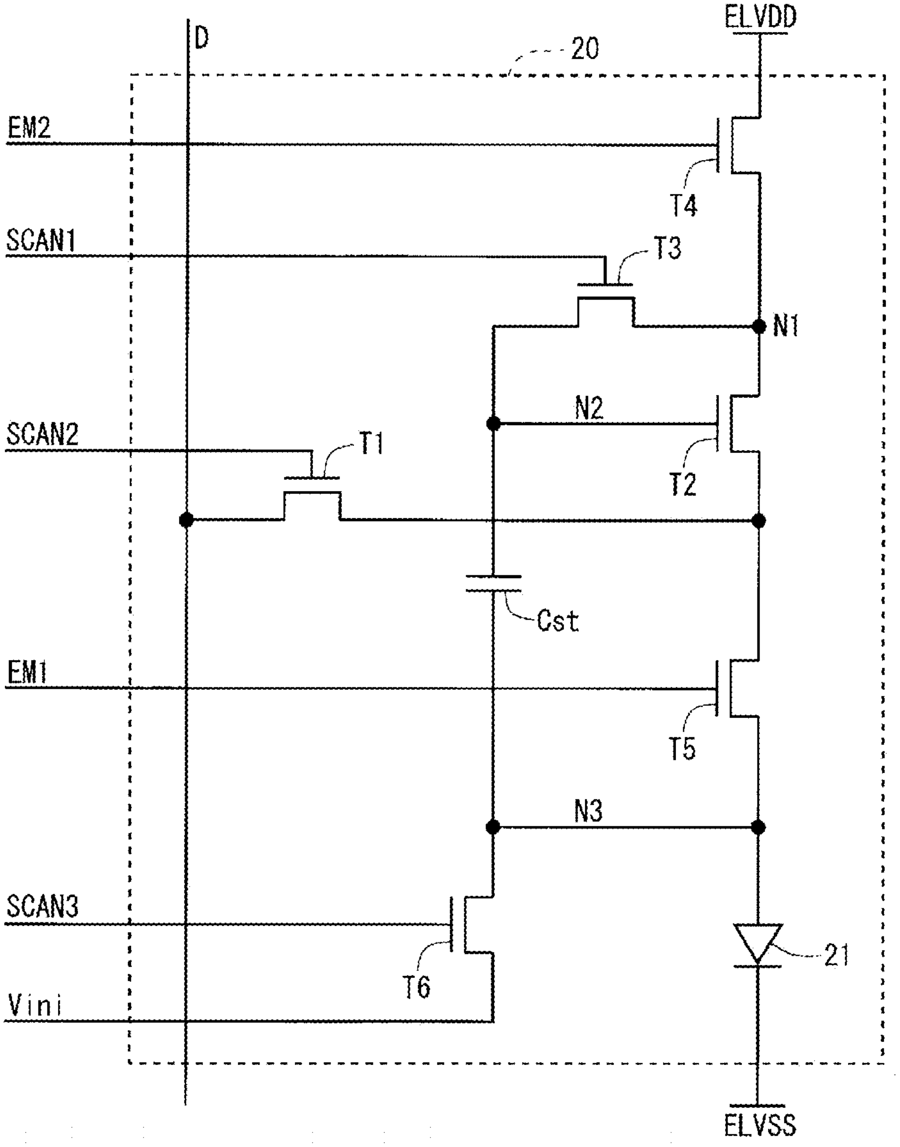
FIG. 27 is a circuit diagram illustrating a configuration of the pixel circuit according to a third embodiment.

FIG. 27 is a circuit diagram illustrating a configuration of the pixel circuit 20 according to the present embodiment. The pixel circuit 20 according to the present embodiment, as in the first embodiment described above, includes one organic EL element 21, six N-channel transistors T1 to T6 (the writing control transistor T1, the drive transistor T2, the threshold voltage compensation transistor T3, the power supply control transistor T4, the light emission control transistor T5, and the initialization transistor T6), and one holding capacitor Cst. In the present embodiment, a control terminal of the initialization transistor T6 is connected to the third scanning signal line SCAN3. Other points are similar to those of the first embodiment described above.

Operations of the pixel circuit 20 illustrated in FIG. 27 will now be described. Note that, in the present embodiment as well, pause driving is adopted. Herein as well, focus will be placed on the first pixel circuit that is the pixel circuit 20 in the (n−1)-th row and the second pixel circuit that is the pixel circuit 20 in the n-th row.

Figure 28:
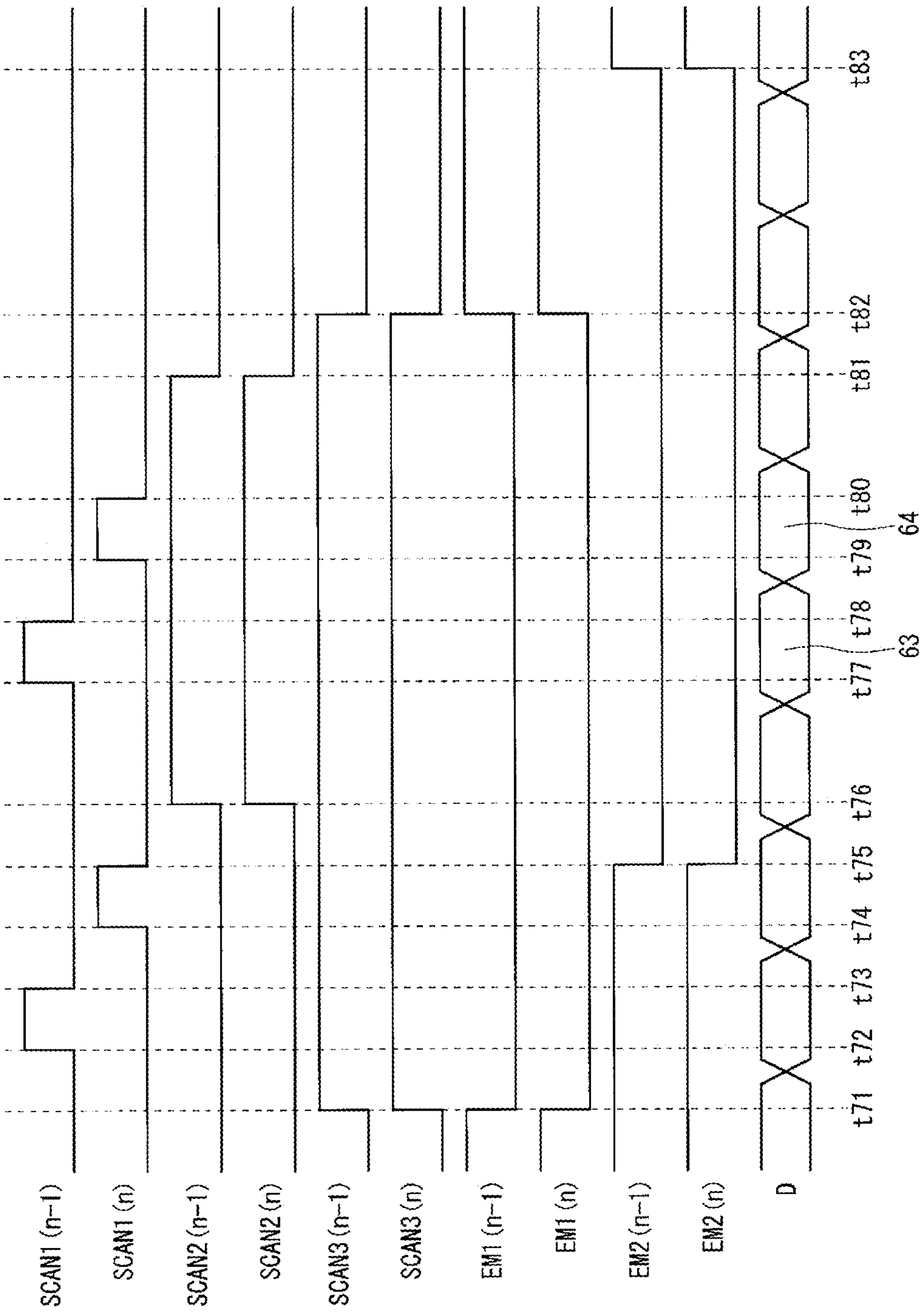
FIG. 28 is a timing chart for describing operations of the pixel circuit in the drive period according to the third embodiment.

First, the operations of the pixel circuit 20 in the drive period will be described with reference to a timing chart illustrated in FIG. 28. Data writing step is realized by the operations in this drive period.

At a time point immediately before time t71, the first scanning signal SCAN1(*n*−1), the first scanning signal SCAN1(*n*), the second scanning signal SCAN2(*n*−1), the second scanning signal SCAN2(*n*), the third scanning signal SCAN3(*n*−1), and the third scanning signal SCAN3(*n*) are at a low level, and the first light emission control signal EM1(*n*−1), the first light emission control signal EM1(*n*), the second light emission control signal EM2(*n*−1), and the second light emission control signal EM2(*n*) are at a high level. At this time, in the first pixel circuit and the second pixel circuit, the writing control transistor T1, the threshold voltage compensation transistor T3, and the initialization transistor T6 are in an off state, and the power supply control transistor T4 and the light emission control transistor T5 are in an on state. Accordingly, the organic EL element 21 emits light in accordance with the magnitude of the drive current.

At time t71, the first light emission control signal EM1(*n*−1) and the first light emission control signal EM1(*n*) change from a high level to a low level. This places the light emission control transistor T5 in the first pixel circuit and the second pixel circuit in an off state. As a result, the supply of current to the organic EL element 21 is cut off, switching the organic EL element 21 off. Further, at time t71, the third scanning signal SCAN3(*n*−1) and the third scanning signal SCAN3(*n*) change from a low level to a high level. This places the initialization transistor T6 in an on state and supplies the initialization voltage Vini to the node N3 in the first pixel circuit and the second pixel circuit. As a result, in the first pixel circuit and the second pixel circuit, the anode voltage of the organic EL element 21 is initialized.

At time t72, the first scanning signal SCAN1(*n*−1) changes from a low level to a high level. This places the threshold voltage compensation transistor T3 in the first pixel circuit in an on state. At this time, the power supply control transistor T4 is maintained in an on state. Further, the initialization transistor T6 is in an on state at time t71. From the above, in the first pixel circuit, the high-level power supply voltage ELVDD is supplied to the node N2 with the initialization voltage Vini supplied to the node N3. As a result, in the first pixel circuit, the holding voltage of the holding capacitor Cst is initialized.

At time t73, the first scanning signal SCAN1(*n*−1) changes from a high level to a low level. This places the threshold voltage compensation transistor T3 in the first pixel circuit in an off state.

At time t74, the first scanning signal SCAN1(*n*) changes from a low level to a high level. This places the threshold voltage compensation transistor T3 in the second pixel circuit in an on state. At this time, the power supply control transistor T4 is maintained in an on state. Further, the initialization transistor T6 is in an on state at time t71. From the above, in the second pixel circuit, the high-level power supply voltage ELVDD is supplied to the node N2 with the initialization voltage Vini supplied to the node N3. As a result, in the second pixel circuit, the holding voltage of the holding capacitor Cst is initialized.

At time t75, the first scanning signal SCAN1(*n*) changes from a high level to a low level. This places the threshold voltage compensation transistor T3 in the second pixel circuit in an off state. Further, at time t75, the second light emission control signal EM2(*n*-1) and the second light emission control signal EM2(*n*) change from a high level to a low level. This places the power supply control transistor T4 in the first pixel circuit and the second pixel circuit in an off state.

At time t76, the second scanning signal SCAN2(*n*−1) and the second scanning signal SCAN2(*n*) change from a low level to a high level. This places the writing control transistor T1 in the first pixel circuit and the second pixel circuit in an on state.

At time t77, the first scanning signal SCAN1(*n*−1) changes from a low level to a high level. This places the threshold voltage compensation transistor T3 in the first pixel circuit in an on state. At this time, the power supply control transistor T4 and the light emission control transistor T5 are in an off state. Further, the initialization voltage Vini is supplied to the node N3. From the above, in the first pixel circuit, the data signal D is supplied to the node N2 via the writing control transistor T1, the drive transistor T2, and the threshold voltage compensation transistor T3. As a result, in the first pixel circuit, the holding capacitor Cst is charged with a voltage corresponding to the data signal D so as to compensate for the variation in the threshold voltage of the drive transistor T2.

At time t78, the first scanning signal SCAN1(*n*−1) changes from a high level to a low level. This places the threshold voltage compensation transistor T3 in the first pixel circuit in an off state.

At time t79, the first scanning signal SCAN1(*n*) changes from a low level to a high level. This places the threshold voltage compensation transistor T3 in the second pixel circuit in an on state. At this time, the power supply control transistor T4 and the light emission control transistor T5 are in an off state. Further, the initialization voltage Vini is supplied to the node N3. From the above, in the second pixel circuit, the data signal D is supplied to the node N2 via the writing control transistor T1, the drive transistor T2, and the threshold voltage compensation transistor T3. As a result, in the second pixel circuit, the holding capacitor Cst is charged with a voltage corresponding to the data signal D so as to compensate for the variation in the threshold voltage of the drive transistor T2.

At time t80, the first scanning signal SCAN1(*n*) changes from a high level to a low level. This places the threshold voltage compensation transistor T3 in the second pixel circuit in an off state.

At time t81, the second scanning signal SCAN2(*n*−1) and the second scanning signal SCAN2(*n*) change from a high level to a low level. This places the writing control transistor T1 in the first pixel circuit and the second pixel circuit in an off state.

At time t82, the first light emission control signal EM1 (*n*−1) and the first light emission control signal EM1(*n*) change from a low level to a high level. This places the light emission control transistor T5 in the first pixel circuit and the second pixel circuit in an on state. At this time, the power supply control transistor T4 is maintained in an off state. Accordingly, in the first pixel circuit and the second pixel circuit, the organic EL element 21 is maintained in an off state. Further, at time t82, the third scanning signal SCAN3 (*n*−1) and the third scanning signal SCAN3(*n*) change from a high level to a low level. This places the initialization transistor T6 in the first pixel circuit and the second pixel circuit in an off state.

At time t83, the second light emission control signal EM2(*n*−1) and the second light emission control signal EM2(*n*) change from a low level to a high level. This places the power supply control transistor T4 in the first pixel circuit and the second pixel circuit in an on state. As a result, in the first pixel circuit and the second pixel circuit, a drive current corresponding to the charged voltage of the holding capacitor Cst is supplied to the organic EL element 21, and the organic EL element 21 emits light in accordance with the magnitude of the drive current. Subsequently, in the first pixel circuit and the second pixel circuit, the organic EL element 21 emits light throughout the period until the first light emission control signal EM1(*n*−1) and the first light emission control signal EM1(*n*) next change from a high level to a low level.

Figure 29:
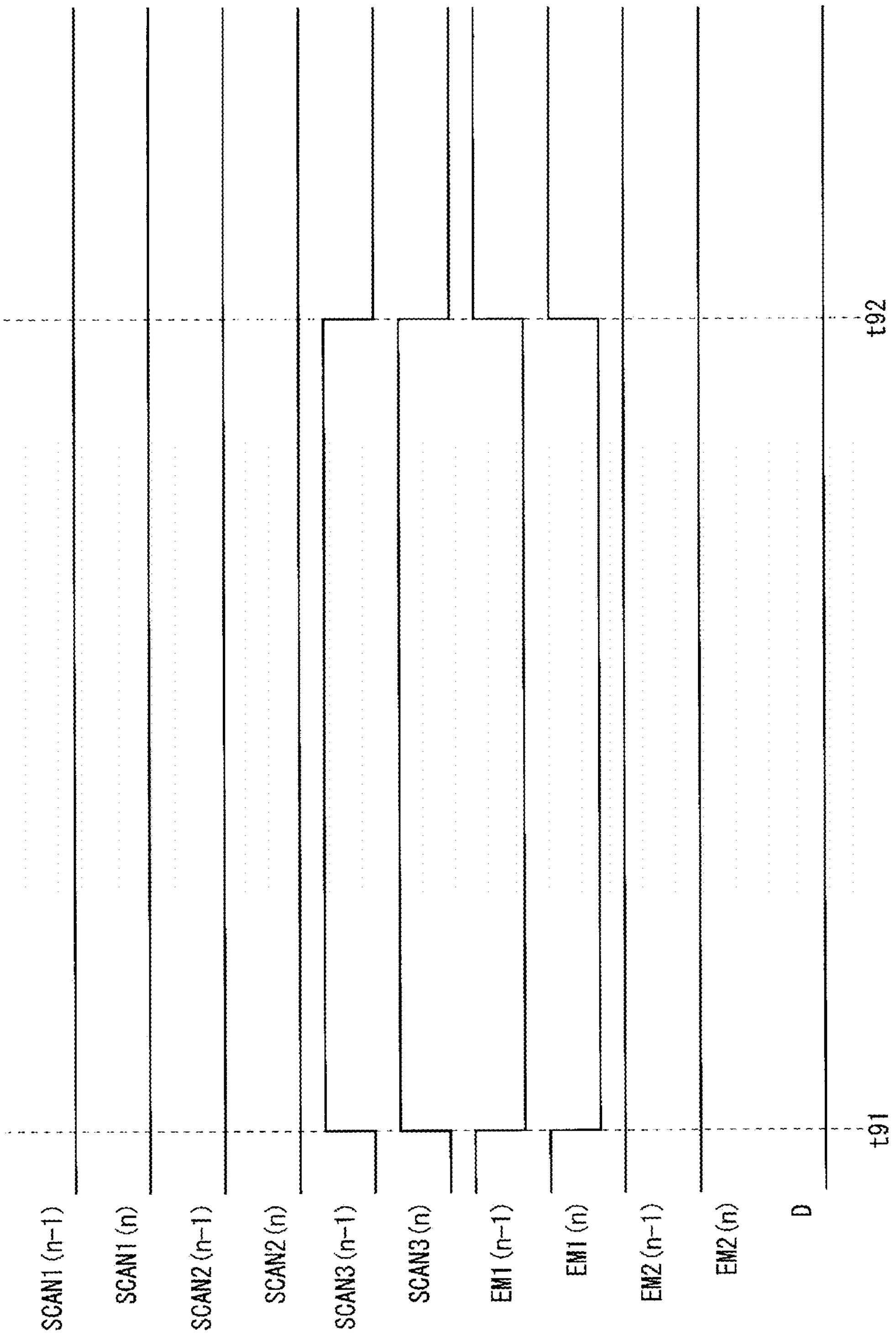
FIG. 29 is a timing chart for describing operations of the pixel circuit in the pause period according to the third embodiment.

Next, the operations of the pixel circuit 20 in the pause period will be described with reference to a timing chart illustrated in FIG. 29. Note that, in the present embodiment, the data signal line D is maintained in a high impedance state throughout the pause period. The pause step is realized by the operations in the pause period.

At a time point immediately before time t91, the organic EL element 21 emits light in accordance with the magnitude of the drive current in the first pixel circuit and the second pixel circuit, similarly to the time point immediately before time t71 (refer to FIG. 28) in the drive period.

At time t91, the first light emission control signal EM1 (*n*−1) and the first light emission control signal EM1(*n*) change from a high level to a low level. This places the light emission control transistor T5 in the first pixel circuit and the second pixel circuit in an off state. As a result, the supply of current to the organic EL element 21 is cut off, switching the organic EL element 21 off. Further, at time t91, the third scanning signal SCAN3(*n*−1) and the third scanning signal SCAN3(*n*) change from a low level to a high level. This places the initialization transistor T6 in an on state and supplies the initialization voltage Vini to the node N3 in the first pixel circuit and the second pixel circuit. As a result, in the first pixel circuit and the second pixel circuit, the anode voltage of the organic EL element 21 is initialized.

At time t92, the first light emission control signal EM1 (*n*−1) and the first light emission control signal EM1(*n*) change from a low level to a high level. This places the light emission control transistor T5 in the first pixel circuit and the second pixel circuit in an on state. Further, at time t92, the third scanning signal SCAN3(*n*−1) and the third scanning signal SCAN3(*n*) change from a high level to a low level. This places the initialization transistor T6 in the first pixel circuit and the second pixel circuit in an off state. At this time, the power supply control transistor T4 is maintained in an on state. Accordingly, in the first pixel circuit and the second pixel circuit, a drive current corresponding to the charged voltage of the holding capacitor Cst is supplied to the organic EL element 21, and the organic EL element 21 emits light in accordance with the magnitude of the drive current. Subsequently, in the first pixel circuit and the second pixel circuit, the organic EL element 21 emits light throughout the period until the first light emission control signal EM1(*n*−1) and the first light emission control signal EM1(*n*) next change from a high level to a low level.

3.3 Schematic Configuration of Scanning-Side Drive Circuit

Figure 30:
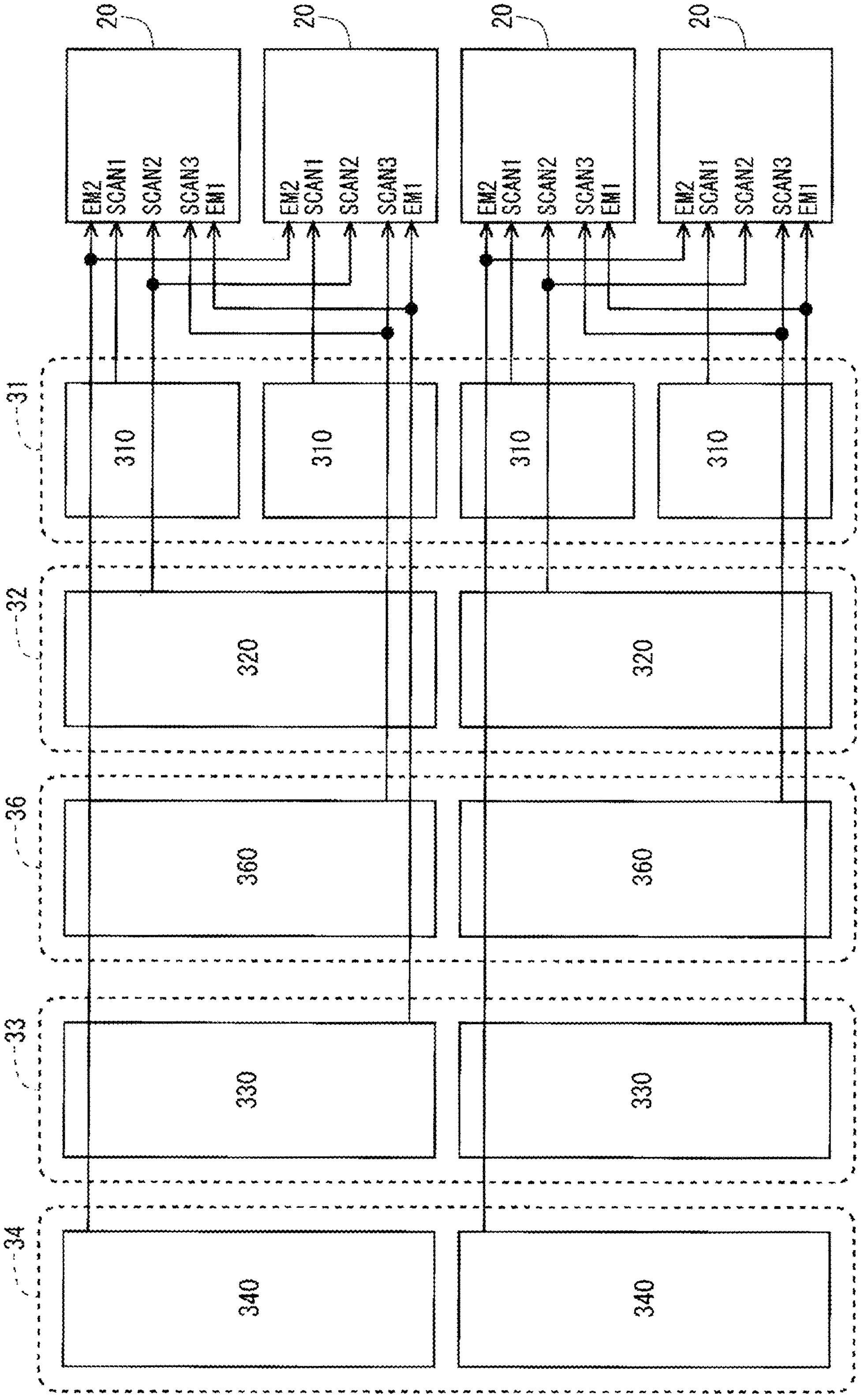
FIG. 30 is a block diagram illustrating a schematic configuration of the scanning-side drive circuit according to the third embodiment.

FIG. 30 is a block diagram illustrating a schematic configuration of the scanning-side drive circuit 300 in the present embodiment. The scanning-side drive circuit 300 is constituted by the first scanning signal line drive circuit 31, the second scanning signal line drive circuit 32, a third scanning signal line drive circuit 36, the first light emission control line drive circuit 33, and the second light emission control line drive circuit 34. The first scanning signal line drive circuit 31 applies the first scanning signals SCAN1 to the first scanning signal lines, the second scanning signal line drive circuit 32 applies the second scanning signals SCAN2 to the second scanning signal lines, the third scanning signal line drive circuit 36 applies the third scanning signals SCAN3 to the third scanning signal lines, the first light emission control line drive circuit 33 applies the first light emission control signals EM1 to the first light emission control lines, and the second light emission control line drive circuit 34 applies the second light emission control signals EM2 to the second light emission control lines.

The first scanning signal line drive circuit 31, the second scanning signal line drive circuit 32, the first light emission control line drive circuit 33, and the second light emission control line drive circuit 34 have the same configurations as those of the first embodiment described above. Accordingly, a detailed description of the configurations thereof will be omitted.

The third scanning signal line drive circuit 36 is constituted by a shift register including unit circuits 360 equal in number to half the number of the third scanning signal lines SCAN3. That is, each unit circuit included in the shift register constituting the third scanning signal line drive circuit 36 corresponds to two third scanning signal lines SCAN3. Accordingly, the i third scanning signal lines SCAN3(1) to SCAN3(*i*) are driven two by two by the third scanning signal line drive circuit 36.

3.4 Third Scanning Signal Line Drive Circuit

Figure 31:
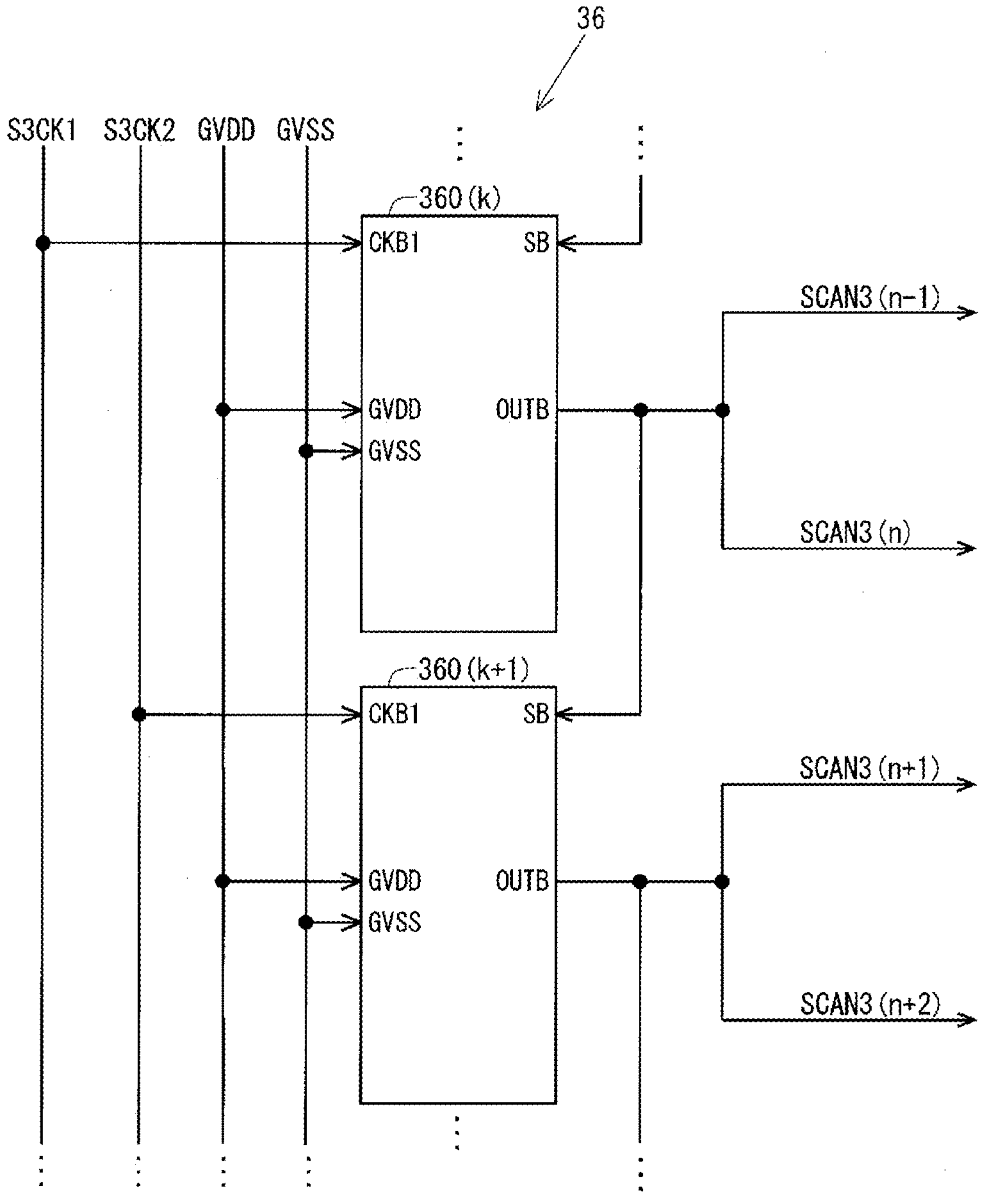
FIG. 31 is a block diagram illustrating a configuration of a third scanning signal line drive circuit according to the third embodiment.

FIG. 31 is a block diagram illustrating a configuration of the third scanning signal line drive circuit 36. As in the second scanning signal line drive circuit 32, given p=i/2, the third scanning signal line drive circuit 36 is constituted by a shift register composed of p stages (p unit circuits 360). Each stage (each unit circuit 360) corresponds to two third scanning signal lines SCAN3 adjacent to each other.

As illustrated in FIG. 31, the shift register constituting the third scanning signal line drive circuit 36 is supplied with a clock signal S3CK1, a clock signal S3CK2, a start pulse E3SP (not illustrated in FIG. 31), the high-level power supply voltage GVDD, and the low-level power supply voltage GVSS. Other points are the same as those of the second scanning signal line drive circuit 32, and thus a detailed description of the third scanning signal line drive circuit 36 will be omitted.

3.5 Overall Operations

Overall operations will be described below. However, the operations described hereinafter are also merely examples, and no such limitation is intended.

Figure 32:
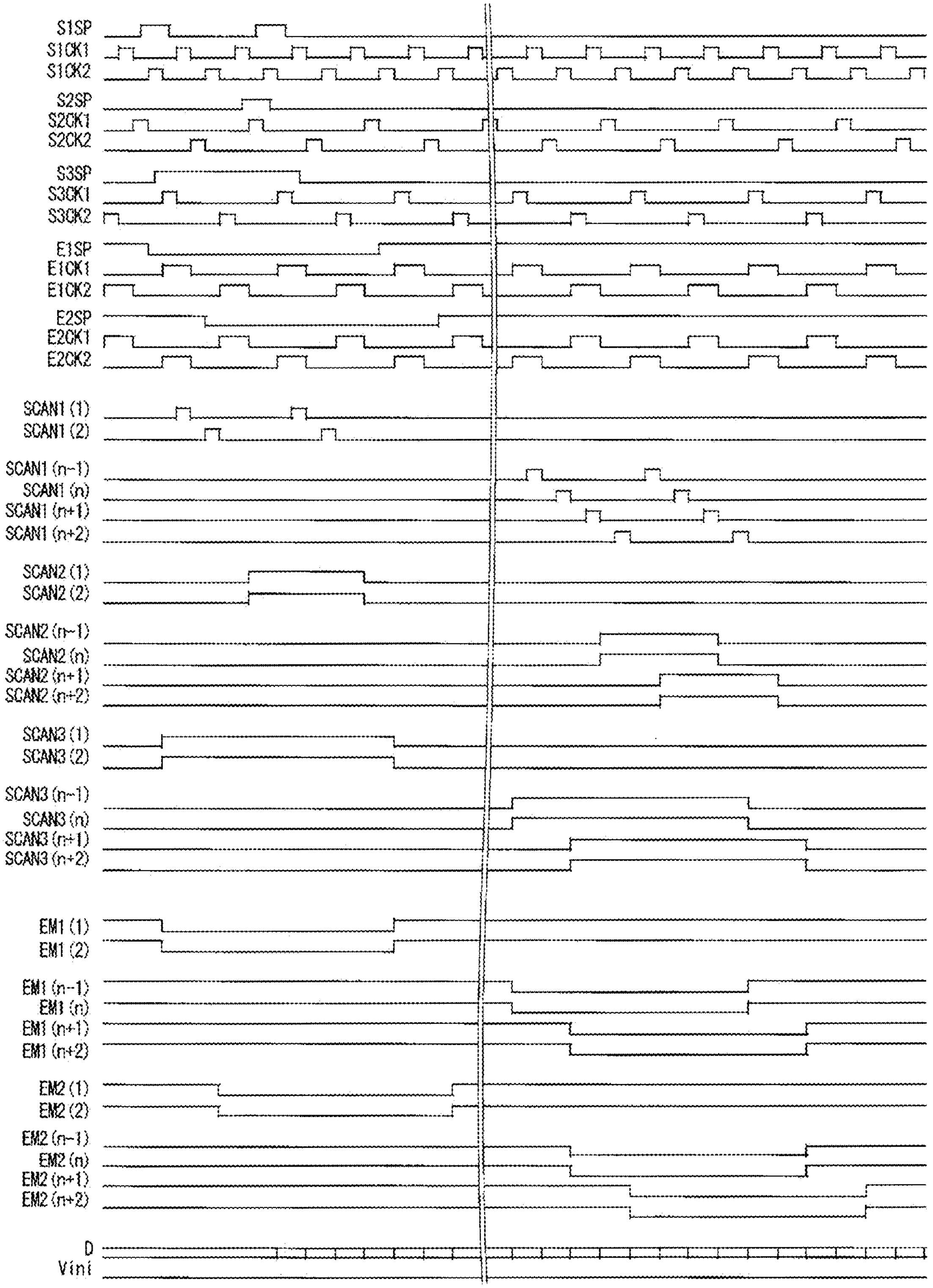
FIG. 32 is a timing chart for describing overall operations in the drive period according to the third embodiment.

First, overall operations in the drive period will be described with reference to a timing chart illustrated in FIG. 32. A pulse width (length of the high-level period) of the start pulse S3SP is 5H. For the clock signals S3CK1, S3CK2, the length of the high-level period is 0.5H, and the length of the low-level period is 3.5H. The other signals are similar to those of the first embodiment described above.

The clock signal E1CK1 changes from a low level to a high level after the start pulse E1SP changes from a high level to a low level, thereby changing the light emission control signals EM1(1), EM1(2) from a high level to a low level. This places the light emission control transistor T5 in an off state, switching the organic EL element 21 off, in the pixel circuit 20 of the first row and the pixel circuit 20 of the second row. Further, after the start pulse S3SP changes from a low level to a high level, the clock signal S3CK1 changes from a low level to a high level, thereby changing the third scanning signals SCAN3(1), SCAN3(2) from a low level to a high level. As a result, in the pixel circuit 20 of the first row and the pixel circuit 20 of the second row, the initialization transistor T6 is placed in an on state and the anode voltage of the organic EL element 21 is initialized. In this example, the timing at which the light emission control signals EM1(1), EM1 (2) change from a high level to a low level is the same as the timing at which the third scanning signals SCAN3(1), SCAN3(2) change from a low level to a high level. Note that, before the start pulse E1SP changes from a high level to a low level, the start pulse S1SP changes from a low level to a high level.

Subsequently, the clock signal S1CK1 changes from a low level to a high level, thereby changing the first scanning signal SCAN1(1) from a low level to a high level. This places the threshold voltage compensation transistor T3 in an on state, and initializes the holding voltage of the holding capacitor Cst in the pixel circuit 20 of the first row. Furthermore, the clock signal S1CK2 changes from a low level to a high level, thereby changing the first scanning signal SCAN1(2) from a low level to a high level. This places the threshold voltage compensation transistor T3 in an on state, and initializes the holding voltage of the holding capacitor Cst in the pixel circuit 20 of the second row. Note that, at the timing at which the first scanning signal SCAN1(2) changes from a low level to a high level, the start pulse E2SP changes from a high level to a low level.

Subsequently, the clock signal E2CK1 changes from a low level to a high level, thereby changing the second light emission control signals EM2(1), EM2(2) from a high level to a low level. This places the power supply control transistor T4 in the pixel circuit 20 of the first row and the pixel circuit 20 of the second row in an off state.

Subsequently, after the start pulse S2SP changes from a low level to a high level, the clock signal S2CK1 changes from a low level to a high level, thereby changing the second scanning signals SCAN2(1), SCAN2(2) from a low level to a high level. This places the writing control transistor T1 in the pixel circuit 20 of the first row and the pixel circuit 20 of the second row in an on state.

Subsequently, the start pulse S1SP changes from a low level to a high level again. Then, the clock signal S1CK1 changes from a low level to a high level, changing the first scanning signal SCAN1(1) from a low level to a high level. This places the threshold voltage compensation transistor T3 in an on state in the pixel circuit 20 of the first row. At this time, in the pixel circuit 20 in the first row, the power supply control transistor T4 and the light emission control transistor T5 are in an off state, and the initialization transistor T6 is in an on state. Accordingly, in the pixel circuit 20 of the first row, the holding capacitor Cst is charged with a voltage corresponding to the data signal D so as to compensate for the variation in the threshold voltage of the drive transistor T2. Furthermore, the clock signal S1CK2 changes from a low level to a high level, thereby changing the first scanning signal SCAN1(2) from a low level to a high level and, in the pixel circuit 20 of the second row, charging the holding capacitor Cst with the voltage corresponding to the data signal D so as to compensate for the variation of the threshold voltage of the drive transistor T2.

On the basis of the operations of the clock signals S1CK1, S1CK2, S2CK1, S2CK2, S3CK1, S3CK2, E1CK1, E1CK2, E2CK1, and E2CK2, the same operations are sequentially performed in the pixel circuits 20 of the third to i-th rows. At this time, as understood from FIG. 32, the first scanning signal lines SCAN1 are driven one by one, and the second scanning signal lines SCAN2, the third scanning signal lines SCAN3, the first light emission control lines EM1, and the second light emission control lines EM2 are driven two by two. With the third scanning signal lines SCAN3, the first light emission control lines EM1 and the second light emission control lines EM2 being driven two by two, initialization of the anode voltage of the organic EL element 21 and switching between the lighting state and the non-lighting state of the organic EL element 21 are performed two rows at a time. Further, the second scanning signal lines SCAN2 and the third scanning signal lines SCAN3 are driven two by two, but the first scanning signal lines SCAN1 are driven one by one, and thus initialization of the holding voltage of the holding capacitor Cst and writing of data to the pixel circuits 20 are performed one row at a time.

Figure 33:
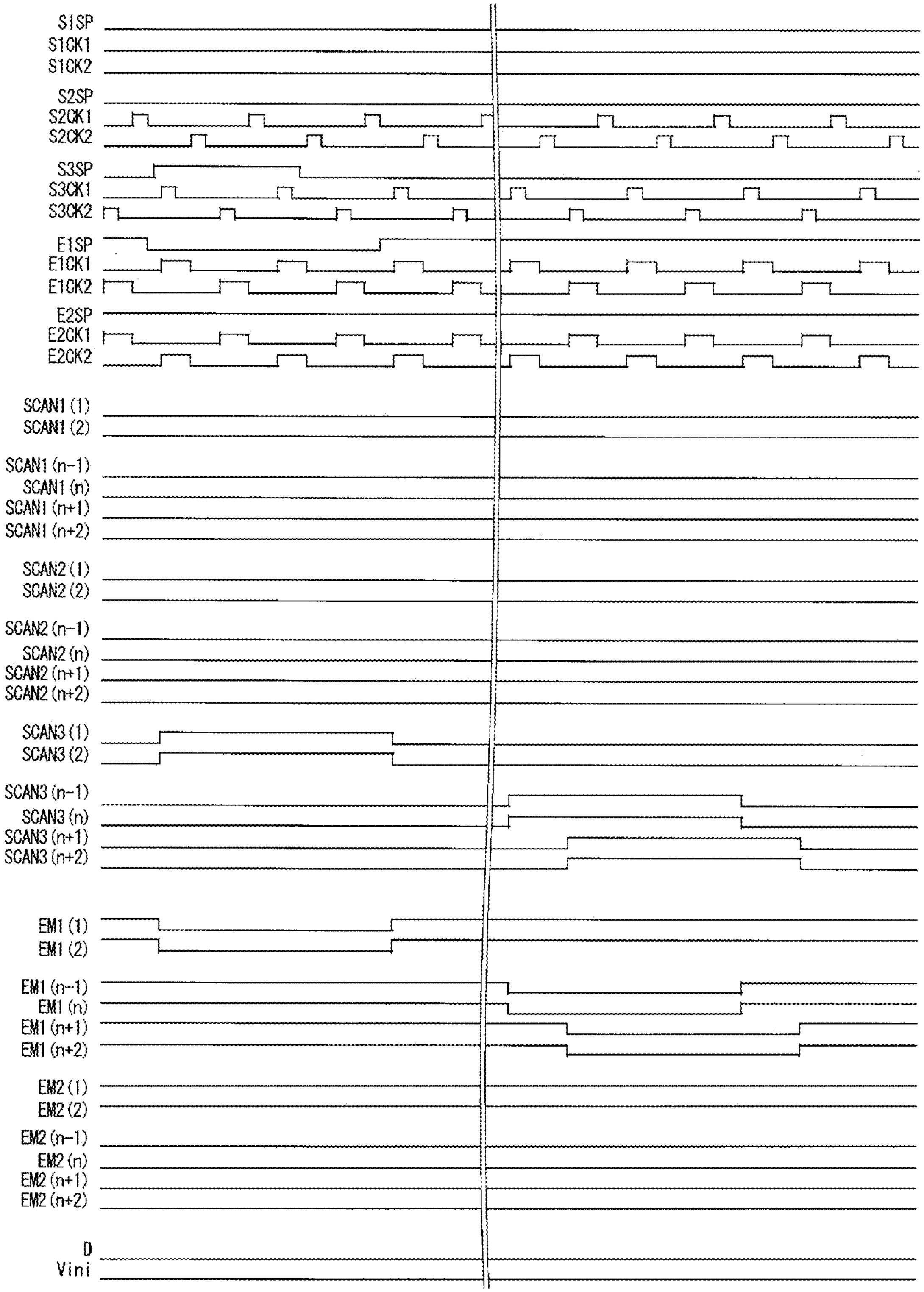
FIG. 33 is a timing chart for describing overall operations in the pause period according to the third embodiment.

Next, overall operations in the pause period will be described with reference to the timing chart illustrated in FIG. 33. A pulse width (length of the high-level period) of the start pulse S3SP is 5H. For the clock signals S3CK1, S3CK2, the length of the high-level period is 0.5H, and the length of the low-level period is 3.5H. A pulse width (length of the low-level period) of the start pulses E1SP is 8H. The clock signals S2CK1, S2CK2, E1CK1, E1CK2, E2CK1, and E2CK2 are similar to those in the first embodiment described above. Note that the start pulses S1SP, S2SP and the clock signals S1CK1, S1CK2 are maintained at a low level throughout the pause period, and the start pulse E2SP is maintained at a high level throughout the pause period. Further, as described above, all data signal lines D are maintained in the high-impedance state throughout the pause period.

The clock signal E1CK1 changes from a low level to a high level after the start pulse E1SP changes from a high level to a low level, thereby changing the light emission control signals EM1(1), EM1(2) from a high level to a low level. This places the light emission control transistor T5 in an off state, switching the organic EL element 21 off, in the pixel circuit 20 of the first row and the pixel circuit 20 of the second row. Further, after the start pulse S3SP changes from a low level to a high level, the clock signal S3CK1 changes from a low level to a high level, thereby changing the third scanning signals SCAN3(1), SCAN3(2) from a low level to a high level. As a result, in the pixel circuit 20 of the first row and the pixel circuit 20 of the second row, the initialization transistor T6 is placed in an on state and the anode voltage of the organic EL element 21 is initialized.

Subsequently, after the start pulse S3SP changes from a high level to a low level, the clock signal S3CK1 changes from a low level to a high level, thereby changing the third scanning signals SCAN3(1), SCAN3(2) from a high level to a low level. This places the initialization transistor T6 in the pixel circuit 20 of the first row and the pixel circuit 20 of the second row in an off state. Further, after the start pulse E1SP changes from a low level to a high level, the clock signal E1CK1 changes from a low level to a high level, thereby changing the light emission control signals EM1(1), EM1(2) from a low level to a high level. This places the light emission control transistor T5 in the pixel circuit 20 of the first row and the pixel circuit 20 of the second row in an on state. From the above, in the first pixel circuit and the second pixel circuit, a drive current in accordance with the charged voltage of the holding capacitor Cst is supplied to the organic EL element 21, and the organic EL element 21 emits light in accordance with the magnitude of the drive current.

On the basis of the operations of the clock signals S3CK1, S3CK2, E1CK1, and E1CK2, the same operations are sequentially performed in the pixel circuits 20 of the third to i-th rows. At this time, with the third scanning signal lines SCAN3 and the first light emission control lines EM1 being driven two by two, initialization of the anode voltage of the organic EL element 21 is performed two rows at a time.

3.6 Effects

According to the present embodiment, as in the first embodiment described above, frame narrowing of the organic EL display device including the pixel circuit 20 (refer to FIG. 27) constituted by one organic EL element 21, six N-channel transistors T1 to T6, and one holding capacitor Cst is realized.

3.7 Modified Example

Figure 34:
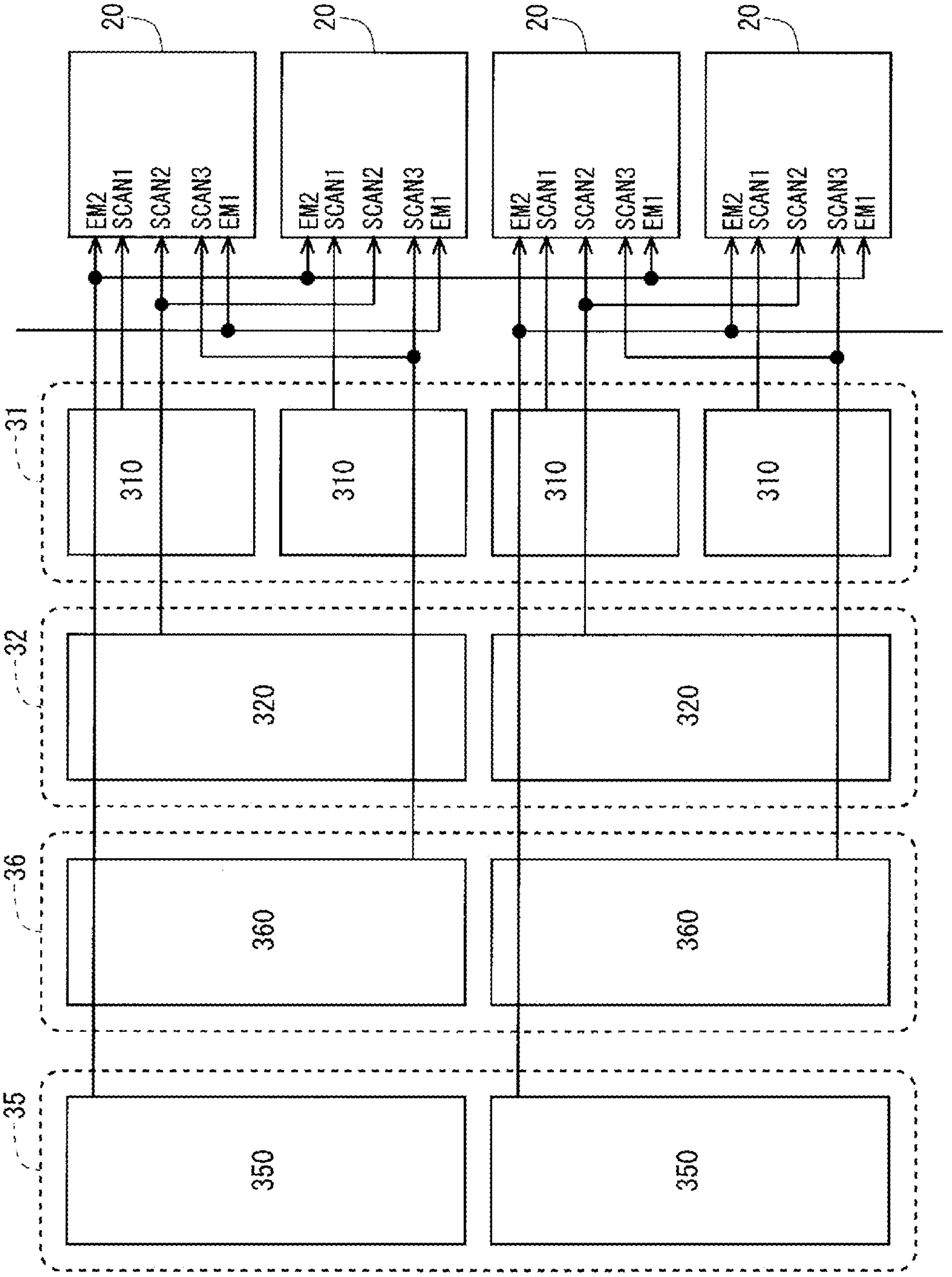
FIG. 34 is a block diagram illustrating a schematic configuration of a scanning-side drive circuit according to a modified example of the third embodiment.
Figure 35:
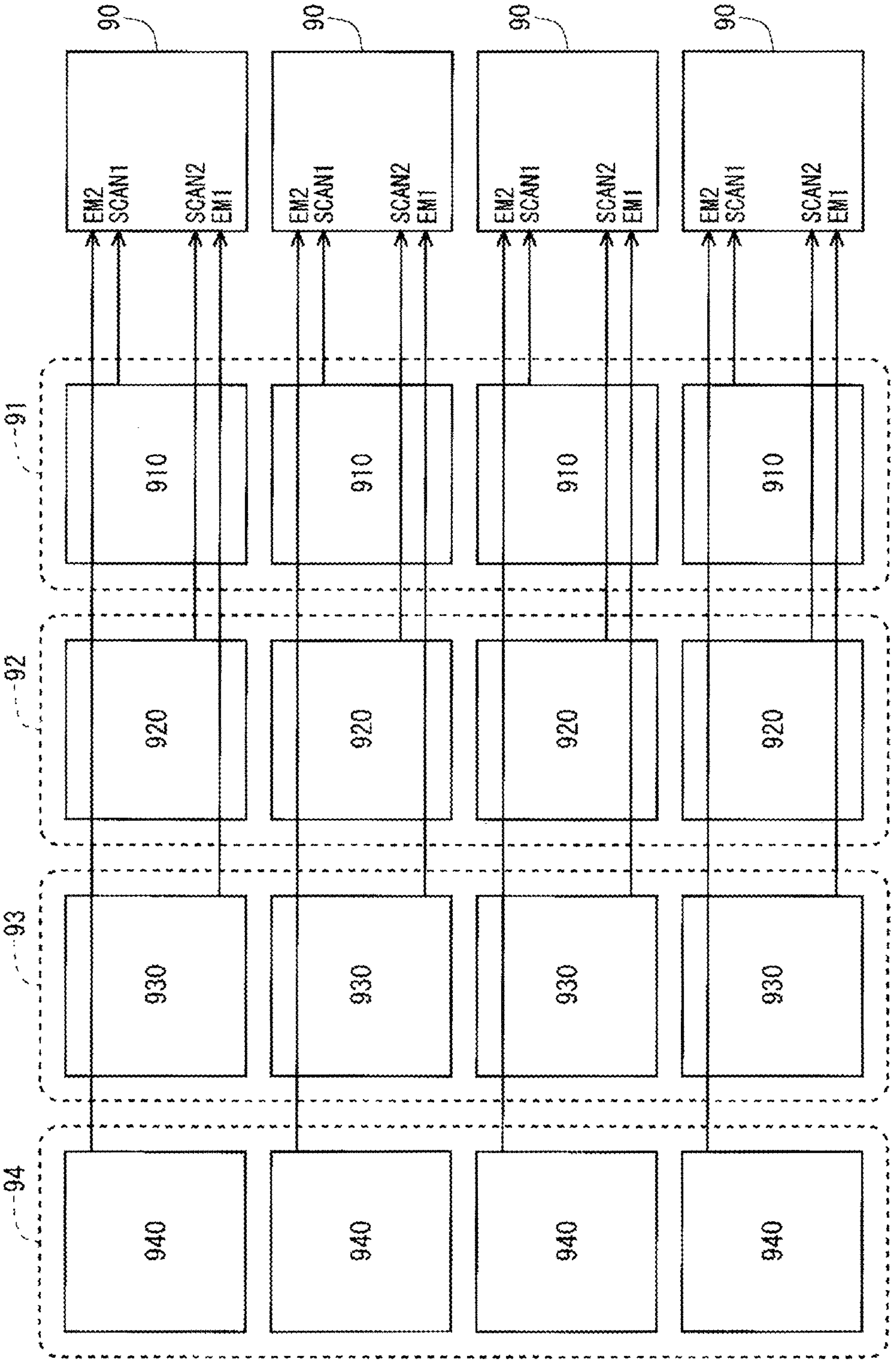
FIG. 35 is a block diagram illustrating a schematic configuration of a scanning-side drive circuit according to an example in the related art.

In the third embodiment described above, the first light emission control line drive circuit 33 for driving the first light emission control lines EM1 and the second light emission control line drive circuit 34 for driving the second light emission control lines EM2 are separately provided. However, it is also possible to adopt a configuration in which the first light emission control lines EM1 and the second light emission control lines EM2 are driven by one shift register as in the second embodiment described above. That is, as illustrated in FIG. 34, the light emission control line drive circuit 35 having the same configuration as that in the second embodiment described above may be provided instead of the first light emission control line drive circuit 33 and the second light emission control line drive circuit 34.

Further, as in the modified example of the first embodiment described above, the second scanning signal lines SCAN2, the third scanning signal lines SCAN3, the first light emission control lines EM1, and the second light emission control lines EM2 may be driven three or more at a time.

4. Other

Although the above-described respective embodiments (including the modified examples) have been described with the organic EL display devices having been exemplified, the embodiment is not limited to these devices. The disclosure contents described above can be applied to an inorganic EL display device, a quantum dot light-emitting diode (QLED) display device, or the like as long as the display device includes a display element driven by a current.

REFERENCE SIGNS LIST

5 Organic EL display panel
20 Pixel circuit
21 Organic EL element
31 First scanning signal line drive circuit
32 Second scanning signal line drive circuit
33 First light emission control line drive circuit
34 Second light emission control line drive circuit
35 Light emission control line drive circuit
36 Third scanning signal line drive circuit
100 Display control circuit
200 Display portion
300 Scanning-side drive circuit
310, 320, 330, 340, 350, 360 Unit circuit
400 Data-side drive circuit
SCAN1 First scanning signal line, first scanning signal SCAN2 Second scanning signal line, second scanning signal SCAN3 Third scanning signal line, third scanning signal EM1 First light emission control line, first light emission control signal EM2 Second light emission control line, second light emission control signal T1 Writing control transistor T2 Drive transistor T3 Threshold voltage compensation transistor T4 Power supply control transistor T5 Light emission control transistor T6 Initialization transistor

The invention claimed is:

1. A display device using a display element driven by a current, the display device comprising:

a display portion including a plurality of data signal lines, a plurality of first scanning signal lines, a plurality of second scanning signal lines, a plurality of first light emission control lines, a plurality of second light emission control lines, a first power source line, a second power source line, an initialization power source line, and a plurality of pixel circuits;

a data-side drive circuit configured to apply data signals to the plurality of data signal lines; and a scanning-side drive circuit including a first scanning signal line drive circuit configured to selectively drive the plurality of first scanning signal lines, a second scanning signal line drive circuit configured to selectively drive the plurality of second scanning signal lines, and a light emission control line drive circuit configured to selectively drive the plurality of first light emission control lines and the plurality of second light emission control lines, wherein each of the plurality of pixel circuits corresponds to one of the plurality of data signal lines, one of the plurality of first scanning signal lines, one of the plurality of second scanning signal lines, one of the plurality of first light emission control lines, and one of the plurality of second light emission control lines, each of the plurality of pixel circuits includes the display element including a first terminal, and a second terminal connected to the second power source line, a drive transistor including a control terminal, a first conduction terminal, and a second conduction terminal, and provided in series with the display element, a holding capacitor connected at one end to the control terminal of the drive transistor, a writing control transistor including a control terminal connected to a corresponding second scanning signal line, a first conduction terminal connected to a corresponding data signal line, and a second conduction terminal connected to the second conduction terminal of the drive transistor, a threshold voltage compensation transistor including a control terminal connected to a corresponding first scanning signal line, a first conduction terminal connected to the first conduction terminal of the drive transistor, and a second conduction terminal connected to the control terminal of the drive transistor, a power supply control transistor including a control terminal connected to a corresponding second light emission control line, a first conduction terminal connected to the first power source line, and a second conduction terminal connected to the first conduction terminal of the drive transistor, a light emission control transistor including a control terminal connected to a corresponding first light emission control line, a first conduction terminal connected to the second conduction terminal of the drive transistor, and a second conduction terminal connected to the first terminal of the display element, and an initialization transistor including a control terminal connected to a corresponding first scanning signal line, a first conduction terminal connected to the first terminal of the display element, and a second conduction terminal connected to the initialization power source line, the first scanning signal line drive circuit is constituted by a shift register including unit circuits equal in number to a number of the plurality of first scanning signal lines, the second scanning signal line drive circuit is constituted by a shift register including unit circuits equal in number to 1/Q of a number of the plurality of second scanning signal lines, where Q is an integer of 2 or greater, each of the unit circuits included in the shift register constituting the first scanning signal line drive circuit drives one corresponding first scanning signal line, each of the unit circuits included in the shift register constituting the second scanning signal line drive circuit collectively drives Q second scanning signal lines corresponding thereto and adjacent to each other, and in a period during which the writing control transistor is maintained in an on state in all pixel circuits each being connected to any one of Q second scanning signal lines collectively driven in a period during which the power supply control transistor and the light emission control transistor are maintained in an off state in the all pixel circuits each being connected to any one of the Q second scanning signal lines collectively driven, Q first scanning signal lines corresponding to the Q second scanning signal lines collectively driven are sequentially set to a select state for a predetermined period each.

2. The display device according to claim 1, wherein each of the unit circuits included in the shift register constituting the second scanning signal line drive circuit is configured to receive a set signal and a control clock signal, change the Q second scanning signal lines corresponding thereto from a non-select state to a select state when the control clock signal changes from an off level to an on level for the first time after the set signal changes from an off level to an on level, and change the Q second scanning signal lines corresponding thereto from a select state to a non-select state when the control clock signal changes from an off level to an on level for the first time after the set signal changes from an on level to an off level.

3. The display device according to claim 2, wherein each of the unit circuits included in the shift register constituting the second scanning signal line drive circuit includes a first internal node, a second internal node, a third internal node, a fourth internal node, an output terminal connected to the Q second scanning signal lines corresponding thereto, a first transistor including a control terminal connected to the second internal node, a first conduction terminal supplied with the control clock signal, and a second conduction terminal connected to the fourth internal node, a second transistor including a control terminal supplied with the control clock signal, a first conduction terminal supplied with the set signal, and a second conduction terminal connected to the first internal node, a third transistor including a control terminal supplied with the set signal, a first conduction terminal connected to the second internal node, and a second conduction terminal supplied with a power supply voltage at an off level, a fourth transistor including a control terminal connected to the first internal node, a first conduction terminal connected to the fourth internal node, and a second conduction terminal supplied with a power supply voltage at an off level, a fifth transistor including a control terminal supplied with a power supply voltage at an on level, a first conduction terminal connected to the first internal node, and a second conduction terminal connected to the third internal node, a sixth transistor including a control terminal connected to the fourth internal node, a first conduction terminal connected to the output terminal, and a second conduction terminal supplied with a power supply voltage at an off level, a seventh transistor including a control terminal connected to the third internal node, a first conduction terminal supplied with a power supply voltage at an on level, and a second conduction terminal connected to the output terminal, a first capacitor including a first electrode connected to the control terminal of the sixth transistor and a second electrode connected to the second conduction terminal of the sixth transistor, a second capacitor including a first electrode connected to the control terminal of the seventh transistor and a second electrode connected to the second conduction terminal of the seventh transistor, and a third capacitor including a first electrode connected to the control terminal of the first transistor and a second electrode connected to the first conduction terminal of the first transistor.

4. The display device according to claim 1, wherein the light emission control line drive circuit includes a first light emission control line drive circuit configured to drive the plurality of first light emission control lines and a second light emission control line drive circuit configured to drive the plurality of second light emission control lines, the first light emission control line drive circuit is constituted by a shift register including unit circuits equal in number to 1/Q of a number of the plurality of first light emission control lines, the second light emission control line drive circuit is constituted by a shift register including unit circuits equal in number to 1/Q of a number of the plurality of second light emission control lines, each of the unit circuits included in the shift register constituting the first light emission control line drive circuit collectively drives Q first light emission control lines corresponding thereto and adjacent to each other, and each of the unit circuits included in the shift register constituting the second light emission control line drive circuit collectively drives Q second light emission control lines corresponding thereto and adjacent to each other.

5. The display device according to claim 4, wherein each of the unit circuits included in the shift register constituting the first light emission control line drive circuit and each of the unit circuits included in the shift register constituting the second light emission control line drive circuit have the same configuration as a configuration of each of the unit circuits included in the shift register constituting the second scanning signal line drive circuit.

6. The display device according to claim 4, wherein a pause period is provided during which writing of the data signals to the plurality of pixel circuits is stopped throughout a period equal to or longer than one frame period, and in the pause period, in the plurality of pixel circuits, the threshold voltage compensation transistor and the initialization transistor are maintained in an off state, and the light emission control transistor is maintained in an on state, a reset voltage used for initializing a voltage of the first terminal of the display element is supplied to the plurality of data signal lines, and in each of the plurality of pixel circuits, the voltage of the first terminal of the display element is initialized by the writing control transistor being maintained in an on state during a part of a period from a time point when the power supply control transistor changes from an on state to an off state to a time point when the power supply control transistor changes from an off state to an on state.

7. The display device according to claim 1, wherein the light emission control line drive circuit is constituted by a shift register including unit circuits equal in number to 1/Q of a number of the plurality of first light emission control lines, and a K-th stage unit circuit included in the shift register constituting the light emission control line drive circuit collectively drives (Q×K−(Q−1))-th to (Q×K)-th second light emission control lines and (Q×K+1)-th to (Q×K+Q)-th first light emission control lines, where K is an integer.

8. The display device according to claim 7, wherein each of the unit circuits included in the shift register constituting the light emission control line drive circuit has the same configuration as a configuration of each of the unit circuits included in the shift register constituting the second scanning signal line drive circuit.

9. The display device according to claim 7, wherein a pause period is provided during which writing of the data signals to the plurality of pixel circuits is stopped throughout a period equal to or longer than one frame period, and in the pause period, in the plurality of pixel circuits, the threshold voltage compensation transistor, and the initialization transistor are maintained in an off state, a reset voltage used for initializing a voltage of the first terminal of the display element is supplied to the plurality of data signal lines, and in each of the plurality of pixel circuits, the voltage of the first terminal of the display element is initialized by the writing control transistor being maintained in an on state during a part of a period during which the light emission control transistor is maintained in an on state and the power supply control transistor is maintained in an off state.

10. The display device according to claim 1, wherein the drive transistor, the writing control transistor, the threshold voltage compensation transistor, the power supply control transistor, the light emission control transistor, and the initialization transistor are N-channel thin film transistors.

11. The display device according to claim 10, wherein the drive transistor, the writing control transistor, the threshold voltage compensation transistor, the power supply control transistor, the light emission control transistor, and the initialization transistor each include a channel region formed of an oxide semiconductor.

12. A display device using a display element driven by a current, the display device comprising:

a display portion including a plurality of data signal lines, a plurality of first scanning signal lines, a plurality of second scanning signal lines, a plurality of third scanning signal lines, a plurality of first light emission control lines, a plurality of second light emission control lines, a first power source line, a second power source line, an initialization power source line, and a plurality of pixel circuits;

a data-side drive circuit configured to apply data signals to the plurality of data signal lines; and a scanning-side drive circuit including a first scanning signal line drive circuit configured to selectively drive the plurality of first scanning signal lines, a second scanning signal line drive circuit configured to selectively drive the plurality of second scanning signal lines, a third scanning signal line drive circuit configured to selectively drive the plurality of third scanning signal lines, and a light emission control line drive circuit configured to selectively drive the plurality of first light emission control lines and the plurality of second light emission control lines, wherein each of the plurality of pixel circuits corresponds to one of the plurality of data signal lines, one of the plurality of first scanning signal lines, one of the plurality of second scanning signal lines, one of the plurality of third scanning signal lines, one of the plurality of first light emission control lines, and one of the plurality of second light emission control lines, each of the plurality of pixel circuits includes the display element including a first terminal, and a second terminal connected to the second power source line, a drive transistor including a control terminal, a first conduction terminal, and a second conduction terminal, and provided in series with the display element, a holding capacitor connected at one end to the control terminal of the drive transistor, a writing control transistor including a control terminal connected to a corresponding second scanning signal line, a first conduction terminal connected to a corresponding data signal line, and a second conduction terminal connected to the second conduction terminal of the drive transistor, a threshold voltage compensation transistor including a control terminal connected to a corresponding first scanning signal line, a first conduction terminal connected to the first conduction terminal of the drive transistor, and a second conduction terminal connected to the control terminal of the drive transistor, a power supply control transistor including a control terminal connected to a corresponding second light emission control line, a first conduction terminal connected to the first power source line, and a second conduction terminal connected to the first conduction terminal of the drive transistor, a light emission control transistor including a control terminal connected to a corresponding first light emission control line, a first conduction terminal connected to the second conduction terminal of the drive transistor, and a second conduction terminal connected to the first terminal of the display element, and an initialization transistor including a control terminal connected to a corresponding third scanning signal line, a first conduction terminal connected to the first terminal of the display element, and a second conduction terminal connected to the initialization power source line, the first scanning signal line drive circuit is constituted by a shift register including unit circuits equal in number to a number of the plurality of first scanning signal lines, the second scanning signal line drive circuit is constituted by a shift register including unit circuits equal in number to 1/Q of a number of the plurality of second scanning signal lines, where Q is an integer of 2 or greater, the third scanning signal line drive circuit is constituted by a shift register including unit circuits equal in number to 1/Q of a number of the plurality of third scanning signal lines, each of the unit circuits included in the shift register constituting the first scanning signal line drive circuit drives one corresponding first scanning signal line, each of the unit circuits included in the shift register constituting the second scanning signal line drive circuit collectively drives Q second scanning signal lines corresponding thereto and adjacent to each other, each of the unit circuits included in the shift register constituting the third scanning signal line drive circuit collectively drives Q third scanning signal lines corresponding thereto and adjacent to each other, and in a period during which the writing control transistor is maintained in an on state in all pixel circuits each being connected to any one of the Q second scanning signal lines collectively driven and connected to any one of the Q third scanning signal lines collectively driven in a period during which the initialization transistor is maintained in an on state and the power supply control transistor and the light emission control transistor are maintained in an off state in the all pixel circuits each being connected to any one of the Q second scanning signal lines collectively driven and connected to any one of the Q third scanning signal lines collectively driven, Q first scanning signal lines corresponding to the Q second scanning signal lines collectively driven are sequentially set to a select state for a predetermined period each.

13. A method for driving a display device using a display element driven by a current, the display device including a display portion including a plurality of data signal lines, a plurality of first scanning signal lines, a plurality of second scanning signal lines, a plurality of first light emission control lines, a plurality of second light emission control lines, a first power source line, a second power source line, an initialization power source line, and a plurality of pixel circuits, a data-side drive circuit configured to apply data signals to the plurality of data signal lines, and a scanning-side drive circuit including a first scanning signal line drive circuit configured to selectively drive the plurality of first scanning signal lines, a second scanning signal line drive circuit configured to selectively drive the plurality of second scanning signal lines, and a light emission control line drive circuit configured to selectively drive the plurality of first light emission control lines and the plurality of second light emission control lines, wherein each of the plurality of pixel circuits corresponds to one of the plurality of data signal lines, one of the plurality of first scanning signal lines, one of the plurality of second scanning signal lines, one of the plurality of first light emission control lines, and one of the plurality of second light emission control lines, each of the plurality of pixel circuits includes the display element including a first terminal, and a second terminal connected to the second power source line, a drive transistor including a control terminal, a first conduction terminal, and a second conduction terminal, and provided in series with the display element, a holding capacitor connected at one end to the control terminal of the drive transistor, a writing control transistor including a control terminal connected to a corresponding second scanning signal line, a first conduction terminal connected to a corresponding data signal line, and a second conduction terminal connected to the second conduction terminal of the drive transistor, a threshold voltage compensation transistor including a control terminal connected to a corresponding first scanning signal line, a first conduction terminal connected to the first conduction terminal of the drive transistor, and a second conduction terminal connected to the control terminal of the drive transistor, a power supply control transistor including a control terminal connected to a corresponding second light emission control line, a first conduction terminal connected to the first power source line, and a second conduction terminal connected to the first conduction terminal of the drive transistor, a light emission control transistor including a control terminal connected to a corresponding first light emission control line, a first conduction terminal connected to the second conduction terminal of the drive transistor, and a second conduction terminal connected to the first terminal of the display element, and an initialization transistor including a control terminal connected to a corresponding first scanning signal line, a first conduction terminal connected to the first terminal of the display element, and a second conduction terminal connected to the initialization power source line, the first scanning signal line drive circuit is constituted by a shift register including unit circuits equal in number to a number of the plurality of first scanning signal lines, the second scanning signal line drive circuit is constituted by a shift register including unit circuits equal in number to 1/Q of a number of the plurality of second scanning signal lines, where Q is an integer of 2 or greater, each of the unit circuits included in the shift register constituting the first scanning signal line drive circuit drives one corresponding first scanning signal line, and each of the unit circuits included in the shift register constituting the second scanning signal line drive circuit collectively drives Q second scanning signal lines corresponding thereto and adjacent to each other, the method comprising:

a data writing step of writing the data signals to the plurality of pixel circuits; and a pause step of stopping the writing the data signals to the plurality of pixel circuits throughout a period of one frame period or longer wherein, in the data writing step, after a holding voltage of the holding capacitor and a voltage of the first terminal of the display element are initialized inpixel circuits each being connected to any one of the Q second scanning signal lines collectively driven by subsequently setting each of Q first scanning signal lines corresponding to the Q second scanning signal lines collectively driven to a select state for a predetermined period in a period during which the writing control transistor and the light emission control transistor are maintained in an off state and the power supply control transistor is maintained in an on state in all pixel circuits each being connected to any one of the Q second scanning signal lines collectively driven, writing the data signals to the pixel circuits each being connected to any one of the Q second scanning signal lines collectively driven is performed by sequentially setting each of the Q first scanning signal lines corresponding to the Q second scanning signal lines collectively driven to a select state for a predetermined period in a period during which the light emission control transistor and the power supply control transistor are maintained in an off state and the writing control transistor is maintained in an on state in the all pixel circuits each being connected to any one of the Q second scanning signal lines collectively driven, and in the pause step, the voltage of the first terminal of the display element is initialized in the pixel circuits each being connected to any one of the Q second scanning signal lines collectively driven by setting each of the Q second scanning signal lines collectively driven to a select state for a predetermined period in a period during which the threshold voltage compensation transistor, the initialization transistor, and the power supply control transistor are maintained in an off state and the light emission control transistor is maintained in an on state in the all pixel circuits each being connected to any one of the Q second scanning signal lines collectively driven.

* * * * *